US012693431B2

(12) United States Patent
Su

(10) Patent No.: US 12,693,431 B2
(45) Date of Patent: Jul. 28, 2026

(54) TERMINAL POSITIONING METHOD AND APPARATUS, DEVICE, AND MEDIUM

(71) Applicant: TENCENT TECHNOLOGY (SHENZHEN) COMPANY LIMITED, Shenzhen (CN)

(72) Inventor: Jinglan Su, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 279 days.

(21) Appl. No.: 18/527,543

(22) Filed: Dec. 4, 2023

(65) Prior Publication Data

US 2024/0142639 A1 May 2, 2024

Related U.S. Application Data

(63) Continuation of application No. PCT/CN2023/071556, filed on Jan. 10, 2023.

(30) Foreign Application Priority Data

Jan. 12, 2022 (CN) .......................... 202210034069.0

(51) Int. Cl.
*G01S 19/40* (2010.01)
(52) U.S. Cl.
CPC .................................... *G01S 19/40* (2013.01)
(58) Field of Classification Search
CPC ....................................................... G01S 19/40
(Continued)

(56) References Cited

U.S. PATENT DOCUMENTS

2009/0096671 A1 4/2009 Mizuochi
2012/0319894 A1 12/2012 Tominaga
(Continued)

FOREIGN PATENT DOCUMENTS

CN 103185887 A 7/2013
CN 103974189 A 8/2014
(Continued)

OTHER PUBLICATIONS

The European Patent Office (EPO) The Extended European Search Report for Application No. 23740008.0 Mar. 20, 2025 12 Pages.
(Continued)

*Primary Examiner* — Harry K Liu
(74) *Attorney, Agent, or Firm* — Anova Law Group, PLLC

(57) ABSTRACT

A terminal positioning method includes: obtaining a positioning information set for a terminal at a first moment; providing an estimated motion state of the terminal at the first moment; obtaining measurement data of signal measurement performed by the terminal on a satellite, and estimating an error of positioning information corresponding to the satellite; obtaining converted positioning information converted from the estimated motion state, to calculate deviation information between the positioning information and the converted positioning information, and determining an error adjustment factor of the satellite; providing a predicted motion state of the terminal at the first moment through a state prediction model; applying the positioning information set, the error, and the error adjustment factor to the state adjustment model to obtain an adjusted motion state of the terminal at the first moment; and determining a positioning result of the terminal at the first moment according to the adjusted motion state.

20 Claims, 14 Drawing Sheets

(58) Field of Classification Search
USPC ................................................... 342/357.23
See application file for complete search history.

(56) References Cited

U.S. PATENT DOCUMENTS

| | | | |
|---|---|---|---|
| 2015/0123845 | A1 | 5/2015 | Wang et al. |
| 2017/0038475 | A1 | 2/2017 | Soga et al. |
| 2018/0224555 | A1 | 8/2018 | Lennen |
| 2018/0252818 | A1 | 9/2018 | Sato et al. |
| 2022/0019817 | A1 | 1/2022 | Li et al. |
| 2022/0026213 | A1 | 1/2022 | Song et al. |
| 2023/0041480 | A1 | 2/2023 | Jiang et al. |
| 2023/0072669 | A1 | 3/2023 | Su |
| 2024/0142639 | A1 * | 5/2024 | Su .......................... G01S 19/40 |

FOREIGN PATENT DOCUMENTS

| | | | | |
|---|---|---|---|---|
| CN | 105807299 | A | 7/2016 | |
| CN | 105849589 | A | 8/2016 | |
| CN | 105005066 | B | 3/2017 | |
| CN | 108120994 | A | 6/2018 | |
| CN | 109883423 | A | 6/2019 | |
| CN | 110556012 | A | 12/2019 | |
| CN | 110806215 | A | 2/2020 | |
| CN | 110988951 | A | 4/2020 | |
| CN | 111046709 | A | 4/2020 | |
| CN | 111337959 | A | 6/2020 | |
| CN | 111488762 | A | 8/2020 | |
| CN | 111507130 | A | 8/2020 | |
| CN | 112327340 | A | 2/2021 | |
| CN | 112328731 | A | 2/2021 | |
| CN | 112541437 | A | 3/2021 | |
| CN | 112558072 | A | 3/2021 | |
| CN | 112558125 | A | 3/2021 | |
| CN | 112815959 | A | 5/2021 | |
| CN | 112861833 | A | 5/2021 | |
| CN | 113029129 | A | 6/2021 | |
| CN | 113225360 | A | 8/2021 | |
| CN | 113375679 | A | 9/2021 | |
| CN | 113423054 | A | 9/2021 | |
| EP | 3460528 | A1 * | 3/2019 | ............ G01S 19/28 |
| EP | 3336584 | B1 | 11/2020 | |
| JP | 2001208821 | A | 8/2001 | |
| JP | 2004077228 | A | 3/2004 | |
| JP | 2018128330 | A | 8/2018 | |
| WO | WO-2023134666 | A1 * | 7/2023 | ............ G01S 19/40 |

OTHER PUBLICATIONS

Christophe Combettes et al., "EKF based on two FDE schemes for GNSS Vehicle Navigation." 2021 IEEE 93rd Vehicular Technology Conference (VTC2021-Spring). IEEE, 2021.
China National Intellectual Property Administration (CNIPA) Office Action 1 for Application No. 202210034069.0 Dec. 13, 2024 7 Pages (including translation).
The World Intellectual Property Organization (WIPO) International Search Report for PCT/CN2023/071556 Jun. 12, 2023 6 Pages (including translation).
Global Navigation Satellite System GLONASS, Interface Control Document Navigational radiosignal in bands L1, L2, (Edition 5.1), 2008.
J. Du et al. "Lane-level positioning for in-vehicle navigation and automated vehicle location (AVL) systems," Proceedings. The 7th International IEEE Conference on Intelligent Transportation Systems (IEEE Cat. No. 04TH8749), 2004, pp. 35-40, doi: 10.1109/ITSC.2004.1398868.
Mohamed M.Atia et al. "Vehicular Lane-Level Positioning using Low-Cost Map-Aided GNSS/MEMS IMU Sensors Integration," Proceedings of the 2018 International Technical Meeting of The Institute of Navigation, Reston, Virginia, Jan. 2018, pp. 483-494.
Sébastien Carcanague. Low-cost GPS/GLONASS Precise Positioning Algorithm in Constrained Environment. Signal and Image processing. Institut National Polytechnique de Toulouse—INPT, 2013. English.

* cited by examiner

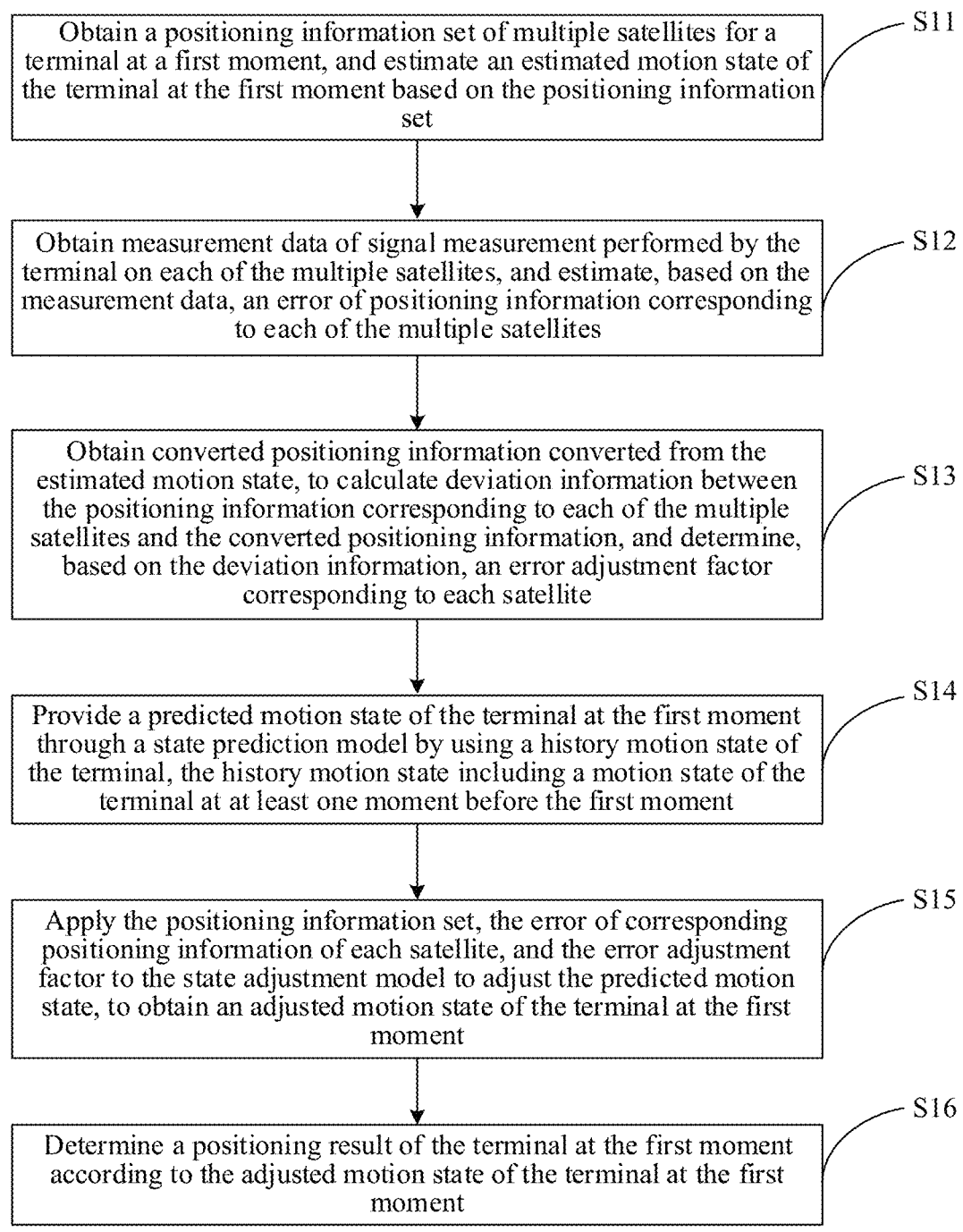

Obtain a positioning information set of multiple satellites for a terminal at a first moment, and estimate an estimated motion state of the terminal at the first moment based on the positioning information set — S11

Obtain measurement data of signal measurement performed by the terminal on each of the multiple satellites, and estimate, based on the measurement data, an error of positioning information corresponding to each of the multiple satellites — S12

Obtain converted positioning information converted from the estimated motion state, to calculate deviation information between the positioning information corresponding to each of the multiple satellites and the converted positioning information, and determine, based on the deviation information, an error adjustment factor corresponding to each satellite — S13

Provide a predicted motion state of the terminal at the first moment through a state prediction model by using a history motion state of the terminal, the history motion state including a motion state of the terminal at at least one moment before the first moment — S14

Apply the positioning information set, the error of corresponding positioning information of each satellite, and the error adjustment factor to the state adjustment model to adjust the predicted motion state, to obtain an adjusted motion state of the terminal at the first moment — S15

Determine a positioning result of the terminal at the first moment according to the adjusted motion state of the terminal at the first moment — S16

FIG. 1B

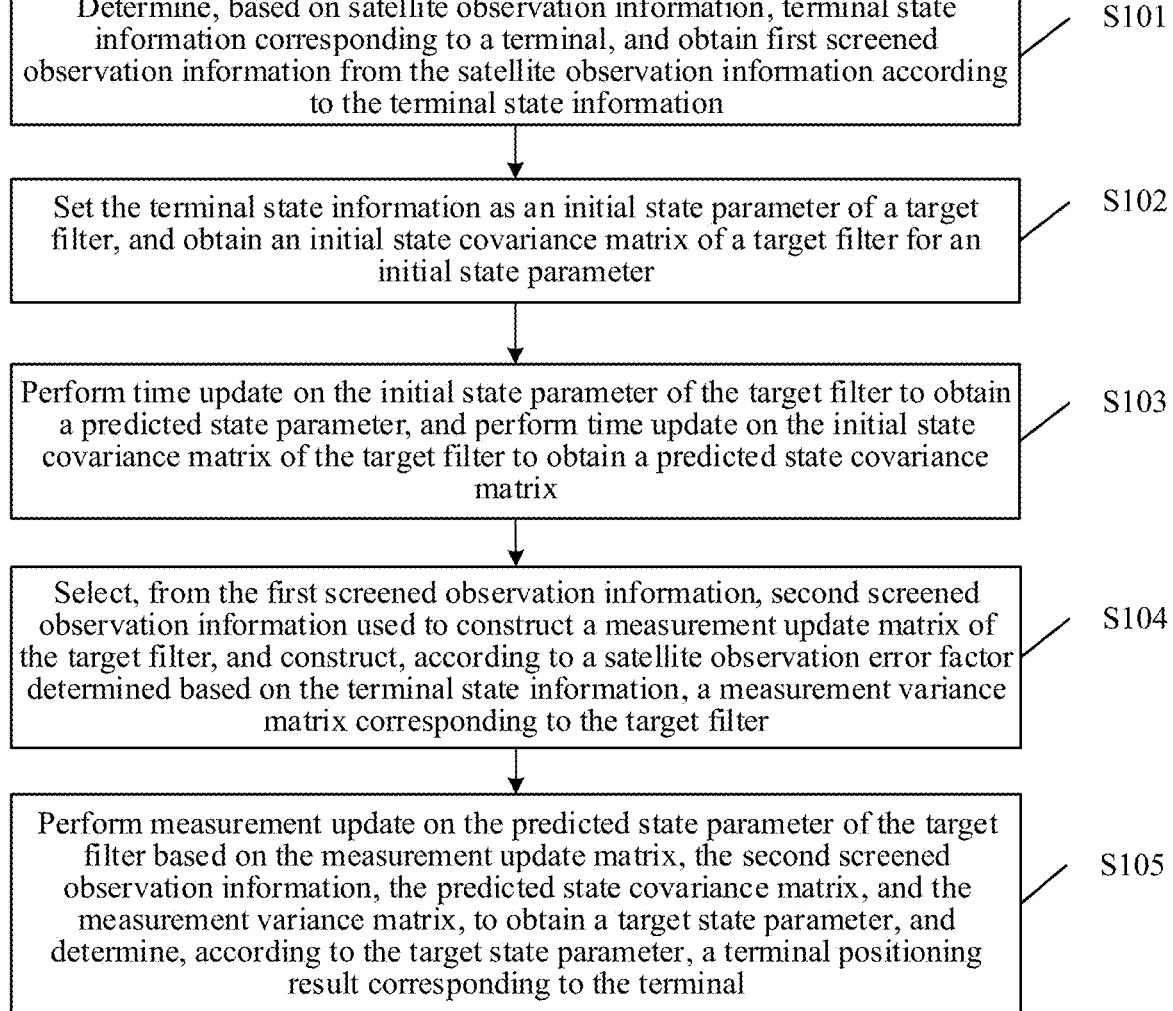

Determine, based on satellite observation information, terminal state information corresponding to a terminal, and obtain first screened observation information from the satellite observation information according to the terminal state information          S101

Set the terminal state information as an initial state parameter of a target filter, and obtain an initial state covariance matrix of a target filter for an initial state parameter          S102

Perform time update on the initial state parameter of the target filter to obtain a predicted state parameter, and perform time update on the initial state covariance matrix of the target filter to obtain a predicted state covariance matrix          S103

Select, from the first screened observation information, second screened observation information used to construct a measurement update matrix of the target filter, and construct, according to a satellite observation error factor determined based on the terminal state information, a measurement variance matrix corresponding to the target filter          S104

Perform measurement update on the predicted state parameter of the target filter based on the measurement update matrix, the second screened observation information, the predicted state covariance matrix, and the measurement variance matrix, to obtain a target state parameter, and determine, according to the target state parameter, a terminal positioning result corresponding to the terminal          S105

FIG. 3

TERMINAL POSITIONING METHOD AND APPARATUS, DEVICE, AND MEDIUM

CROSS-REFERENCES TO RELATED APPLICATIONS

This application is a continuation application of PCT Patent Application No. PCT/CN2023/071556, filed on Jan. 10, 2023, which claims priority to Chinese Patent Application No. 202210034069.0, filed on Jan. 12, 2022, all of which is incorporated herein by reference in their entirety.

FIELD OF THE INVENTION

The present disclosure relates to the field of navigation and positioning technologies and, in particular, to a terminal positioning method and apparatus, a device, and a medium.

BACKGROUND OF THE DISCLOSURE

A terminal often can be positioned (for example, lane-level positioning) through a navigation system assisted by sensors, such as vision sensors and radars. Based on a positioning result of the terminal, path navigation can be performed for a user using the terminal.

However, when the terminal is in extreme weather conditions, such as in heavy rain, heavy fog, or heavy snow, the vision sensor assisting terminal positioning is affected by the weather, and images obtained by the sensor cannot capture real road information. In a process of terminal positioning by auxiliary tools, such as global positioning systems and vision sensors, the terminal positioning accuracy is excessively low.

SUMMARY OF THE INVENTION

An embodiment of the present disclosure provides a terminal positioning method. The terminal positioning method, executed by a terminal, includes: obtaining a positioning information set for a terminal at a first moment, the positioning information set comprising positioning information corresponding to multiple satellites; providing an estimated motion state of the terminal at the first moment based on the positioning information set; obtaining measurement data of signal measurement performed by the terminal on the multiple satellites, and estimating, based on the measurement data, an error of positioning information corresponding to a satellite of the multiple satellites; obtaining converted positioning information converted from the estimated motion state, to calculate deviation information between the positioning information corresponding to the satellite in the positioning information set and the converted positioning information; determining, based on the deviation information, an error adjustment factor corresponding to the satellite, the error adjustment factor corresponding to the satellite being used to adjust the error of the positioning information corresponding to the satellite; providing a predicted motion state of the terminal at the first moment through a state prediction model by using a history motion state of the terminal, the history motion state comprising a motion state of the terminal at least one moment before the first moment; applying the positioning information set, the error, and the error adjustment factor to the state adjustment model to adjust the predicted motion state, to obtain an adjusted motion state of the terminal at the first moment; and determining a positioning result of the terminal at the first moment according to the adjusted motion state.

Another embodiment of the present disclosure provides a computer device. The computer device includes one or more processors; and a memory coupled to the one or more processors and storing a computer program that, when being executed, causes the one or more processors to perform: obtaining a positioning information set for a terminal at a first moment, the positioning information set comprising positioning information corresponding to multiple satellites; providing an estimated motion state of the terminal at the first moment based on the positioning information set; obtaining measurement data of signal measurement performed by the terminal on the multiple satellites, and estimating, based on the measurement data, an error of positioning information corresponding to a satellite of the multiple satellites; obtaining converted positioning information converted from the estimated motion state, to calculate deviation information between the positioning information corresponding to the satellite in the positioning information set and the converted positioning information; determining, based on the deviation information, an error adjustment factor corresponding to the satellite, the error adjustment factor corresponding to the satellite being used to adjust the error of the positioning information corresponding to the satellite; providing a predicted motion state of the terminal at the first moment through a state prediction model by using a history motion state of the terminal, the history motion state comprising a motion state of the terminal at least one moment before the first moment; applying the positioning information set, the error, and the error adjustment factor to the state adjustment model to adjust the predicted motion state, to obtain an adjusted motion state of the terminal at the first moment; and determining a positioning result of the terminal at the first moment according to the adjusted motion state.

Another embodiment of the present disclosure provides a non-transitory computer-readable storage medium, storing a computer program that, when being executed, causes one or more processors to perform: obtaining a positioning information set for a terminal at a first moment, the positioning information set comprising positioning information corresponding to multiple satellites; providing an estimated motion state of the terminal at the first moment based on the positioning information set; obtaining measurement data of signal measurement performed by the terminal on the multiple satellites, and estimating, based on the measurement data, an error of positioning information corresponding to a satellite of the multiple satellites; obtaining converted positioning information converted from the estimated motion state, to calculate deviation information between the positioning information corresponding to the satellite in the positioning information set and the converted positioning information; determining, based on the deviation information, an error adjustment factor corresponding to the satellite, the error adjustment factor corresponding to the satellite being used to adjust the error of the positioning information corresponding to the satellite; providing a predicted motion state of the terminal at the first moment through a state prediction model by using a history motion state of the terminal, the history motion state comprising a motion state of the terminal at least one moment before the first moment; applying the positioning information set, the error, and the error adjustment factor to the state adjustment model to adjust the predicted motion state, to obtain an adjusted motion state of the terminal at the first moment; and determining a positioning result of the terminal at the first moment according to the adjusted motion state.

In the embodiments of the present disclosure, the terminal state information corresponding to the terminal can be estimated through satellite observation information, a target filter can be established based on the terminal state information, gross observation information errors are eliminated from the satellite observation information through two processes of target filter time update and filter measurement update, and the terminal positioning result corresponding to the terminal is determined based on the satellite observation information (second screened observation information) from which the gross observation information errors are eliminated, which can improve the accuracy of the terminal position.

BRIEF DESCRIPTION OF THE DRAWINGS

To describe the technical solutions in the embodiments of the present disclosure or in the prior art more clearly, the following briefly introduces the accompanying drawings for describing the embodiments or the prior art. Apparently, the accompanying drawings in the following description show merely some embodiments of the present disclosure.

FIG. 1B is a schematic flowchart of a terminal positioning method according to an embodiment of the present disclosure;

FIG. 3 is a schematic flowchart of a terminal positioning method according to an embodiment of the present disclosure;

DESCRIPTION OF EMBODIMENTS

Figure 1A:
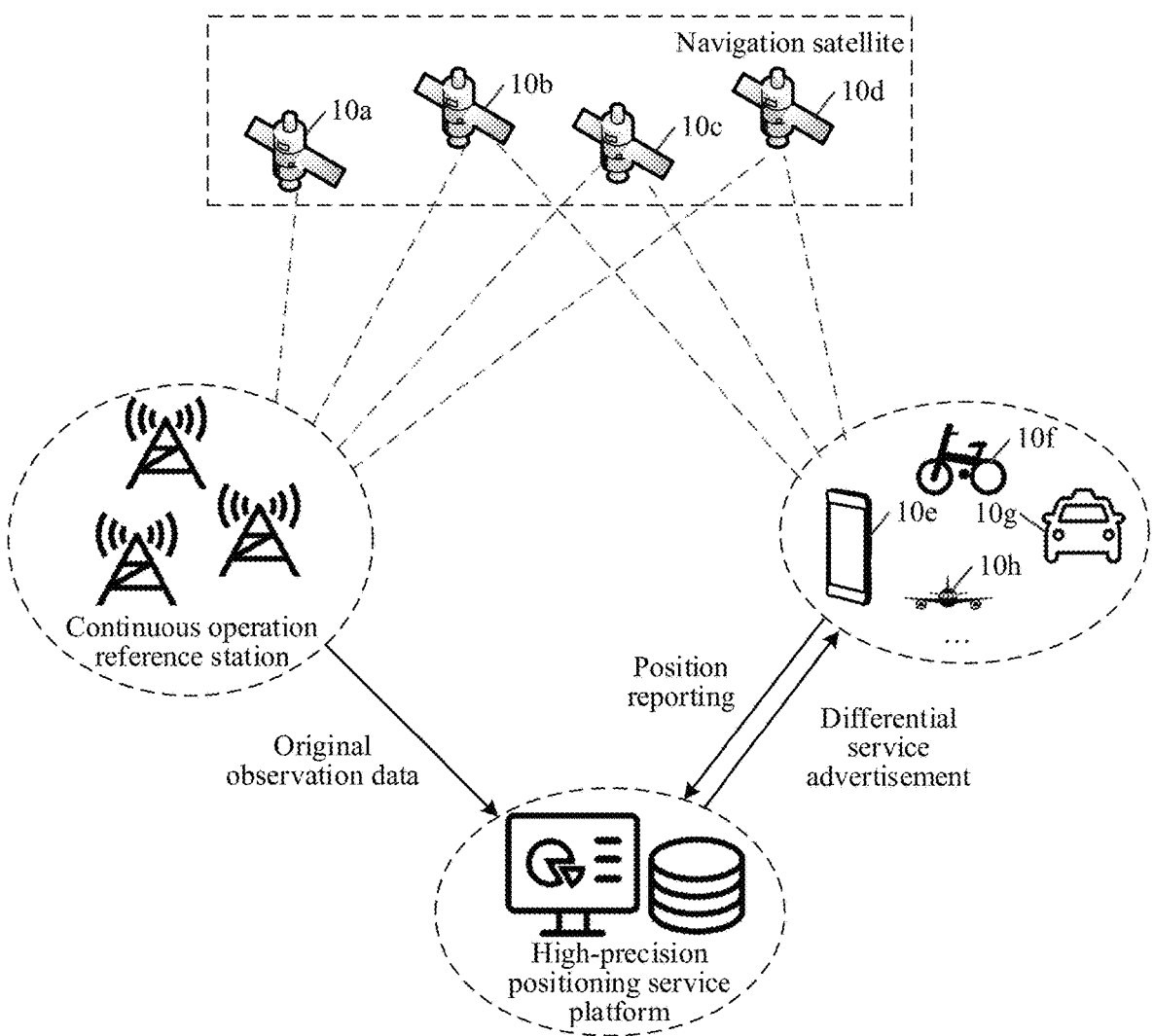
FIG. 1A is a schematic structural diagram of a terminal positioning system according to an embodiment of the present disclosure.

Technical solutions in embodiments of the present disclosure are clearly and completely described below with reference to the accompanying drawings in the embodiments of the present disclosure. Apparently, the described embodiments are only some embodiments rather than all the embodiments of the present disclosure. All other embodiments obtained by a person of ordinary skill in the art based on the embodiments of the present disclosure without creative efforts shall fall within the protection scope of the present disclosure.

The embodiments of the present disclosure involve the following concepts.

Satellite positioning terminal: a satellite positioning terminal refers to an electronic device configured to process satellite signals and measure a geometric distance between the satellite positioning terminal and a satellite (that is, pseudo-range observation data) and the Doppler effect of satellite signals (that is, Doppler observation data). A satellite positioning terminal may also be referred to as a satellite positioning device. The satellite positioning device usually includes modules such as antennas, satellite signal obtaining loops, and baseband signal processing modules. A mobile terminal integrated with the satellite positioning device can calculate current position coordinates of the mobile terminal according to the pseudo-range observation data and the Doppler observation data. Satellite positioning devices can be widely used in many fields.

Satellite observation information: satellite observation information refers to observation data (also referred to as positioning information) obtained by a satellite positioning device by observing and measuring satellite signals, and output to position a satellite positioning device. The satellite observation information may be at least one of data such as pseudo-range observation data, Doppler observation data (also referred to as pseudo-range observation values), and accumulated delta ranges (Accumulated Delta Range, ADR). The pseudo-range observation data is used to represent a geometric distance between a satellite and a satellite positioning device. The Doppler observation data is used to represent the Doppler effect caused by the relative motion between a satellite positioning device and a satellite. The accumulated delta range is used to represent the variation of the geometric distance between the satellite and the satellite positioning device.

High-precision positioning service platform: continuously operating reference stations (CORS) established using a multi-reference station network real time kinematic (RTK) technology have become the development focus of urban global navigation satellite system (GNSS) applications. The CORS system is a product of multi-directional and in-depth development of high-tech such as a satellite positioning technology, a computer network technology, and a digital communication technology. The CORS system includes five parts: a reference station network, a data processing center, a data transmission system, a positioning and navigation data dissemination system, and a user application system. Each reference station and the data analysis center are connected together through a data transmission system to form a dedicated network. The high-precision positioning service platform can be understood as a background data center such as a CORS server of the CORS system. The high-precision positioning service platform of the CORS system can broadcast differential service data to user terminals to achieve centimeter-level high-precision positioning. Differential service data can refer to satellite observation information (for example, pseudo-range observation data and Doppler observation data) obtained after the CORS system obtains original observation data of the satellite and the high-precision positioning service platform processes the original observation data. Centimeter-level high-precision positioning means that the terminal position calculated by the high-precision positioning service platform based on the observation data of the CORS system can be accurate to centimeters.

FIG. 1A is a schematic structural diagram of a terminal positioning system according to an embodiment of the present disclosure. For example, as shown in FIG. 1A, the terminal positioning system has a continuously operating reference station (CORS) system and a user terminal cluster, and the user terminal cluster may include one or more user terminals. A number of user terminals is not limited herein. For example, as shown in FIG. 1A, the user terminal cluster may include a user terminal 10e, a user terminal 10f, a user terminal 10h, and a user terminal 10g. The high-precision positioning service platform can be understood as a background data center of the CORS system. The high-precision positioning service platform can be an independent physical server, or a server cluster including multiple physical servers, or a distributed system, and can also be a cloud server that provides basic cloud computing services such as cloud services, cloud databases, cloud computing, cloud functions, cloud storage, network services, cloud communication, middleware services, domain name services, security services, CDN, and big data and artificial intelligence platforms. The user terminal in the user terminal cluster may include but is not limited to: mobile terminals that are integrated with satellite positioning devices and that include, for example, smartphones, tablet computers, notebook computers, handheld computers, mobile internet devices (MID), wearable devices (for example, smart watches and smart bracelets), aircrafts (for example, airplanes and drones), and vehicle-mounted computers in autonomous driving systems. The high-precision positioning service platform can broadcast differential service data for each user terminal in the user terminal cluster, and the user terminals in the user terminal cluster can also report positions to the high-precision positioning service platform.

The navigation satellite shown in FIG. 1A may be a navigation satellite of a global navigation satellite system (GNSS). GNSS is also referred to as global navigation satellite system, and is a space-based radio navigation and positioning system that can provide users with all-weather 3-dimensional coordinates and velocity and time information at any place on the earth surface or near-earth space. For ease of description, navigation satellites are referred to simply as satellites below. For example, as shown in FIG. 1A, a satellite 10a, a satellite 10b, a satellite 10c, and a satellite 10d may be one or more GNSS navigation satellites. The present disclosure does not limit a GNSS type to which the satellite belongs.

The CORS system can obtain the original observation data corresponding to navigation satellites of the global navigation satellite system (GNSS). The received original observation data can be transmitted to the high-precision positioning service platform. The high-precision positioning service platform calculates satellite observation information between each user terminal in the user terminal cluster and the navigation satellite in real time based on the original observation data, and broadcasts the satellite observation information to a corresponding user terminal. For example, the satellite observation information can be referred to as differential service data broadcasted by the high-precision positioning service platform for the user terminal. The user terminal 10e in the user terminal cluster shown in FIG. 1A is used as an example, and the user terminal 10e may be a mobile terminal integrated with a satellite positioning device. The user terminal 10e can obtain satellite observation information between the user terminal 10e and at least one of the satellites (e.g., each satellite) from the high-precision positioning service platform of the CORS system, for example, satellite observation information between the user terminal 10e and the satellite 10a, the satellite 10b, the satellite 10c, and the satellite 10d shown in FIG. 1A. After obtaining the satellite observation information, the user terminal 10e can estimate the terminal state information of the user terminal 10e through the obtained satellite observation information. If the satellite observation information is pseudo-range observation data, the terminal state information may include a terminal position and a terminal clock error. If the satellite observation information is Doppler observation data, the terminal state information includes a terminal velocity and a terminal clock drift. If the satellite observation information includes pseudo-range observation data and Doppler observation data, the terminal state information includes a terminal velocity, a terminal position, a terminal clock error, and a terminal clock drift. In other words, the satellite observation information in the embodiments of the present disclosure may be at least one of pseudo-range observation data, Doppler observation data, and ADR, such as pseudo-range observation data, or pseudo-range observation data and Doppler observation data. The present disclosure does not limit data types (for example, the pseudo-range data type and the Doppler data type) and the number of data types of satellite observation information.

It can be understood that the clock error may refer to a clock error, and the clock error in the present disclosure specifically relates to a satellite clock error and a terminal clock error. A satellite clock error refers to a difference between a satellite clock and a standard time. The terminal clock error may also be referred to as a receiver clock error, that is, a difference between the receiver clock and the standard time. A clock drift may refer to a clock error change rate. The clock drift in the present disclosure refers to the terminal clock drift and the satellite clock drift, the terminal clock drift refers to a receiver clock error change rate, and the satellite clock drift refers to a satellite clock error change rate.

FIG. 1B is a schematic flowchart of a terminal positioning method according to an embodiment of the present disclosure. In one embodiment, the terminal positioning method can be executed by a terminal, such as a user terminal or mobile terminal described in this disclosure.

The terminal may also include a terminal containing a satellite positioning device and being mobile independently or dependently. For example, the terminal may include a portable hardware terminal (e.g., an independent device that is not part of an aircraft and/or a vehicle) or a built-in device of an aircraft and/or a vehicle that contains a satellite positioning device. In another example, the terminal may include a computer device integrated with a satellite positioning device. Non-limiting examples of the terminal may further include smartphone, tablet computer, notebook computer, handheld computer, mobile internet devices (MID), wearable devices (e.g., smart watch and/or smart bracelet), aircraft (e.g., airplane and/or drone), and/or vehicle-mounted computing device (e.g., in autonomous driving systems), with integrated satellite positioning device.

As shown in FIG. 1B, the method may include the following steps.

Step S11: Obtain a positioning information set for a terminal at a first moment, and estimate an estimated motion state of the terminal at the first moment based on positioning information, the positioning information set including positioning information corresponding to multiple satellites.

In a satellite positioning technology, the terminal receives satellite signals sent by satellites (also referred to as navigation and positioning signals), and measures and analyzes the received satellite signals of the satellites to obtain the positioning information (also referred to as satellite observation information) of at least one satellite (or each satellite in some embodiments) for the terminal. Positioning information of a satellite for a terminal refers to information used for positioning the terminal and obtained based on a satellite signal of the satellite received by the terminal. In some embodiments, the positioning information may include, for example, a distance between the terminal and the satellite (also referred to as pseudo-range), a Doppler frequency shift of the satellite signal, a Doppler count of the satellite signal, and ADR. In various embodiments, when the positioning information includes more than one parameter, for example, includes pseudo-range information and Doppler information, the method of each embodiment may be performed for each of these parameters. For example, for the pseudo-range information in the positioning information, the method described in FIG. 1B is performed to obtain the position of the terminal. For the Doppler information in the positioning information, the method in FIG. 1B is performed to obtain the velocity of the terminal and the like.

The motion state of the terminal refers to one or more parameters related to the motion of the terminal, and may include, for example, the position of the terminal, the velocity of the terminal, and the like. Various motion states in this specification, such as an estimated motion state, a predicted motion state, and an adjusted motion state, refer to motion states obtained in different manners. The estimated motion state is an estimation result of estimating the motion state of the terminal by using the positioning information of multiple satellites at the first moment.

Step S12: Obtain measurement data of signal measurement performed by the terminal on each of the multiple satellites, and estimate, based on the measurement data, an error of positioning information corresponding to each of the multiple satellites.

In addition to processing the satellite signals to obtain positioning information, the terminal can also obtain measurement data by measuring the satellite signal of the satellite, for example, the altitude angle of the satellite and the signal-to-noise ratio of the satellite signal.

Through the obtained measurement data, the terminal can estimate the accuracy or the error of the positioning information corresponding to the satellite. For example, the terminal may use a preset algorithm to calculate the measurement data corresponding to the satellite, to obtain an error measurement value of the positioning information corresponding to the satellite. In some embodiments, the preset algorithm may be an algorithm obtained by performing mathematical modeling using measurement data of satellite signals, such as a random error model. A variable in the algorithm can be one or more parameters in the measurement data of the satellite signal, such as the altitude angle of the satellite and the signal-to-noise ratio of the satellite signal, and a calculation result of the algorithm is an error measurement value of the positioning information corresponding to the satellite. The algorithm measures the error of the satellite positioning signal, where the error is an error related to the measurement data used in the algorithm. For example, when the algorithm uses the altitude angle of the satellite, the measurement value obtained by the algorithm takes into account the impact of the altitude angle of the satellite on a propagation path of the satellite signal and the error generated in the positioning information obtained by the terminal. For another example, when the algorithm uses the signal-to-noise ratio of the satellite signal, the measurement value obtained by the algorithm takes into account the error generated in the positioning information by the signal-to-noise ratio of the satellite signal.

In the algorithm, a parameter for adjusting the output error measurement value may be included, and is referred to as an error adjustment factor herein. The initial value of the error adjustment factor can be set to a preset default value, such as 0 (when the error adjustment factor is set as an offset of the error), or 1 (when the error adjustment factor is set as an error scaling factor).

Step S13: Obtain converted positioning information converted from the estimated motion state, to calculate deviation information between the positioning information corresponding to the satellite in the positioning information set and the converted positioning information, and determine, based on the deviation information, an error adjustment factor of the satellite, the error adjustment factor of the satellite being used to adjust the error of the positioning information of the satellite.

Converting the estimated motion state to obtain converted positioning information refers to converting one or more parameters representing the motion state of the terminal to parameters in the positioning information for positioning the terminal. For example, the position of the terminal in the estimated motion state may be converted into the distance between the terminal and the satellite by using the position of the satellite. For another example, a running velocity of the satellite may be used to convert a velocity of the terminal in the estimated motion state into a Doppler frequency shift between the terminal and the satellite.

The deviation information refers to measurement information of the degree of deviation between the positioning information corresponding to the satellite and the converted positioning information. The deviation information can be obtained by, for example, calculating a difference, a variance, or a standard deviation between the positioning information and the converted positioning information.

The deviation information reflects the degree of deviation between the positioning information corresponding to the satellite and the converted positioning information corresponding to the estimated motion state, and therefore can be used to estimate the impact of noise and various uncertain factors in a satellite signal transmitting device, a propagation path and environment of the satellite signal, and a receiving device of the satellite signal on the accuracy of positioning information. The error adjustment factor of the satellite is determined by using the deviation information corresponding to the satellite. The error adjustment factor is used to adjust the error of the positioning information of the satellite, for example, to increase or decrease the error. For example, the error adjustment factor may be an offset value, adjusting the error may be adding an offset value to the error, and the offset value may be a positive number or a complex number. For another example, the error adjustment factor may be a scaling factor, adjusting the error may be multiplying the error by the scaling factor, and the scaling factor may be greater than 1, less than 1, or equal to 1.

Step S14: Predict a predicted motion state of the terminal at the first moment through a state prediction model by using a history motion state of the terminal, the history motion state including a motion state of the terminal at least one moment before the first moment.

The state prediction model is used to predict the motion state at a subsequent moment according to a motion state at a previous moment. The state prediction model can be implemented by a preset prediction algorithm or the like. Parameters in the prediction algorithm may include one or more parameters of the history motion state of the terminal, and/or various known data selected from the terminal (for example, the history motion state, history positioning information, positioning information at the first moment, or a time interval of observing a satellite signal to obtain positioning information), and/or one or more parameters selected from various parameters obtained by the terminal through calculation or estimation based on various known data (for example, various errors in a satellite signal transmitting device, propagation environment, receiving device, various algorithms, and various models, and various noise estimates). The output of the prediction algorithm may be the predicted motion state of the terminal at the current moment (that is, the first moment).

Predicting the motion state refers to predicting a motion state of a subsequent time by using a motion state of a previous moment, which indicates the reasoning and application of a rule based on which the motion state of the terminal changes with time. Estimating the motion state in step S11 refers to estimating the real motion state of the terminal at the current moment by using an error-containing observation result (that is, positioning information) obtained at the current moment.

Step S15: Apply the positioning information set, the error of corresponding positioning information of the satellite, and the error adjustment factor to the state adjustment model to adjust the predicted motion state, to obtain an adjusted motion state of the terminal at the first moment.

The state adjustment model is used to adjust the predicted motion state according to the positioning information corresponding to the satellite at the current moment and error-related information (the error and the error adjustment factor). On the one hand, in the adjustment process, the positioning information from multiple satellites is used to correct the prediction result of the prediction algorithm, so as to counteract the inaccuracy of the prediction algorithm. On the other hand, when using positioning information, differences between errors of satellites are taken into account, thereby reducing the negative impact of the differences between the errors of the satellites on the final determined motion state of the terminal (that is, the adjusted motion state). The state adjustment model can be implemented by an adjustment algorithm. Parameters in the adjustment algorithm can be obtained from the predicted motion state, the positioning information of the satellites, the error of the corresponding positioning information of the satellite, and the error adjustment factor. The output of the adjustment algorithm may be the adjusted predicted motion state (referred to as an adjusted motion state for short) of the terminal at the current moment (that is, the first moment).

The state prediction model and the state adjustment model can be implemented by a recursive estimation algorithm, a state estimator, and the like.

Step S16: Determine a positioning result of the terminal at the first moment according to the adjusted motion state of the terminal at the first moment.

The method of determining the positioning result of the terminal according to the adjusted motion state can be determined according to the application scenario of the positioning result. For example, in electronic map and navigation application scenarios, the adjusted motion state of the terminal (for example, longitude and latitude coordinates of the position of the terminal) can be converted into the position of the terminal in the electronic map (for example, a road where the terminal is located, or a lane where a terminal is located) as the positioning result of the terminal.

According to the methods of the embodiments, the error adjustment factor corresponding to the satellite is determined according to the deviation information of the satellite observation information (that is, the positioning information) of the satellite relative to the converted positioning information corresponding to the estimated motion state, and is used to adjust the error of the positioning information of the satellite. During each terminal positioning, the error of the positioning information of the satellite can be adjusted based on the current satellite observation information. During the positioning process, the differences between errors of the positioning information of different satellites are taken into account, making the positioning result more accurate.

In some embodiments, before estimating the estimated motion state of the terminal at the first moment, some preprocessing may be performed on the adopted positioning information to eliminate some abnormal information, so as to make the positioning result more accurate. For example, positioning information of at least one satellite may be eliminated by using an abnormality detection method from positioning information of a first number of satellites obtained by the terminal at the first moment, to obtain the positioning information set.

Herein, the positioning information set including the positioning information of multiple satellites and the positioning information corresponding to a single satellite are also collectively referred to as satellite observation information. Depending on the context, when satellite observation information refers to satellite observation information obtained from multiple satellites, the satellite observation information may refer to a positioning information set. When the satellite observation information refers to satellite observation information obtained from some of multiple satellites, the satellite observation information may refer to positioning information corresponding to some satellites. In some embodiments, after outlier detection and elimination are performed on the positioning information set, the updated positioning information set is also referred to as screened observation information.

For estimating the terminal state information (that is, estimating the motion state) based on satellite observation information, some gross errors in observation information can be eliminated, that is, the satellite observation information used to determine the terminal state information is not all satellite observation information obtained by the user terminal 10e, and is instead the remaining satellite observation information after eliminating some gross errors in the observation information. In this embodiment of the present disclosure, the current remaining satellite observation information may be referred to as the first screened observation information, that is, the terminal state information is determined based on the first screened observation information. Gross errors in observation information can refer to wrong observation results or out-of-limit errors caused by negligence in measurement, for example, observation target errors (for example, satellite observation information is not the observation data between the satellite and the user terminal 10e), and observation data reading errors.

In some embodiments, the method for estimating the estimated motion state of the terminal at the first moment based on the positioning information of multiple satellites in the above step S11 may include:

setting an initial estimated motion state;

obtaining initial converted positioning information converted from the initial estimated motion state;

iteratively adjusting the initial estimated motion state according to deviation information of the positioning information corresponding to the satellite in the positioning information set relative to the initial converted positioning information, until a preset condition is met; and using an estimated motion state when the preset condition is met as the estimated motion state of the terminal at the first moment.

The process of estimating the estimated motion state is to estimate the motion state of the terminal closest to the real state by using the satellite observation information of multiple satellites. An iterative convergence condition can be designed according to needs, the estimated motion state can be adjusted iteratively, and whether the calculation of the estimated motion state after each adjustment meets the convergence condition can be determined. The estimated motion state when the convergence condition is met is used as the estimated motion state of the terminal at the first moment. Through such iterative adjustment, the error of the estimated motion state can be reduced.

Figure 2:
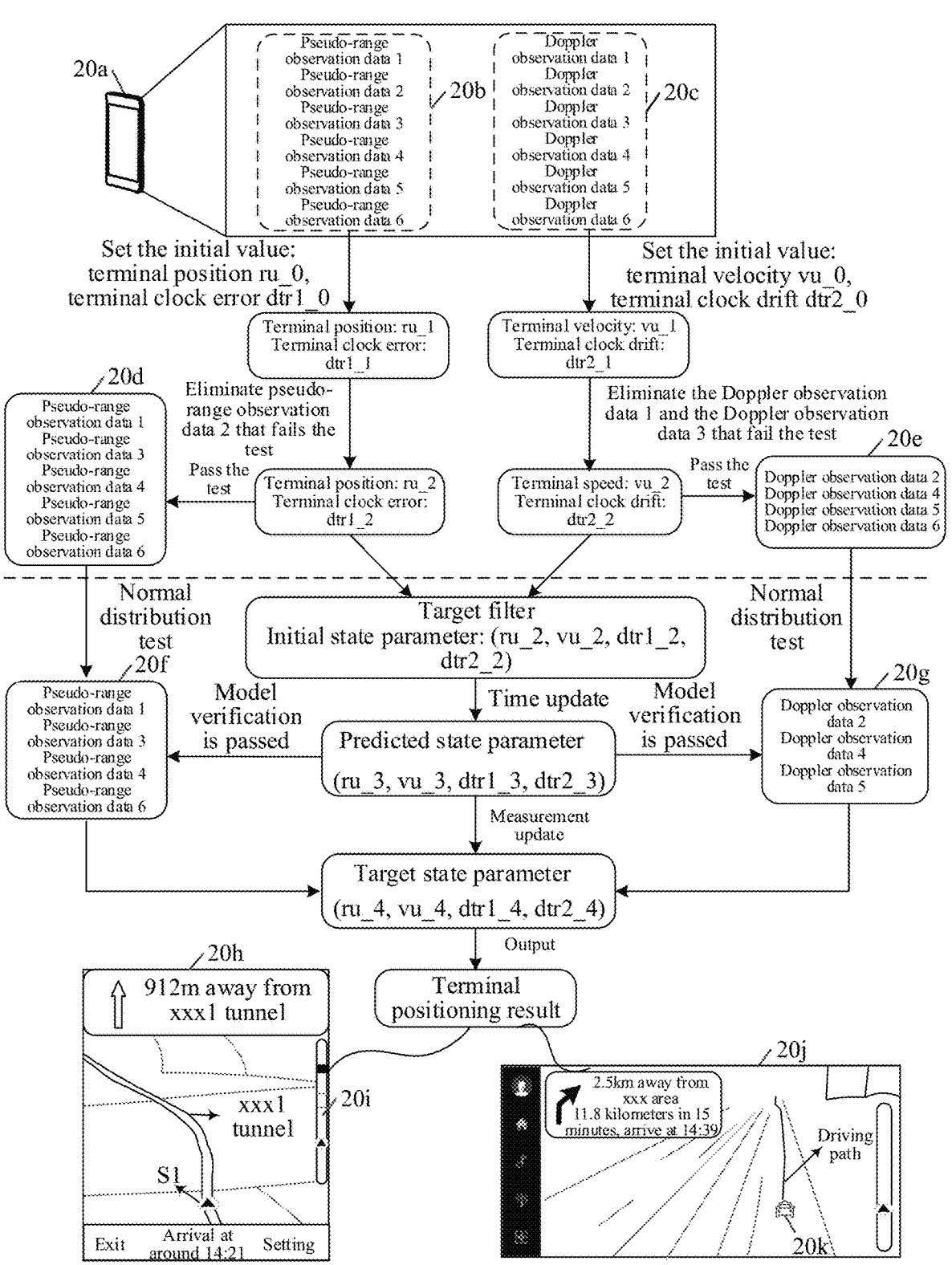
FIG. 2 is a schematic diagram of a terminal positioning scenario according to an embodiment of the present disclosure.

Methods of some embodiments are illustrated below as examples. FIG. 2 is a schematic diagram of a terminal positioning scenario according to an embodiment of the present disclosure. For example, the user terminal 20a shown in FIG. 2 may be any user terminal in the user terminal cluster shown in FIG. 1A. A satellite positioning device is integrated in the user terminal 20a. The user terminal 20a can receive satellite observation information broadcast by a CORS system. The satellite observation information may include pseudo-range observation data and Doppler observation data corresponding to the satellite. The present disclosure does not limit the number of satellites corresponding to the satellite observation information, that is, does not limit the number of satellite observation information received. For example, as shown in FIG. 2, the embodiments of the present disclosure use the reception of satellite observation information corresponding to 6 satellites as an example for illustration.

The satellite observation information received by the user terminal 20a includes a pseudo-range observation data set 20b and a Doppler observation data set 20c. The pseudo-range observation data set 20b includes pseudo-range observation data corresponding to 6 satellites, such as pseudo-range observation data 1, pseudo-range observation data 2, . . . , and pseudo-range observation data 6. The Doppler observation data set 20c includes Doppler observation data corresponding to 6 satellites, such as Doppler observation data 1, Doppler observation data 2, . . . and Doppler observation data 6. In other words, the satellite observation information received by the user terminal 20a includes two types of data. The pseudo-range observation data in the pseudo-range observation data set 20b can be referred to as a pseudo-range data type, and the Doppler observation data in the Doppler observation data set 20c may be referred to as a Doppler data type.

Satellite observation information of different data types can be processed independently. For example, by processing the pseudo-range observation data included in the pseudo-range observation data set 20b, the terminal position corresponding to the user terminal 20a can finally be obtained. By processing the Doppler observation data included in the Doppler observation data set 20c, the terminal velocity corresponding to the user terminal 20a can finally be obtained.

For the pseudo-range observation data set 20b, the terminal position and the terminal clock error of the user terminal 20a can be used as an estimated parameter x, and the estimated parameter x can be denoted as (ru, dtr1). ru is used to indicate the terminal position, and dtr1 is used to indicate the terminal clock error. The estimated parameter x is optimized (that is, iteratively updated) based on the pseudo-range observation data in the pseudo-range observation data set 20b, so that the terminal position and the terminal clock error of the user terminal 20a can be calculated. The estimated parameter x can be initialized, that is, an initial value is set for the estimated parameter x, and the initial value of the estimated parameter x can be denoted as (ru_0, dtr1_0). The initial value of the estimated parameter x may be set to 0, or may be a value set based on prior knowledge (the actual environment where the user terminal 20a is located). The present disclosure does not limit the actual value of the initial value of the estimated parameter x.

The initial value (ru_0, dtr1_0) of the estimated parameter x can be iteratively updated through the pseudo-range observation data set 20b. The estimated parameter x is updated in each iteration, and the estimated parameter x of the next iteration is obtained by adding an estimated parameter correction amount (also referred to as a state information correction amount) based on the estimated parameter x of the previous iteration. When the estimated parameter x converges, it means that the estimated parameter x has gone through an iterative cycle (an iterative cycle may include one or more iterations). The estimated parameter x determined in each iteration cycle is a parameter value when convergence is reached. For example, as shown in FIG. 2, the estimated parameter x determined in the first iteration cycle can be denoted as (ru_1, dtr1_1), that is, after the first iteration cycle, the terminal position is updated from the initial value ru_0 to ru_1, and the terminal clock error is updated from the initial value dtr1_0 to dtr1_1.

In some embodiments, when an iterative adjustment process converges, the estimation result may be checked, so as to further eliminate possible abnormal data, thereby further improving the accuracy of the estimation result. For example, after iteratively adjusting the initial estimated motion state until the preset condition is met, the method may further include:

testing, by using a hypothesis testing algorithm, the estimated motion state when the preset condition is met;

in response to failure of the test, according to the deviation information of the positioning information corresponding to the satellite in the positioning information set relative to the converted positioning information corresponding to the estimated motion state when the preset condition is met, eliminating the positioning information corresponding to at least one satellite from the positioning information set, to update the positioning information set, and performing the step of iteratively adjusting the initial estimated motion state by using the updated positioning information set; and using the estimated motion state when the preset condition is met as the estimated motion state of the terminal at the first moment in response to success of the test.

For example, Chi-squared test (Chi-square test/Chi-Square Goodness-of-Fit Test) can be performed on the output result (a calculation result associated with (ru_1, dtr1_1)) of an iteration cycle (herein referred to as the first iteration cycle). If the Chi-squared test count in the first iterative cycle is less than a test threshold, it means that the Chi-squared test is passed, the ru_1 can be determined as the terminal position of the user terminal 20a, and dtr1_1 can be determined as the terminal clock error of the user terminal 20a. The test threshold can be set according to actual needs, and the value of the test threshold is not limited in the present disclosure. The Chi-squared test is a widely used hypothesis test method for enumeration data. The Chi-squared test is only an example in the embodiments of the present disclosure, and other hypothesis test methods with similar functions are also applicable to the present disclosure. The test method is not limited herein.

If the Chi-squared test count of the first iterative cycle is greater than or equal to the test threshold, it means that the Chi-squared test is not passed, and then pseudo-range observation data that has not passed normal distribution test is eliminated from the pseudo-range observation data set 20b through the normal distribution test. For example, as shown in FIG. 2, if the pseudo-range observation data 2 fails the normal distribution test, the pseudo-range observation data 2 is determined as a pseudo-range observation data gross error, and the pseudo-range observation data 2 is eliminated from the pseudo-range observation data set 20b. The pseudo-range observation data that passes the normal distribution test is retained, that is, pseudo-range observation data 1, pseudo-range observation data 3, pseudo-range observation data 4, pseudo-range observation data 5, and pseudo-range observation data 6 are retained.

Subsequently, (ru_1, dtr1_1) can be used as the initial value of the estimated parameter x in a new iteration cycle (referred to as the second iteration cycle herein), and the retained pseudo-range observation data 1, pseudo-range observation data 3, pseudo-range observation data 4, pseudo-range observation data 5, and pseudo-range observation data 6 are used to continuously iteratively update (ru_1, dtr1_1). The iterative process of the second iterative cycle is the same as that of the first iterative cycle, and the estimated parameter x determined in the second iterative cycle is denoted as (ru_2, dtr1_2).

Similarly, a Chi-squared test can be performed on the output result (a calculation result associated with (ru_2, dtr1_2)) of the second iteration cycle. If the Chi-squared test is passed, the ru_2 is determined as the terminal position of the user terminal 20a, and dtr1_2 is determined as the terminal clock error of the user terminal 20a. For example, pseudo-range observation data 1, pseudo-range observation data 3, pseudo-range observation data 4, pseudo-range observation data 5, and pseudo-range observation data 6 can be combined into a pseudo-range observation data set 20d, and the pseudo-range observation data set 20d is obtained after eliminating gross error observation data in the pseudo-range observation data set 20b. In some embodiments, if the Chi-squared test still fails in the second iterative cycle, the normal distribution test is still used to eliminate gross errors in the pseudo-range observation data, and the next iterative cycle is entered until the Chi-squared test is passed.

For the Doppler observation data set 20c, the terminal velocity and the terminal clock drift of the user terminal 20a may be used as an estimated parameter y, and the estimated parameter y may be denoted as (vu, dtr2). vu is used to indicate the terminal velocity, and dtr2 is used to indicate the terminal clock drift. The process of iteratively updating the estimated parameter y based on the Doppler observation data set 20c is similar to the iterative update process of the estimated parameter x based on the pseudo-range observation data set 20b, and is not repeated herein. The terminal velocity of the user terminal 20a is calculated as vu_2 by using the Doppler observation data set 20c, and the terminal clock drift is calculated as dtr2_2. After eliminating the gross error in Doppler observation data, the Doppler observation data set 20e (including Doppler observation data 2, Doppler observation data 4, and Doppler observation data 5) can be obtained. On the above basis, the terminal position ru_2, the terminal velocity vu_2, the terminal clock error dtr1_2, and the terminal clock drift dtr2_2 can be referred to as the terminal state information corresponding to the user terminal 20a, and the pseudo-range observation data set 20d and the Doppler observation data set 20e may be referred to as the first screened observation information.

In some embodiments, the terminal position and the terminal velocity in the terminal state information (ru_2, vu_2, dtr1_2, dtr2_2) are only preliminary results determined based on iterative update, and the preliminary results can be subject to subsequent processing to obtain the final terminal positioning result.

In the embodiments, after the estimated motion state of the terminal at the first moment is obtained through an iterative adjustment process, the error in the positioning information corresponding to the satellite may be estimated according to the estimated motion state and the positioning information.

In the embodiments, the measurement data of the satellite signal of each satellite can include at least one of the following: a satellite altitude angle, a signal-to-noise ratio of a satellite signal, the orientation of the satellite relative to the terminal, or the like. The error of the positioning information corresponding to each of the multiple satellites (also referred to as the error corresponding to the satellite for short) may be obtained by using the measurement data and a preset algorithm. For example, the observation error model of the satellite can be preset, and some parameters can be determined according to the actual measurement data of the satellite signal. After the measurement data of the satellite signal of the satellite is obtained, the measurement data can be processed to obtain the required parameter values, and parameters in the satellite observation error model can be assigned to obtain the corresponding error of the satellite. Since different satellites have different measurement data, such as signal-to-noise ratios, altitude angles, and orientations relative to the terminal, or the like, after the above processing, different satellites may have different errors, making the terminal positioning result more accurate.

In some embodiments, an error adjustment factor can also be used to adjust the error corresponding to the satellite, so that the error obtained according to the preset observation error model can be fine-tuned, to more accurately reflect errors of different satellites at the first moment. The error adjustment factor affects a weight of the positioning information of the satellite in the subsequent processing, and then affects the final positioning result. The adjustment method may include: applying the deviation information between the positioning information corresponding to each of the multiple satellites and the converted positioning information and the error corresponding to the satellite to a preset conversion relationship, to determine the error adjustment factor corresponding to the satellite. According to the conversion relationship, when first deviation information corresponding to a first satellite is greater than second deviation information corresponding to a second satellite, an error adjustment degree of a first error adjustment factor corresponding to the first satellite is larger than an error adjustment degree of a second error adjustment factor of corresponding to the second satellite.

In the embodiments, the method may further include: initializing the state prediction model and the state adjustment model. The initialization of the model can be performed at the initial stage when the terminal activates the positioning function, and can also be triggered as needed during the positioning process. The initialization may include:

setting the predicted motion state of the state prediction model as the estimated motion state of the terminal at the first moment; and obtaining an initial value of a parameter in the state adjustment model based on measurement data corresponding to each of the multiple satellites, the error, and the error adjustment factor.

In an embodiment, in designing the state adjustment model, the impact of one or more parameters of the satellite on the positioning result is taken into account, then the state adjustment model includes one or more variables, and the value of this or these variables can be determined by using one or more parameter values of the satellite. The one or more parameter values may be selected from multiple parameters in the measurement data of the satellite, an error corresponding to the satellite, and an error adjustment factor corresponding to the satellite. For example, when the state adjustment model is to simulate the impact of one or more parameters of the satellite on the positioning result by establishing a mathematical model, the algorithm obtained by solving the mathematical model can be used as the state adjustment model, and one or more variables in the algorithm are determined based on one or more parameters of the satellite.

In some embodiments, the state prediction model and the state adjustment model may be implemented by any algorithm, a state estimator, and the like. In some embodiments, the state prediction model and the state adjustment model may be implemented by a state observation filter (for example, a robust Kalman filter).

To further improve the accuracy of the terminal position and the terminal velocity, the result obtained through the above iterative update, that is, the estimated terminal state information (that is, the estimated motion state), can be used to establish a filter (the filter is also referred to as "target filter" herein, and the filter can be, for example, a robust Kalman filter), and the terminal state information (ru_2, vu_2, dtr1_2, and dtr2_2) is set as the initial state parameter corresponding to the target filter, that is, the initial state parameter of the filter is (ru_2, vu_2, dtr1_2, dtr2_2). The initial state parameter may refer to the state parameter of the filter at time TO. The state parameter at the next moment can be predicted by using the state parameter at TO. The state adjustment model can be implemented by the initial state covariance matrix of the filter corresponding to the initial state parameter. The state covariance matrix of the filter is used to represent the correlation between the state parameters of the filter, such as the correlation between the terminal position, the terminal velocity, the terminal clock error, and the terminal clock drift. The initial state covariance matrix can be determined through the calculation result obtained through the iterative update, for example, parameters of the initial state covariance matrix can be determined by using the measurement data, the error, and the error adjustment factor of each of the multiple satellites.

In some embodiments, in step S14, the predicting the predicted motion state of the terminal at the first moment by using the state prediction model may include: applying an adjusted motion state of the terminal at a second moment in the history motion state to the state prediction model, so that the state prediction model can calculate the predicted motion state of the terminal at the first moment based on a time difference between the first moment and the second moment; where the second moment is a moment at which the terminal is positioned for the last time before the first moment.

After the initial state parameter and the initial state covariance parameter of the filter are set, the time update of the filter can be performed. The time update herein can be understood as a state prediction process, that is, predicting the state parameter (that is, predicting the motion state) of the filter at the next moment and the state covariance matrix at the next moment based on the initial state parameter and the initial state covariance matrix. That is, the state parameter at the current moment can be predicted by using the history state parameter. The state parameter at the current moment may be referred to as a predicted state parameter (that is, predicted motion state). The process of determining the predicted state parameter is a time update (time update, also referred to as prediction) stage (also referred to as a state prediction stage) of the filter.

In some embodiments, the time update process of the filter includes the update of both the initial state parameter and the initial covariance matrix, a state parameter obtained through the time update is referred to as a predicted state parameter and is denoted as (ru_3, vu_3, dtr1_3, dtr2_3), and a state covariance matrix obtained through the time update is referred to as a predicted covariance matrix.

In some embodiments, in order to make the positioning result more accurate, before adjusting the predicted motion state, the satellite observation information may be processed to eliminate gross errors therein and correct clock jumps therein. For example, the method may include:

obtaining second converted positioning information converted from the predicted motion state;

obtaining deviation data of the positioning information relative to the second converted positioning information;

eliminating deviation data corresponding to at least one satellite from the deviation data through outlier detection, and eliminating positioning information corresponding to the at least one satellite from the positioning information set, to update the positioning information set; and performing clock jump detection on the deviation data after the elimination, and when a clock jump is detected, adjusting the predicted motion state and adjusting at least one parameter in the state adjustment model.

Here, the predicted motion state is used as a reference to perform outlier detection on the positioning information set, that is, the outlier detection is performed according to the deviation of the positioning information relative to the second converted positioning information corresponding to the predicted motion state.

Clock correction is performed on the deviation data after eliminating the gross error. Herein, the clock jump detection may include clock error jump detection and clock drift jump detection. When the positioning information includes pseudo-range information, and the deviation data is deviation data of the pseudo-range information, clock error jump detection is performed on the deviation data. When the positioning information includes Doppler information, and the deviation data is deviation data of the Doppler information, clock drift jump detection is performed on the deviation data.

Through the above processing, abnormal information in the positioning information set can be further eliminated, and clock correction is performed on the updated positioning information set to make the information more accurate.

In some embodiments, in order to make the positioning result more accurate, the model to be used may be verified and adjusted before adjusting the predicted motion state. For example, the method may include:

obtaining second converted positioning information converted from the predicted motion state;

obtaining a deviation data set of the positioning information corresponding to the satellite in the positioning information set relative to the second converted positioning information;

eliminating deviation data corresponding to at least one first satellite from the deviation data set through outlier detection, and eliminating positioning information corresponding to the at least one first satellite from the positioning information set, to update the positioning information set;

calculating a model verification parameter value based on the deviation data set, the state adjustment model, and the positioning information set;

in response to that the model verification parameter value meets a preset threshold condition, performing statistical distribution detection on the positioning information set, and eliminating positioning information corresponding to at least one satellite that fails statistical distribution detection, to update the positioning information set; and in response to that the model verification parameter value does not meet the preset threshold condition, initializing the state prediction model and the state adjustment model, and performing the step of predicting the predicted motion state of the terminal at the first moment state and adjusting the predicted motion state at the first moment based on the current positioning information set.

In this way, by verifying the model, when a verification parameter value meets a threshold condition, the satellite observation information that makes the model verification parameter abnormal is further eliminated from the positioning information set. When the verification parameter value does not meet the threshold condition, the model is initialized, and the method is executed again by using the current positioning information set that has undergone gross error elimination, so as to optimize the results obtained in each step and make the final positioning result more accurate.

In some embodiments, in the above step S15, the adjusting the predicted motion state at the first moment may include:

applying the positioning information set, the predicted motion state, the error corresponding to the satellite in the positioning information set, and the error adjustment factor to the state adjustment model, to obtain a motion state adjustment amount; and adjusting the predicted motion state by using the adjustment amount, to obtain the adjusted motion state of the terminal at the first moment.

It can be seen that when adjusting the predicted motion state, the predicted motion state, the updated positioning information set, the error corresponding to the satellite (that is, the remaining satellites after excluding some satellites), and the error adjustment factor are used at the same time, and the adjustment is based on the state adjustment model, and therefore the accuracy of the adjusted predicted motion state is higher.

In some embodiments, the error performance of the state prediction model can also be estimated, and the estimated error performance is used to adjust the state adjustment model, so that the adjustment process in step S15 can correct the prediction error of the state prediction model to a certain extent. For example, the method may further include: before calculating the motion state parameter adjustment amount, determining fluctuation information of at least one motion state parameter in the history motion state of the terminal;

obtaining probability information of various values of the at least one motion state parameter by using the fluctuation information;

estimating prediction error information of the state prediction model for the at least one motion state parameter according to the probability information; and adjusting the state adjustment model according to the prediction error information.

The fluctuation information of the motion state parameter can be obtained by statistically processing values of motion state parameters in the history motion state, for example, is reflected by statistics such as a variance. The probability information of various values of the motion state parameters can be obtained by means of statistical processing, for example, is represented by distribution functions or spectral densities.

In some embodiments, the method for adjusting the state adjustment model may include, for every motion state parameter, calculating an offset value based on prediction error information of the motion state parameter, and adding the offset value to an adjustment algorithm of the state adjustment model. In some embodiments, the method for adjusting the state adjustment model may include, for every motion state parameter, calculating an offset value based on prediction error information of the motion state parameter, and introducing the offset value in the algorithm related to the motion state parameter in the state adjustment model, so that the offset value affects the calculation of the adjustment amount of the motion state parameter in the predicted motion state by the state adjustment model.

In some embodiments, after adjusting the predicted motion state, a measurement transformation relationship in the state adjustment model can also be updated, including:

adjusting the state adjustment model based on the positioning information set, the error corresponding to the satellite in the positioning information set, and the error adjustment factor.

The measurement transformation relationship in the updated state adjustment model is used to adjust the predicted motion state of the terminal at the next moment after the first moment.

When the above step of adjusting the predicted motion state at the first moment is implemented by using a filter, the step is indicated as a measurement update process of the filter. After the filter completes the time update, that is, the state parameter of the filter is updated from the initial state parameter (that is, the above-mentioned terminal state information) to the predicted state parameter, the predicted state parameter of the filter can be subject to measurement update (which can also be referred to as correction) through the first screened observation information. In some embodiments, after the filter completes the time update, the filter can perform measurement update based on the predicted state parameter and the predicted state covariance matrix. The measurement update herein can be understood as the process of correcting the predicted state parameter obtained through the time update. The measurement update of the filter may include clock error and clock drift jump detection and repair, filter model verification and repair, filter fault detection and repair, and other processes.

In the measurement update (also referred to as update) stage of the filter, the correction is performed based on the predicted state parameter (that is, the predicted motion state) finally obtained in the time update stage. The filter is verified and repaired through the first screened observation information. First, a model verification parameter value of the filter is calculated. When the model parameter verification value does not meet a verification condition (for example, is greater than or equal to the model verification threshold, where the model verification threshold can be set based on the actual needs), it means that the filter is faulty, and the filter needs to be reset, that is, the initial state parameter of the filter is reset. When the model parameter verification value meets the verification condition (for example, is less than the model verification threshold), the first screened observation information can be tested (for example, normal distribution test, where normal distribution can also be referred to as Gaussian distribution), and observation information gross errors in the first screened observation information continue to be eliminated to obtain second screened observation information. The measurement update matrix (that is, the measurement transformation relationship in the state adjustment model) of the filter in the measurement update stage is constructed through the second screened observation information. In addition, the measurement variance matrix of the filter in the measurement update stage can also be constructed according to the satellite observation error factor, and the predicted state parameter of the filter can be subject to measurement update through the measurement update matrix and the measurement variance matrix to obtain the target state parameter. The target state parameter is a result obtained by the filter in the measurement update stage. After the target state parameter is obtained, the filter may be tested again through the second screened observation information, for example, test (for example, normal distribution test) is performed on the second screened observation information. If the test is passed, the target state parameter can be determined as the terminal position of the user terminal 10e. If the test is not passed, corresponding satellite observation information is eliminated from the second screened observation information, that is, satellite observation information in the second screened observation information that does not pass the test is eliminated to obtain new screened observation information (for the ease of description, the new screened observation information obtained is referred to as fourth screened observation information below). The measurement update matrix is reconstructed through the fourth screened observation information, the filter is subject to measurement update again until all the remaining satellite observation information has passed the test, and the state parameter of the filter at the current moment is output, where the state parameter is the terminal position of the user terminal 10e.

In this embodiment of the present disclosure, the terminal positioning process of the user terminal is implemented through the satellite observation information and the filter. In this process, the observation information gross error in the satellite observation information can be eliminated as much as possible through the test and repair process of the filter, so as to obtain a more accurate terminal positioning result.

That the filter implements the state prediction model and the state adjustment model is still used as an example for illustration. The first screening observation data needs to be used in the measurement update process of the filter (that is, the process of adjusting the predicted motion state). Because the first screening observation data includes the pseudo-range observation data set 20d belonging to the pseudo-range data type and the Doppler observation data set 20e belonging to the Doppler data type, the pseudo-range observation data set 20d and the Doppler observation data set 20e need to be independently processed.

For the pseudo-range observation data set 20d, clock error jump detection can be performed through the pseudo-range observation data in the pseudo-range observation data set 20d and the predicted state covariance matrix. If it is detected that the filter has a clock error jump, clock error jump repair is performed on the filter, that is, the state parameter and the state covariance matrix of the filter are reset, that is, are updated based on the predicted state parameter and the predicted state covariance matrix. If no clock error jump is detected, no clock error jump repair is required. At the same time, for the Doppler observation data set 20e, clock drift jump detection can be performed through the Doppler observation data in the Doppler observation data set 20e and the predicted state covariance matrix. If it is detected that the filter has a clock drift jump, clock drift jump repair is performed on the filter, that is, the state parameter and the state covariance matrix of the filter are reset, that is, are updated based on the predicted state parameter and the predicted state covariance matrix. If no clock drift jump is detected, no clock drift jump repair is required.

After the clock error and clock drift jump detection and repair are completed, filter model verification can be performed.

For example, a model verification parameter value is calculated. The model verification parameter value may include a pseudo-range verification parameter value and a Doppler verification parameter value. The pseudo-range verification parameter value can be determined based on the state covariance matrix and the pseudo-range observation data set 20d obtained after the clock error and clock drift jump detection and repair. The Doppler verification parameter value can be determined based on the state covariance matrix and the Doppler observation data set 20e obtained after the clock error and clock drift jump detection and repair. When the pseudo-range verification parameter value is greater than or equal to a pseudo-range verification threshold, or the Doppler verification parameter value is greater than or equal to a Doppler verification threshold, it means that the filter has not passed the model verification, and the filter needs to be repaired, that is, the initial state parameter and the initial state covariance matrix of the filter are reset, and time update and measurement update are performed based on the reset initial state parameter and initial state covariance matrix. When the pseudo-range verification parameter value is less than the pseudo-range verification threshold, and the Doppler verification parameter value is less than the Doppler verification threshold, it means that the filter has passed the model verification, where the pseudo-range verification threshold and the Doppler verification threshold can both be different values set based on actual needs, and the pseudo-range verification threshold and the Doppler verification threshold can be collectively referred to as the model verification threshold.

If the filter passes the model verification, observation data that causes the filter to diverge can be eliminated from the pseudo-range observation data set 20d and the Doppler observation data set 20e through normal distribution test, that is, the pseudo-range observation data set 20f is screened out from the pseudo-range observation data set 20d, and the Doppler observation data set $20g$ is screened out from the Doppler observation data set $20e$. For example, the pseudo-range observation data set $20d$ and the Doppler observation data set $20g$ can be referred to as the second screened observation information. The filter can be subject to measurement update through the pseudo-range observation data set $20d$ and the Doppler observation data set $20g$ to obtain the target state parameter and the target state covariance matrix. The target state parameter can be denoted as (ru_4, vu_4, dtr1_4, dtr2_4).

In some embodiments, after adjusting the predicted motion state, the adjusted motion state can also be used to further test satellite observation information, so that more abnormal satellite observation information can be eliminated, thereby improving the accuracy of terminal positioning. For example, the method may further include:

obtaining third converted positioning information converted from the adjusted motion state;

obtaining a deviation data set of the positioning information corresponding to the satellite in the positioning information set relative to the third converted positioning information;

performing statistical distribution detection on the deviation data set;

eliminating, from the positioning information set, positioning information of at least one satellite that fails statistical distribution detection, to update the positioning information set; and adjusting the predicted motion state by using the updated positioning information set.

In some embodiments, after adjusting the predicted motion state, the adjustment amount of the predicted motion state can also be used for test, and when the test is not passed, the current positioning information set is used to execute the above method again, thereby improving the accuracy of terminal positioning. For example, the method may further include:

obtaining an adjustment amount of the adjusted motion state relative to the predicted motion state; and in response to that the adjustment amount does not meet a preset threshold condition, initializing the state prediction model and the state adjustment model, and performing the step of predicting the predicted motion state of the terminal at the first moment state and adjusting the predicted motion state based on the current positioning information set.

For example, when the filter correction amount of the filter (that is, a difference between the state parameter at the next moment and the state parameter at the previous moment, that is, the adjustment amount of the predicted motion state) passes verification, and all the second screened observation information passes the normal distribution test, the terminal position ru_4 and the terminal velocity vu_4 in the target state parameter can be used as the terminal positioning result of the user terminal $20a$.

In some embodiments, assuming that the user terminal $20a$ is a smart phone, in a positioning and navigation application scenario of the phone terminal, after obtaining the terminal position and the terminal velocity of the user terminal $20a$, the user of the user terminal $20a$ can be provided with an accurate navigation path in the navigation application. For example, as shown in a navigation page $20h$ shown in FIG. 2, the position S1 is the position of the user terminal $20a$ (that is, the terminal position) in the electronic map, and an area $20i$ is a real-time traffic condition of a route where the user terminal $20a$ is located. Different colors represent different road conditions. For example, a black area indicates that the road section is heavily congested, a gray area indicates that the path is slightly congested, and a white area indicates that the road is not congested.

In some embodiments, assuming that the user terminal $20a$ is a vehicle-mounted terminal, in a lane-level navigation application in a road scenario, after obtaining the terminal position and the terminal velocity of the user terminal $20a$, a lane-level driving route can be provided for the user terminal $20a$, for example, as shown in a navigation page $20j$ in FIG. 2. A position $20k$ is a lane driving position (that is, the terminal position) of the user terminal $20a$ on the road, and the black line is used to indicate the lane driving path of the user terminal $20a$, that is, the terminal positioning result can be accurate to the lane where the user terminal $20a$ is located, so as to implement the lane-level positioning of the user terminal $20a$.

FIG. 3 is a schematic flowchart of a terminal positioning method according to an embodiment of the present disclosure. The terminal positioning method can be executed by a computer device, and the computer device can be an electronic device integrated with a satellite positioning device, such as any user terminal in the user terminal cluster shown in FIG. 1A, or any terminal that needs to be positioned. In one embodiment, the computer device may include any mobile terminal disclosed herein or may be a component included in any mobile terminal.

As shown in FIG. 3, the terminal positioning method may include the following steps.

Step S101: Determine, based on satellite observation information, terminal state information corresponding to a terminal, and obtain first screened observation information from the satellite observation information according to the terminal state information.

In some embodiments, the computer device may send an ephemeris obtaining request to a CORS system. After receiving the ephemeris obtaining request, a high-precision positioning service platform of the CORS system can obtain the real-time satellite navigation ephemeris from a satellite ephemeris database, and transmit the real-time satellite navigation ephemeris to the computer device in the form of binary streams. For example, the computer equipment can receive the satellite navigation ephemeris broadcast by the high-precision positioning service platform of the CORS system. The computer device can also receive satellite observation information broadcast by the high-precision positioning service platform of the CORS system. The satellite navigation ephemeris may include a set of parameter lists for determining satellite positions, and the satellite ephemeris database may include navigation ephemeris of all satellites. Satellite observation information may include at least one of pseudo-range observation data and Doppler observation data. The computer device in the present disclosure may be a terminal to be positioned.

According to the satellite observation information and the satellite navigation ephemeris, satellite state information corresponding to each satellite is obtained. When the satellite observation information only includes pseudo-range observation data, the satellite state information includes a satellite position and a satellite clock error. When the satellite observation information only includes Doppler observation data, the satellite state information includes a satellite velocity (that is, a satellite running velocity) and a satellite clock drift. When the satellite observation information includes pseudo-range observation data and Doppler observation data, the satellite state information includes a satellite position, a satellite clock error, a satellite velocity, and a satellite clock drift. A number of satellites can be N (N is a positive integer), one satellite corresponds to one pseudo-range observation data, one Doppler observation data, one satellite position, one satellite clock error, one satellite velocity, and one satellite clock drift, and satellite positions, satellite clock errors, satellite velocities, and satellite clock drifts corresponding to satellites may be different. For example, when the satellite observation information includes pseudo-range observation data, the satellite position and the satellite clock error corresponding to each satellite can be calculated based on the received pseudo-range observation data and satellite navigation ephemeris, that is, a time of receiving a signal transmitted by the satellite is obtained, a time of transmitting the signal transmitted by the satellite is determined according to the initial pseudo-range observation value, the receiving time, and a light velocity value, and then the satellite position and the satellite clock error corresponding to the satellite are determined according to the transmitting time and a parameter list included in the satellite navigation ephemeris. Similarly, when the satellite observation information includes Doppler observation data, the satellite velocity and the satellite clock drift corresponding to each satellite can be calculated based on the received Doppler observation data and satellite navigation ephemeris.

After the satellite observation information and the satellite state information are obtained, a satellite observation equation between the terminal and the satellite can be constructed according to the satellite observation information and the satellite state information. The terminal state information corresponding to the terminal can be obtained through the satellite observation equation, and based on the terminal state information, the first screened observation information can be obtained from the satellite observation information corresponding to the N satellites (for example, the pseudo-range observation data set 20d and the Doppler observation data set 20e in the embodiment corresponding to FIG. 2). The satellite observation information received by the terminal may have observation information gross errors. Therefore, for calculating the terminal state information, some observation information gross errors may be eliminated from the satellite observation information corresponding to the N satellites. The satellite observation information actually used to calculate the terminal state information is only a part of the satellite observation information corresponding to the N satellites, and therefore, the satellite observation information actually used to determine the terminal state information can be determined as the first screened observation information. For example, if satellite observation information of satellite i of the satellite observation information corresponding to the N satellites is an observation information gross error, the satellite observation information of satellite i may be eliminated. When the terminal state information is estimated based on satellite observation information of satellites other than satellite i, the satellite observation information of satellites of the N satellites other than satellite i may be used as the first screened observation information. The number of the first screened observation information is less than or equal to the total number of all satellite observation information received by the terminal. For example, when the first screened observation information is pseudo-range observation data, the number of the first screened observation information is less than or equal to N (the number of satellites, that is, the total number of pseudo-range observation data received by the terminal).

It can be understood that the satellite observation information, the satellite state information, and the terminal state information in the embodiments of the present disclosure are correlated. For example, when the satellite observation information is pseudo-range observation data, the corresponding satellite state information is a satellite position and a satellite clock error, and the corresponding terminal state information is a terminal position and a terminal clock error. When the satellite observation information is Doppler observation data, the corresponding satellite state information is a satellite velocity and a satellite clock drift, and the corresponding terminal state information is a terminal velocity and a terminal clock drift. When the satellite observation information includes pseudo-range observation data and Doppler observation data, the corresponding satellite state information is a satellite position, a satellite clock error, a satellite velocity and a satellite clock drift, and the corresponding terminal state information is a terminal position, a terminal clock error, a terminal velocity and a terminal clock drift, which are not explained below.

If the terminal receives the pseudo-range observation data corresponding to N satellites, based on the pseudo-range observation data and the satellite position and the satellite clock error in the satellite state information, the following pseudo-range observation equation can be constructed:

$$
\begin{bmatrix} \tilde{\rho}_1 \\ \tilde{\rho}_2 \\ \vdots \\ \tilde{\rho}_N \end{bmatrix} = \begin{bmatrix} \|r_u - r^1\| + c \cdot dt_r - c \cdot dt^1 + \zeta^1 \\ \|r_u - r^2\| + c \cdot dt_r - c \cdot dt^2 + \zeta^2 \\ \vdots \\ \|r_u - r^N\| + c \cdot dt_r - c \cdot dt^N + \zeta^N \end{bmatrix} \tag{1}
$$

$\tilde{\rho}_i$, i=1, 2, . . . , N is the pseudo-range observation data received by the terminal, ru is the terminal position, ri is the satellite position corresponding to satellite i, dtr is the terminal clock error, dti is the satellite clock error corresponding to satellite i, c is a light velocity in vacuum, $\zeta$i is an error correction number (ionosphere, troposphere, and earth rotation correction are included, and the number can be calculated based on an empirical model), and $\|ru-ri\|$ can be used to denote a Euclidean distance between the terminal position ru and the satellite position ri. In the above formula (1), all parameters other than the terminal position ru and the terminal clock error dtr are known, and based on the pseudo-range observation equation shown in the formula (1), the terminal position and the terminal clock error of the terminal can be estimated.

In some embodiments, if the terminal receives the Doppler observation data corresponding to N satellites, based on the Doppler observation data and the satellite velocity and the satellite clock drift in the satellite state information, the following Doppler observation equation can be constructed:

$$
\begin{bmatrix} \lambda \tilde{D}_u^1 \\ \lambda \tilde{D}_u^2 \\ \vdots \\ \lambda \tilde{D}_u^N \end{bmatrix} = \begin{bmatrix} (v^1 - v_u) \cdot \dfrac{r_u - r^1}{\|r_u - r^1\|} + c \cdot \dot{d}t_r - c\dot{d}t^1 \\ (v^2 - v_u) \cdot \dfrac{r_u - r^2}{\|r_u - r^2\|} + c \cdot \dot{d}t_r - c\dot{d}t^2 \\ \vdots \\ (v^N - v_u) \cdot \dfrac{r_u - r^n}{\|r_u - r^N\|} + c \cdot \dot{d}t_r - c\dot{d}t^N \end{bmatrix} \tag{2}
$$

$$
\tilde{D}_u^i, i = 1, 2, \ldots, N
$$

is the Doppler observation data received by the terminal, $\lambda$ is the wavelength of the signal transmitted by the satellite, $v^i$, i=1, 2, . . . , N is a satellite velocity corresponding to satellite i, $\dot{d}t_r$ is the terminal clock drift, $v_u$ is the terminal velocity, and $\dot{d}t^i$ is the satellite clock drift corresponding to satellite i. Based on the Doppler observation equation shown in the formula (2), the terminal velocity and the terminal clock drift of the terminal can be estimated. When solving the terminal velocity and the terminal clock drift corresponding to the terminal, the terminal position of the terminal and the corresponding satellite position of each satellite need to be provided. In the embodiments of the present disclosure, the pseudo-range observation equation shown in formula (1) and the Doppler observation equation shown in formula (2) may be collectively referred to as satellite observation equations.

Step S102: Set the terminal state information as an initial state parameter of a filter, and obtain an initial state covariance matrix of the filter for the initial state parameter.

This step is to initialize the state prediction model and the state adjustment model. In some embodiments, after obtaining the terminal state information corresponding to the terminal and the first screened observation information, a filter can be established based on the terminal state information, that is, the filter is initialized through the terminal state information, and the terminal state information is set as the initial state parameter of the filter. The number of state parameters of the filter depends on the number of parameters included in the terminal state information. For example, when the terminal state information includes the terminal position, the terminal clock error, the terminal velocity, and the terminal clock drift, the initial state parameter of the filter can be set as $z(0)=[r_u\, v_u\, dtr\, dtr]^T$, where [.]T represents the transpose of the matrix, and $z(0)$ represents the initial state parameter of the filter. At the same time, the initial state covariance matrix of the filter for the initial state parameter (that is, the measurement transformation relationship in the state adjustment model) can be further obtained. The initial state covariance matrix can be used to represent the correlation between initial state parameters. The initial state covariance matrix is a diagonal matrix and is also a symmetric matrix. The initial state covariance matrix can be determined by using the first screened observation information and the initial state parameter.

The filter can be a recursive filter, for example, the filter can include but is not limited to: a Kalman Filter (EKF), an extended Kalman filter (EKF), an unscented Kalman Filter, a robust Kalman Filter, and the like. The type of the filter is not limited in this embodiment of the present disclosure. For the ease of description, this embodiment uses a robust Kalman filter as an example for explanation.

Step S103: Perform time update on the initial state parameter of the filter to obtain the predicted state parameter, and perform time update on the initial state covariance matrix of the filter to obtain a predicted state covariance matrix.

In some embodiments, after the filter is initialized, time update may be performed on the filter, so that the initial state parameter of the filter is updated to the predicted state parameter (that is, the predicted motion state), and the initial state covariance matrix is updated to the predicted state covariance matrix. In the time update process of the filter, state parameter prediction may be performed based on the initial state parameter. The state parameter of the filter after the time update is completed may be referred to as a predicted state parameter, and the state covariance matrix of the filter for the predicted state parameter may be referred to as a predicted state covariance matrix.

In the time update process of the filter, the initial state parameter of the filter may be updated for multiple times. The initial state parameter of the filter is denoted as $z(0)$, and the initial state covariance matrix of the filter is denoted as $P(0)$. $z(0)$ can be considered as the state parameter of the filter at time 0, and $P(0)$ can be considered as the state covariance matrix of the filter at time 0. The next (moment 1) state parameter for time update of the filter can be denoted as $z(1)$, and the next state covariance matrix can be denoted as $P(1)$. By analogy, the state parameter of the filter at time t can be denoted as $z(t)$, and the state covariance matrix at time t can be denoted as $P(t)$. Assuming that the current moment is time t, $z(t)$ is the predicted state parameter of the filter, and $P(t)$ is the predicted state covariance matrix of the filter.

Step S104: Select, from the first screened observation information, second screened observation information used to construct a measurement update matrix of the filter, and construct, according to a satellite observation error factor determined based on the terminal state information, a measurement variance matrix corresponding to the filter.

In some embodiments, after the time update of the filter is completed, measurement update of the filter may continue to be performed. The state parameter at the beginning of the measurement update process is the predicted state parameter when time update of the filter is completed, and the state covariance matrix at the beginning of the measurement update process is the predicted state covariance matrix when the time update of the filter is completed. Model verification can be performed on the filter when measurement update is performed on the filter. If the filter passes the model verification, the second screened observation information for constructing the measurement update matrix of the filter can be selected from the first screened observation information through normal distribution test. If the filter does not pass the model verification, model repair of the filter needs to be performed, for example, the initial state parameter and the initial state covariance matrix of the filter are reset.

The model verification of the filter can include: An observation variance matrix (that is, a matrix composed of errors of satellites) is constructed through a signal-to-noise ratio corresponding to the first screened observation information and an altitude angle of the satellite corresponding to the first screened observation information. For example, the observation variance matrix corresponding to the first screened observation information may be referred to as a first observation variance matrix. The model verification parameter value corresponding to the filter can be determined based on the first observation residual matrix, the predicted state covariance matrix, a Jacobian matrix of the first screening observation data for the predicted state parameter, and the first observation variance matrix. The observation residual matrix can refer to a matrix obtained by performing subtraction on formulas on two sides of the satellite observation equation, for example, a matrix obtained by performing subtraction on two sides of the equal sign of the pseudo-range observation equation in formula (1), and can be referred to as an observation residual matrix constructed by N pieces of pseudo-range observation data received by the terminal. Based on the same principle, the observation equation corresponding to the first screened observation information can be constructed based on the first screened observation information, the satellite state information of the satellite corresponding to the first screened observation information, and the predicted state information, and subtraction may be performed on formulas on two sides of the equal sign of the observation equation to obtain the first observation residual matrix. The Jacobian matrix is a matrix in which first-order partial derivatives are arranged in a specific manner, and a determinant of the Jacobian matrix is referred to as a Jacobian determinant.

In one or more embodiments, before the model verification parameter value corresponding to the filter is obtained, gross error detection processing may be performed on the first observation residual matrix according to the quartile and the absolute median difference of the first observation residual matrix, to obtain a second observation residual matrix. In other words, based on the quartile and the absolute median difference of the first observation residual matrix, observation information gross errors are eliminated from the first screened observation information to obtain third screened observation information. The observation residual matrix constructed by the third screened observation information may be referred to as a second observation residual matrix. For example, the signal-to-noise ratio corresponding to the third screened observation information and the altitude angle of the satellite corresponding to the third screened observation information may be used to construct an observation variance matrix. The observation variance matrix corresponding to the third screening observation matrix may be referred to as a first variance matrix. The model verification parameter value corresponding to the filter can be determined based on the second observation residual matrix, the predicted state covariance matrix, a Jacobian matrix of the second observation residual matrix for the predicted state parameter, and the first observation variance matrix. The number of the third screened observation information is less than or equal to the number of the first screened observation information.

The quartile may refer to sorting elements in the first observation residual matrix. A sorted observation residual sequence is divided into four equal parts. Among elements at split points in the sorted observation residual sequence, an element at the one-quarter split point is referred to as a lower quartile, an element at the half split point is referred to as a median, and an element at the three-quarter split point is referred to as an upper quartile, that is, the quartile can include a lower quartile, a median, and an upper quartile. The absolute median difference is a median of absolute values of new data obtained by subtracting the median from the elements in the first observation residual matrix. The absolute median difference is a measure of statistical dispersion. Gross error detection processing can be implemented by using a gross error detection method. The method of performing gross error detection processing based on the quartile and the absolute median is only an example in the embodiments of the present disclosure. For example, in addition to the gross error detection method described above, any other form of gross error detection method can also be used, for example, sequential gross error detection based on normal distribution and gross error detection based on the quartile and the absolute median difference. The present disclosure does not limit the gross error detection method for eliminating gross errors in satellite observation information.

In one or more embodiments, when the first screening observation data is pseudo-range observation data, clock error jump detection may be performed on the filter by using the first screened observation information and the predicted state covariance matrix, and if it is detected that the filter has a clock error jump, clock error jump repair is performed on the filter, that is, the state parameter and the state covariance parameter of the filter are updated. If the filter has no clock error jump, the filter can retain the current state parameter and state covariance matrix. When the first screening observation data is Doppler observation data, clock drift jump detection may be performed on the filter by using the first screened observation information and the predicted state covariance matrix, and if it is detected that the filter has a clock drift jump, clock drift jump repair is performed on the filter, that is, the state parameter and the state covariance parameter of the filter are updated. If the filter has no clock drift jump, the filter can retain the current state parameter and state covariance matrix. In some embodiments, if the third screened observation information is selected from the first screened observation information through gross error detection processing, clock error and clock drift jump detection and repair can be performed based on the third screened observation information and the predicted state covariance matrix. After the filter completes clock error and clock drift jump detection and repair, the model verification of the filter is performed, that is, the model verification parameter value corresponding to the filter is obtained.

When the model verification parameter value of the filter is less than a model verification threshold (that is, the model verification parameter value meets a preset threshold condition, and the model verification threshold can be set according to actual needs and is not limited in the present disclosure), standardized processing may be performed on the model verification parameter to obtain a standardized residual matrix. By performing normal distribution test on the standardized residual matrix, a test result corresponding to each element included in the standardized residual matrix is obtained. If a test result corresponding to the $l^{th}$ element in the standardized residual matrix does not meet the test condition, it is determined that the $l^{th}$ element has not passed the normal distribution test, and satellite observation information corresponding to the $l^{th}$ element is eliminated from the first screened observation information, to obtain the second screened observation information. l is a positive integer less than or equal to the number of the first screened observation information. In some embodiments, when the model verification parameter value is greater than or equal to the model verification threshold (that is, the model verification parameter value does not meet the preset threshold condition), the initial state parameter and the initial state covariance matrix of the filter are reset, that is, the filter is reset.

In some embodiments, if the third screened observation information is selected from the first screened observation information through gross error detection processing, the satellite observation information corresponding to the $l^{th}$ element can be eliminated from the third screened observation information, to obtain the second screened observation information. For example, l is a positive integer less than or equal to the number of third screened observation information.

In some embodiments, after the second screened observation information is determined, a third observation residual matrix can be constructed by using the second screened observation information, the predicted state parameter (that is, the state parameter of the filter at the current moment), and the satellite state information, and a Jacobian matrix of the third observation residual matrix for the predicted state parameter is determined as the measurement update matrix corresponding to the filter. The satellite observation error factor (that is, the error adjustment factor) can be obtained when determining the terminal state information, and the satellite observation error factor can also be referred to as a random error model factor. The satellite observation error factor may include at least one of a pseudo-range observation random error model factor and a Doppler observation random error model factor. The pseudo-range observation random error model factor can be used to measure the degree of difference between pseudo-range observation data and actual data, and the Doppler observation random error model factor can be used to measure the degree of difference between Doppler observation data and actual data. Through the satellite observation error factor and the random error model corresponding to each satellite (used to estimate the error corresponding to each satellite), the measurement variance matrix corresponding to the filter can be constructed. The measurement variance matrix can be a matrix with fixed values or can be determined based on an empirical model.

Step S105: Perform measurement update on the predicted state parameter of the filter based on the measurement update matrix, the second screened observation information, the predicted state covariance matrix, and the measurement variance matrix, to obtain a target state parameter, and determine, according to the target state parameter, a terminal positioning result corresponding to the terminal.

In some embodiments, measurement update may be performed on the predicted state parameter of the filter based on the measurement update matrix, the second screened observation information, the predicted state covariance matrix, and the measurement variance matrix, to obtain a target state parameter and a target state covariance matrix. The difference between the target state parameter and the previous state parameter can be determined as a filter correction amount corresponding to the filter. When the filter correction amount passes the test (the correction threshold can be set according to actual needs or experience), a second residual covariance matrix corresponding to the filter can be constructed based on the target covariance matrix, the measurement variance matrix, and the measurement update matrix. Normal distribution test is performed on the third observation residual matrix through the second residual covariance matrix, to obtain a test result corresponding to each element included in the third observation residual matrix. If the test result corresponding to each element in the third observation residual matrix meets the test condition, the target state parameter is determined as the terminal positioning result corresponding to the terminal. In some embodiments, the terminal positioning result obtained in the embodiments of the present disclosure can be applied to the positioning and navigation application scenario of a mobile terminal (for example, electronic map application), and can also be applied to the lane-level navigation application scenario, and can achieve sub-meter-level or lane-level positioning. Sub-meter positioning means that the precision of the terminal positioning result can reach decimeters, centimeters, or even millimeters.

In some embodiments, if the filter correction amount is greater than or equal to the correction threshold, it indicates that the filter is faulty, and the filter needs to be reset. If an element in the third observation residual matrix fails the test, the satellite observation information corresponding to the element is eliminated, the fourth screened observation information is determined from the second screened observation information, and the measurement update matrix is reconstructed through the fourth screened observation information.

In the embodiments of the present disclosure, the terminal state information corresponding to the terminal can be estimated through satellite observation information, a filter can be established based on the terminal state information, gross observation information errors are eliminated from the satellite observation information through two processes of filter time update and filter measurement update, and the terminal positioning result corresponding to the terminal is determined based on the satellite observation information from which the gross observation information errors are eliminated, which can improve the accuracy of the terminal position and implement sub-meter-level or lane-level positioning and assist lane-level positioning and navigation.

Figure 4:
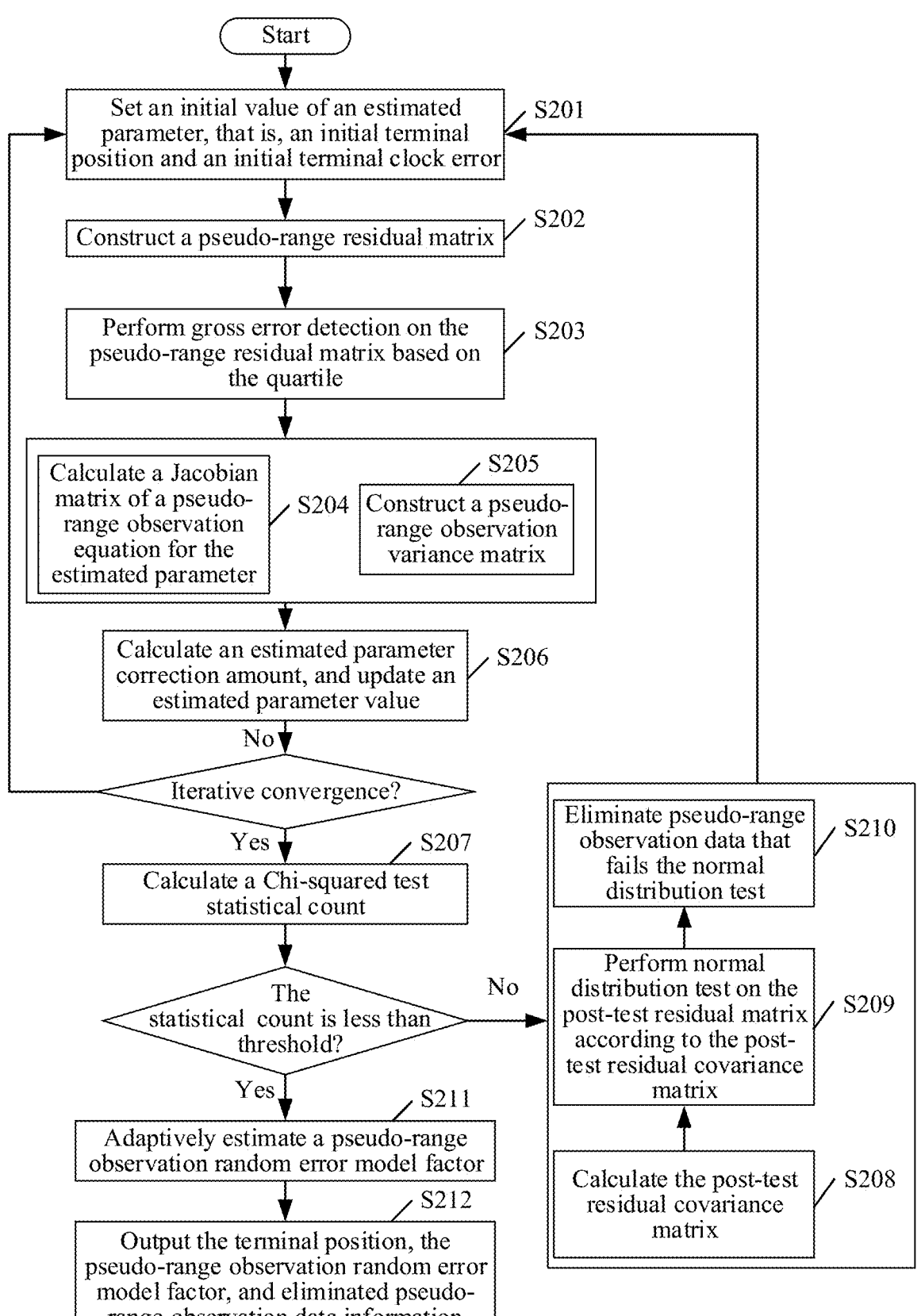
FIG. 4 is a schematic flowchart for estimating a terminal position and a terminal clock error in terminal state information according to an embodiment of the present disclosure.
Figure 5:
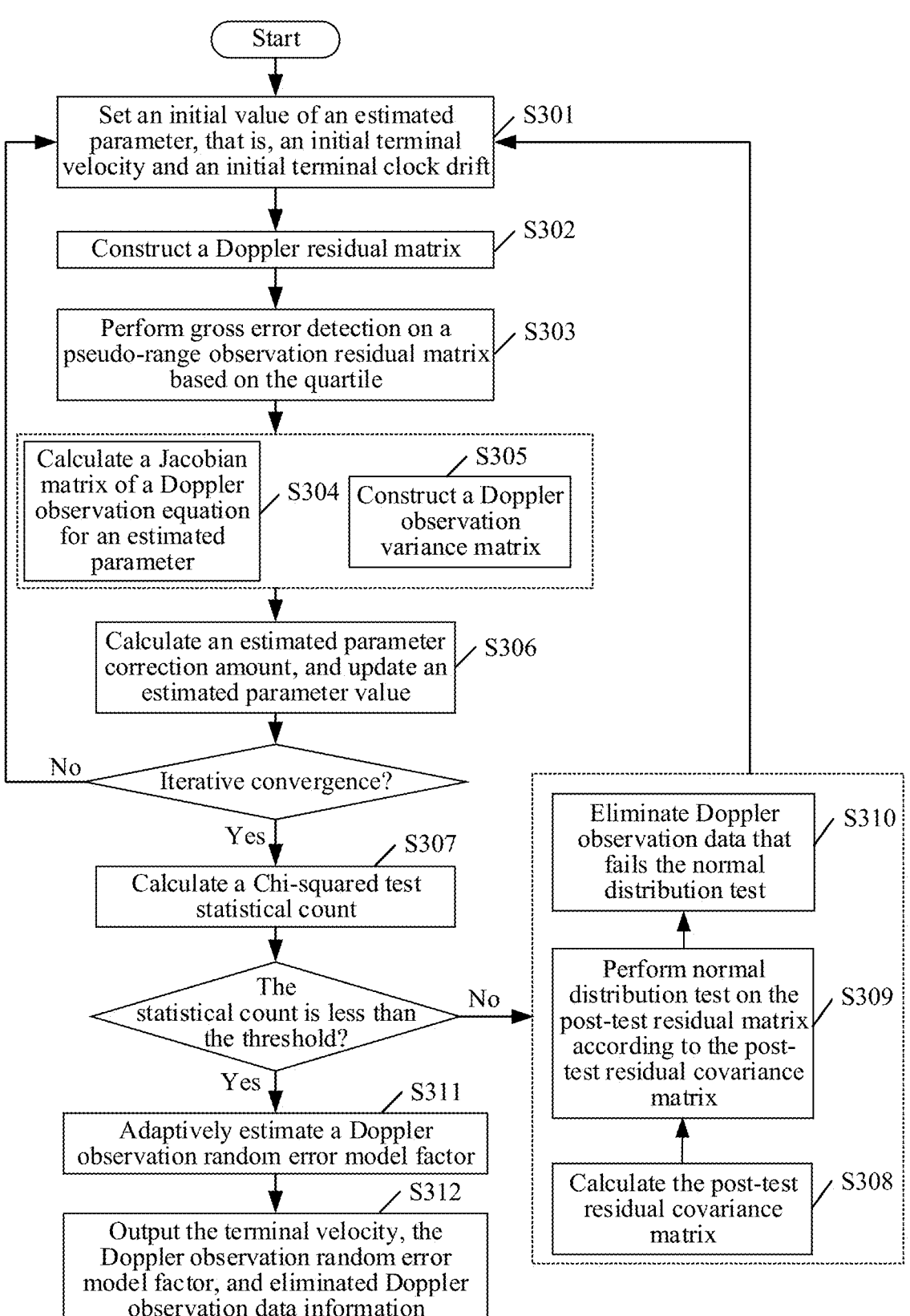
FIG. 5 is a schematic flowchart for estimating a terminal velocity and a terminal clock drift in terminal state information according to an embodiment of the present disclosure.

The process of determining the terminal state information is described in detail below through FIG. 4 and FIG. 5. FIG. 4 and FIG. 5 are examples of implementations of step S11 in the embodiment in FIG. 1B and step S101 in the embodiment corresponding to FIG. 3. When the satellite observation information includes pseudo-range observation data and Doppler observation data, after the satellite state information corresponding to N (N is a positive integer) satellites is obtained, the pseudo-range observation equation shown in formula (1) can be constructed for the N pieces of pseudo-range observation data, and the Doppler observation equation shown in formula (2) can be constructed for the N Doppler observation equations. In some embodiments, the terminal position and the terminal clock error corresponding to the terminal can be estimated by using the robust weighted least squares algorithm and the pseudo-range observation equation. The terminal velocity and the terminal clock drift corresponding to the terminal are estimated by using the robust weighted least squares algorithm and the Doppler observation equation. The terminal position, the terminal velocity, the terminal clock error, and the terminal clock drift can be referred to as terminal state information. The robust weighted least squares algorithm is an organic combination of the robust estimation principle and the least squares form through equivalent weights. The main body of the measured value generally conforms to the normal distribution. The least square method is a mathematical optimization method. The robust weighted least squares algorithm is only an example provided by the embodiments of the present disclosure, and mathematical optimization methods other than the robust weighted least squares algorithm are also applicable, such as the Newton's method and the stochastic gradient descent method, which is not limited in the present disclosure.

FIG. 4 is a schematic flowchart for estimating a terminal position and a terminal clock error in terminal state information according to an embodiment of the present disclosure. As shown in FIG. 4, the process of estimating the terminal position and the terminal clock error can include the following steps:

Step S201: Set an initial value of the estimated parameter, that is, an initial estimated motion state, which may include an initial terminal position and an initial terminal clock error.

In some embodiments, for the N pieces of pseudo-range observation information in the satellite observation information received by the terminal, the terminal position and the terminal clock error can be estimated by using the robust weighted least squares algorithm and the N pieces of pseudo-range observation information. Assuming that the estimated parameter is $$x_u = \begin{bmatrix} r_u \\ dt_r \end{bmatrix},$$

the specific process of using the robust weighted least squares algorithm may include: The initial value of the estimated parameter $x_u$ is set, that is, the initial state information is set for the terminal. The initial state information in this case may include the initial terminal position and the initial terminal clock error and is denoted as $$x_{u,0} = \begin{bmatrix} r_{u,o} \\ dt_{r,o} \end{bmatrix},$$

for example ru_0 and dtr1_0 in the corresponding embodiment in FIG. 2. The purpose of using the robust weighted least squares algorithm is to continuously iteratively update the estimated parameter xu to obtain the estimated values of the terminal position and the terminal clock error.

Step S202: Construct a pseudo-range residual matrix.

In some embodiments, the satellite observation equation between the terminal and the satellite is constructed based on satellite observation information, the initial state information, and satellite state information corresponding to the satellite. For example, the satellite observation information includes N pieces of pseudo-range observation data, the initial state information may include the initial terminal position $r_{u,0}$ and the initial terminal clock error $dt_{r,0}$, and the satellite state information may include the satellite position and the satellite clock error. Therefore, the constructed satellite observation equation is essentially a pseudo-range observation equation. More specifically, a distance between the initial terminal position and the satellite position can be obtained, for example, $\|r_{u,0}-r^i\|$ (that is, a geometric distance between the initial terminal position and the satellite position corresponding to satellite i), and a clock error difference between the initial terminal clock error and the satellite clock error is obtained, for example, $dt_{r,0}-dt^i$. A first estimated value, for example, $\|r_{u,0}-r^i\|+c \cdot dt_{r,0}-c \cdot dt^i+\zeta^i$ between the terminal and the satellite can be determined according to the distance and the clock error difference, and the pseudo-range observation equation between the terminal and the satellite is constructed based on the first estimated value and the pseudo-range observation data. The form of the pseudo-range observation equation is shown in formula (1), and the only difference is that ru is replaced with $r_{u,0}$ and dtr is replaced with $dt_{r,0}$ in formula (1). Furthermore, subtraction may be performed on the two sides of the pseudo-range observation equation to obtain a pseudo-range residual matrix B0, which can also be referred to as the pseudo-range residual matrix for short. Elements in the pseudo-range residual matrix B0 can be denoted as a residual value between each pseudo-range observation data and estimated values obtained based on the initial terminal position, the satellite position, the initial terminal clock error, and the satellite clock error.

Step S203: Perform gross error detection on the pseudo-range residual matrix based on the quartile.

In some embodiments, after the pseudo-range residual matrix B0 is constructed, gross error detection can be performed on the pseudo-range residual matrix B0 based on a first anomaly detection method, and the pseudo-range observation data gross error is eliminated from the N pieces of pseudo-range observation data. Herein, the quartile method is used as an example of the first anomaly detection method to illustrate the gross error detection process. In other embodiments, other anomaly detection methods can also be used for gross error detection, which will not be repeated herein. Many different gross error detection solutions can be derived from the quartile-based gross error detection process in the specific implementation process. For example, for the same data, when gross error detection conditions are different, results obtained may also be different, and gross error detection solutions causing different results should be different. The following uses a quartile-based gross error detection solution as an example to describe the gross error detection process.

The elements in the pseudo-range residual matrix B0 are sorted in ascending order to obtain the sorted pseudo-range residual sequence. The sorted pseudo-range residual sequence can be referred to as a first sequence. An initial mask array mask[N]={0, 0, ..., 0} corresponding to the first sequence is obtained, the gross error detection may be performed on the first sequence according to the upper quartile and the lower quartile of the first sequence, for example, when any element in the first sequence is less than $M_{1/4}-1.5 \cdot (M_{3/4}-M_{1/4})$ or greater than $M_{3/4}+1.5 \cdot (M_{3/4}-M_{1/4})$, mask[i]=mask[i]+1; otherwise, no processing is performed, where i is a positive integer less than N. This operation is an update processing process for the initial mask array. $M_{1/4}$ is the lower quartile of the first sequence and $M_{3/4}$ is the upper quartile of the first sequence.

In some embodiments, subtraction may be performed on each element in the first sequence and the median of the first sequence, and an absolute value of a result obtained after the subtraction is obtained to obtain a new set of data. The new set of data can be referred to as a second sequence. The lower quartile (denoted as $\overline{M}_{1/4}$) and the upper quartile (denoted as $\overline{M}_{3/4}$) of the second sequence are obtained, when an element in the second sequence is greater than $\overline{M}_{1/4}-1.5 \cdot (\overline{M}_{3/4}-\overline{M}_{1/4})$ and less than $\overline{M}_{3/4}+1.5 \cdot (\overline{M}_{3/4}-\overline{M}_{1/4})$, the element can be added to a third sequence, that is, all the elements in the second sequence that meet the above condition are added to the third sequence, and the median (denoted as $\overline{M}_{2/4}$) of the third sequence is calculated. When any element in the first sequence $$B_0^{i\prime}$$

satisfies $$\frac{\left| B_0^{i\prime} - \overline{\overline{M}}_{2/4} \right|}{1.4826 \cdot \overline{\overline{M}}_{2/4}} > 3.0,$$

mask[i]=mask[i]+1; otherwise, no processing is performed. This operation is a process of updating the updated mask array again. The mask array obtained after this update can be referred to as a target mask array. If an $i^{th}$ element (that is, mask[i]) in the target mask array is greater than or equal to 1, it is determined that pseudo-range observation data corresponding to the $i^{th}$ element in the first sequence is a gross error, and then the pseudo-range observation data corresponding to the $i^{th}$ element is eliminated. If mask[i]=0, the pseudo-range observation data corresponding to the it element in the first sequence is retained. Through the above gross error detection process, some pseudo-range observation data gross errors can be eliminated from the N pieces of pseudo-range observation data, and pseudo-range observation data after the gross error elimination can be obtained and can be referred to as fifth screened observation information. It is assumed that the fifth screened observation information includes n1 pieces of pseudo-range observation data, and n1 is a positive integer less than or equal to N. When n1 is less than N, the pseudo-range residual matrix B0 needs to be reconstructed based on the fifth screened observation information. Compared with the previous pseudo-range residual matrix, the number of rows of the reconstructed B0 becomes smaller.

In some embodiments, step S203 can be skipped, and step S204 is directly performed after step S202, and then step S204 and subsequent steps are all performed on the basis of the N pieces of pseudo-range observation data. If the number of pseudo-range observation data obtained after step S203 becomes n1, step S204 and subsequent steps are all performed on the basis of n1 pieces of pseudo-range observation data. For the ease of description, the subsequent steps in the embodiments of the present disclosure are all performed on the basis of n1 pieces of pseudo-range observation data, which will not be explained later.

Step S204: Calculate a Jacobian matrix of the pseudo-range observation equation for the estimated parameter.

In some embodiments, assuming that the estimated parameter of the $(k-1)^{th}$ iteration is $$x_{u,k-1} = \begin{bmatrix} r_{u,k-1} \\ dt_{r,k-1} \end{bmatrix},$$

when k is 1, the estimated parameter of the $(k-1)^{th}$ iteration includes the initial terminal position and the initial terminal clock error, the satellite observation equation of each iteration is constructed based on the estimated parameter of this iteration, that is, in the pseudo-range observation equation of the $(k-1)^{th}$ iteration, the terminal position and the terminal clock error in formula (1) need to be replaced by the terminal position $r_{u,k-1}$ and the terminal clock error $dt_{r,k-1}$ in $x_{u,k-1}$, partial derivatives of the satellite observation equation (the pseudo-range observation equation) of the $(k-1)^{th}$ iteration for the estimated parameter of the $(k-1)^{th}$ iteration are determined as the Jacobian matrix of the $(k-1)^{th}$ iteration, and the pseudo-range residual matrix of the $(k-1)^{th}$ iteration can be constructed according to the satellite observation equation of the $(k-1)^{th}$ iteration. The pseudo-range residual matrix of the $(k-1)^{th}$ iteration is denoted as Bk-1, the Jacobian matrix of the $(k-1)^{th}$ iteration is denoted as $G_{\rho,k-1}$, and the Jacobian matrix $G_{\rho,k-1}$ can be shown in the following formula (3):

$$G_{\rho,k-1} = \frac{\partial \begin{bmatrix} \tilde{p}_1 \\ \tilde{p}_2 \\ \vdots \\ \tilde{p}_{n1} \end{bmatrix}}{\partial \begin{bmatrix} r_{u,k-1} \\ dt_{r,k-1} \end{bmatrix}} = \begin{bmatrix} -e^{1T} & C \\ -e^{2T} & C \\ \vdots \\ -e^{n1T} & C \end{bmatrix} \quad (3)$$

In the above formula (3), $$e^i = \frac{r^i - r_{u,k-1}}{\|r^i - r_{u,k-1}\|}$$

represents a unit observation vector from the terminal to satellite i during the $(k-1)^{th}$ iteration.

Step S205: Construct a pseudo-range observation variance matrix.

In some embodiments, if step S203 is not performed or pseudo-range observation data gross errors are not screened out after step S203 is performed, satellite observation errors (the satellite observation errors herein can be pseudo-range random observation error models) corresponding to N satellites may be determined according to the observation error parameter, signal-to-noise ratios of the satellite observation information (pseudo-range observation data) corresponding to the N satellites, and the altitude angles corresponding to the N satellites. Furthermore, the satellite observation errors corresponding to the N satellites are used as matrix diagonal elements to construct the second observation variance matrix. For example, the second observation variance matrix may be a pseudo-range observation variance matrix determined based on the N pieces of pseudo-range observation data. In some embodiments, if the pseudo-range observation data gross errors are eliminated after step S203 is performed, and only the pseudo-range observation data corresponding to n1 satellites (n1 is defaulted to be less than N herein) remains, the pseudo-range random observation error models corresponding to the n1 satellites may be determined according to the observation error parameter, signal-to-noise ratios corresponding to the n1 pieces of pseudo-range observation data, and altitude angles corresponding to the n1 satellites associated with the n1 pieces of pseudo-range observation data. The pseudo-range random observation error models corresponding to the n1 satellites are used as the matrix diagonal elements to construct the pseudo-range observation variance matrix. The pseudo-range observation variance matrix can be shown in the following formula (4):

$$W_{\rho,k-1} = \begin{bmatrix} \sigma_{\rho 1} & \cdots & 0 \\ \vdots & \ddots & \vdots \\ 0 & \cdots & \sigma_{\rho n1} \end{bmatrix} \quad (4)$$

In formula (4), $W_{\rho,k-1}$ represents the pseudo-range observation variance matrix of the $k^{th}$ iteration, $\sigma_{\rho i}$ represents the pseudo-range observation random error model (satellite observation error) corresponding to satellite i, and $\sigma_{\rho i}$ can be shown in the following formula (5):

$$\sigma_{\rho i} = \delta_\rho \cdot \frac{10^{\frac{53-CN0^i}{10}}}{\sin^2 el^i} \quad (5)$$

$CN0^i$ is a signal-to-noise ratio of the pseudo-range observation value of satellite i, $el^i$ indicates the altitude angle of satellite i, $\delta_\rho$ is the pseudo-range observation parameter, and the parameter can be set according to actual needs, for example, $\delta_\rho$ can be set as $3^2$, which is not limited in the present disclosure.

The pseudo-range observation variance matrix is a matrix with fixed values. During the iterative update process of the estimated parameter xu, if the pseudo-range observation data used does not change, the pseudo-range observation variance matrix remains unchanged. If the pseudo-range observation data gross error is detected from the pseudo-range observation data, and the pseudo-range observation data gross error is eliminated, it means that the pseudo-range observation data has changed. Therefore, the pseudo-range observation variance matrix can be reconstructed, that is, the satellite observation error of the satellite corresponding to the pseudo-range observation data gross error is eliminated. As more pseudo-range observation data gross errors are eliminated, the pseudo-range observation variance matrix includes fewer rows.

Step S206: Calculate an estimated parameter correction amount, and update the estimated parameter value.

In some embodiments, the state information correction amount (also referred to as the estimated parameter correction amount) of the $(k-1)^{th}$ iteration may be obtained according to the Jacobian matrix $G_{\rho,k-1}$ of the $(k-1)^{th}$ iteration, the pseudo-range residual matrix (that is, Bk−1) of the $(k-1)^{th}$ iteration, and the second observation variance matrix (that is, the pseudo-range observation variance matrix $W_{\rho,k-1}$). The state information correction amount of the $(k-1)^{th}$ iteration can be shown in the following formula (6):

$$\Delta x_{\rho,k-1} = -\left(G_{\rho,k-1}^{T} W_{\rho,k-1} G_{\rho,k-1}\right)^{-1} G_{\rho,k-1}^{T} W_{\rho,k-1} \cdot B_{k-1} \quad (6)$$

$\Delta x_{\rho,k-1}$ represents the state information correction amount of the $(k-1)^{th}$ iteration, and is also known as the estimated parameter correction amount of the $(k-1)^{th}$ iteration, and $B_{k-1}$ is the pseudo-range residual matrix of the $(k-1)^{th}$ iteration, for example, as shown in the following formula (7):

$$B_{k-1} = \begin{bmatrix} \tilde{p}_1 - \left(\|r_{u,k-1} - r^1\| + c \cdot dt_{r,k-1} - c \cdot dt^1 + \zeta^1\right) \\ \tilde{p}_2 - \left(\|r_{u,k-1} - r^2\| + c \cdot dt_{r,k-1} - c \cdot dt^2 + \zeta^2\right) \\ \vdots \\ \tilde{p}_{n1} - \left(\|r_{u,k-1} - r^{n1}\| + c \cdot dt_{r,k-1} - c \cdot dt^n + \zeta^{n1}\right) \end{bmatrix} \quad (7)$$

The estimated parameter xu can be updated according to the state information correction amount of the $(k-1)^{th}$ iteration, and the update process is shown in the following formula (8):

$$x_{u,k} = x_{u,k-1} + \Delta x_{\rho,k-1} \quad (8)$$

$x_{u,k}$ is the estimated parameter of the $k^{th}$ iteration, and it needs to be determined whether the state information correction amount calculated in each iteration converges, for example, after calculating the state information correction amount $\Delta x_{\rho,k-1}$ of the $(k-1)^{th}$ iteration, it also needs to be determined whether the state information correction amount converges, if $\Delta x_{\rho,k-1}$ does not converge, the estimated parameter of the $k^{th}$ iteration is used as the initial value of the next iteration $((k+1)^{th}$ iteration), and step S201 to step S206 are repeatedly executed. If $\Delta x_{\rho,k-1}$ converges, proceed to the subsequent step S207.

Step S207: Calculate a Chi-squared test statistical count. In some embodiments, when the state information correction amount (that is, $\Delta x_{\rho,k-1}$) of the $(k-1)^{th}$ iteration converges, the sum of the estimated parameter of the $(k-1)^{th}$ iteration and the state information correction amount of the $(k-1)^{th}$ iteration is determined as the estimated parameter of the $k^{th}$ iteration, that is, the estimated parameter $$x_{u,k} = \begin{bmatrix} r_{u,k} \\ dt_{r,k} \end{bmatrix}$$

of the $k^{th}$ iteration is obtained based on the above formula (8), and Chi-squared test is performed on the calculation result. The pseudo-range residual matrix (that is, $B_k$) of the $k^{th}$ iteration is constructed according to the satellite observation equation of the $k^{th}$ iteration, and the product of the transposed matrix corresponding to the pseudo-range residual matrix of the $k^{th}$ iteration, the inverse matrix corresponding to the pseudo-range observation variance matrix, and the pseudo-range residual matrix of the $k^{th}$ iteration is determined as the test statistical count. A condition for $\Delta x_{\rho,k-1}$ to converge can be $\|\Delta x_{\rho,k-1}\| < 10^{-4}$. Herein, $10^{-4}$ can be set according to actual needs, and the specific value thereof is not limited in the present disclosure. The test statistical count s can be shown in the following formula (9):

$$s = B_k^T W_{\rho,k-1}^{-1} B_k \quad (9)$$

$B_k$ may be represented by the formula (10):

$$B_k = \begin{bmatrix} \tilde{p}_1 - \left(\|r_{u,k} - r^1\| + c \cdot dt_{r,k} - c \cdot dt^1 + \zeta^1\right) \\ \tilde{p}_2 - \left(\|r_{u,k+1} - r^2\| + c \cdot dt_{r,k} - c \cdot dt^2 + \zeta^2\right) \\ \vdots \\ \tilde{p}_{n1} - \left(\|r_{u,k} - r^{n1}\| + c \cdot dt_{r,k} - c \cdot dt^{n1} + \zeta^{n1}\right) \end{bmatrix} \quad (10)$$

Since $B_k$ is the pseudo-range residual matrix during the Chi-squared test, $B_k$ can also be referred to as a post-test residual matrix.

If the test statistical count s is less than the test threshold (which can be set according to actual needs), steps S211 and S212 are performed, for example, the estimated parameter $$x_{u,k} = \begin{bmatrix} r_{u,k} \\ dt_{r,k} \end{bmatrix}$$

of the $k^{th}$ iteration is determined as the terminal position and the terminal clock error in the terminal state information corresponding to the terminal. If the test statistical count s is greater than or equal to the test threshold, subsequent steps S208 to S210 are performed, that is, normal distribution test is performed on the post-test residual matrix (that is, $B_k$) based on the calculated post-test residual covariance matrix (which can be referred to as the first residual covariance matrix), and the pseudo-range observation data that does not pass the normal distribution test is eliminated.

Step S208: Calculate the post-test residual covariance matrix.

In some embodiments, if the test statistical count s is greater than or equal to the test threshold, the post-test residual covariance matrix is constructed according to the Jacobian matrix $G_{\rho,k-1}$ of the $(k-1)^{th}$ iteration and the second observation variance matrix (that is, the pseudo-range observation variance matrix $W_{\rho,k-1}$), and the residual covariance matrix can be shown in the following formula (11):

$$C_B = W_{\rho,k-1} - G_{\rho,k-1}\left(G_{\rho,k-1}^{T} W_{\rho,k-1} G_{\rho,k-1}\right)^{-1} G_{\rho,-1}^{T} \quad (11)$$

$C_B$ indicates the post-test residual covariance matrix.
Step S209: Perform normal distribution test on the post-test residual matrix according to the post-test residual covariance matrix.

Step S210: Eliminate pseudo-range observation data that fails the normal distribution test.

In some embodiments, according to the first residual covariance matrix (the post-test residual covariance matrix), normal distribution test is performed on the pseudo-range residual matrix (the post-test residual matrix, that is, the pseudo-range residual matrix $B_k$ on which the Chi-squared test has been performed) of the $k^{th}$ iteration, to obtain the test result corresponding to each element in the pseudo-range residual matrix of the $k^{th}$ iteration. If the test result corresponding to the $i^{th}$ element in the pseudo-range residual matrix of the $k^{th}$ iteration does not meet the test condition, it is determined that the $i^{th}$ element has not passed the normal distribution test, and the pseudo-range observation data associated with the $i^{th}$ element is eliminated. i is a positive integer less than or equal to the number of pseudo-range observation data. The remaining pseudo-range observation data after eliminating the pseudo-range observation data associated with the $i^{th}$ element is used as satellite observation information, the estimated parameter of the $k^{th}$ iteration is used as initial state information, and execution from the above step S201 is started again, that is, execution of a next iteration cycle is started. The iteration cycle is determined by determining whether convergence occurs. For example, if the estimated parameter converges at the $10^{th}$ iteration, but the calculation information does not pass the Chi-squared test, the 1st iteration to the $10^{th}$ iteration can be used as the first iteration cycle, if the estimated parameter converges again at the $25^{th}$ iteration, the $11^{th}$ iteration to the $25^{th}$ iteration are used as the second iteration cycle, and so on, until convergence occurs and the Chi-squared test is passed. The number of iterations included in different iteration cycles may be the same or different, and the pseudo-range observation data used in different iteration cycles may be the same or different, and usually is different.

The process of performing normal distribution test on the post-test residual matrix (that is, $B_k$) is shown in the following formula (12):

$$\frac{|B_k^i|}{\sqrt{C_{V,ii}}} > N(\alpha) \Rightarrow \text{Eliminate the pseudo-range observation data,} \tag{12}$$

$$i = 1, 2, \ldots, n1$$

$N(\alpha)$ in the formula (12) indicates the upper quantile of the normal distribution with the confidence level $\alpha$, and $$B_k^i \tag{}$$

indicates the $i^{th}$ element in $B_k$.

Step S211: Adaptively estimate a pseudo-range observation random error model factor.

In some embodiments, when the test statistical count s is less than the test threshold, the pseudo-range observation random error model factor can be adaptively estimated, and can also be referred to as a pseudo-range observation error factor, and the pseudo-range observation random error model factor can be shown in the following formula (13):

$$\varsigma_\rho = \frac{B_k^T w_{\rho,k-1}^{-1} B_k}{n1} \tag{13}$$

$\zeta_\rho$ represents the pseudo-range observation random error model factor, and $\zeta_\rho$ is the used test statistical count s and a number of pseudo-range observation data included in $B_k$ when the test statistical count s is less than the test threshold, and can also refer to a number of rows in $B_k$.

Step S212: Output the terminal position, the pseudo-range observation random error model factor, and eliminated pseudo-range observation data information.

In some embodiments, when the test statistical count s is less than the test threshold, the estimated parameter of the $k^{th}$ iteration can be used as the terminal position corresponding to the terminal, the pseudo-range observation random error model factor $\zeta_\rho$ and the remaining pseudo-range observation data obtained after eliminating some pseudo-range observation data gross errors can also be output, and the remaining pseudo-range observation data can be referred to as pseudo-range screening data. In other words, the pseudo-range screening data is the pseudo-range observation data included in $B_k$.

FIG. 5 is a schematic flowchart for estimating a terminal velocity and a terminal clock drift in terminal state information according to an embodiment of the present disclosure. As shown in FIG. 5, the process of estimating the terminal velocity and the terminal clock drift can include the following steps:

Step S301: Set an initial value of an estimated parameter, that is, an initial terminal velocity and an initial terminal clock drift.

In some embodiments, for the N pieces of Doppler observation information in the satellite observation information received by the terminal, the terminal velocity and the terminal clock drift can be estimated by using the robust weighted least squares algorithm and the N pieces of Doppler observation information. Assuming that the estimated parameter is $$y_u = \begin{bmatrix} v_u \\ dt_r \end{bmatrix},$$

the specific process of using the robust weighted least squares algorithm may include: The initial value of the estimated parameter $y_u$ is set, that is, the initial state information is set for the terminal. The initial state information in this case may include the initial terminal velocity and the initial terminal clock drift and is denoted as $$y_{u,0} = \begin{bmatrix} v_{u,0} \\ dt_{r,0} \end{bmatrix},$$

for example, vu_0 and dtr2_0 in the corresponding embodiment in FIG. 2. The purpose of using the robust weighted least squares algorithm is to iteratively update the estimated parameter $y_u$ to estimate the terminal velocity and the terminal clock drift corresponding to the terminal.

Step S302: Construct a Doppler residual matrix.

In some embodiments, the satellite observation equation between the terminal and the satellite is constructed based on satellite observation information, the initial state information, and satellite state information corresponding to the satellite. For example, the satellite observation information includes N pieces of Doppler observation data, the initial state information may include the initial terminal velocity $v_{u,0}$ and the initial terminal clock drift $dt_{r,0}$, and the satellite state information may include the satellite velocity and the satellite clock drift. Therefore, the constructed satellite observation equation is, for example, a Doppler observation equation. More specifically, a velocity difference between the initial terminal velocity and the satellite velocity can be obtained, and a unit observation value between the terminal and the satellite can be obtained, such as $$\frac{r_u - r^1}{\left\| r_u - r^1 \right\|}.$$

A clock drift difference between the initial terminal clock drift and the satellite clock drift is obtained, the second estimated value between the terminal and the satellite is determined according to the clock drift difference and the product of the velocity difference and the unit observation value, such as $$\left( v^2 - v_{u,0} \right) \cdot \frac{r_u - r^2}{\left\| r_u - r^2 \right\|} + c \cdot \dot{d}t_{r,0} - c\dot{d}t^2,$$

and the Doppler observation equation between the terminal and the satellite is constructed based on the second estimated value and the product of the wavelength of the signal transmitted by the satellite and the Doppler observation data. The form of the Doppler observation equation is shown in the above formula (2), and the only difference is that vu is replaced by $v_{u,0}$ and $\dot{d}t_r$ is replaced by $\dot{d}t_{r,0}$ in the above formula (2). Furthermore, subtraction may be performed on the two sides of the Doppler observation equation to obtain a Doppler residual matrix.

Step S303: Perform gross error detection on the pseudo-range residual matrix based on the quartile.

Step S304: Calculate a Jacobian matrix of the Doppler observation equation for the estimated parameter.

Step S305: Construct a Doppler observation variance matrix.

Step S306: Calculate an estimated parameter correction amount, and update the estimated parameter value.

Step S307: Calculate a Chi-squared test statistical count.

Step S308: Calculate the post-test residual covariance matrix.

Step S309: Perform normal distribution test on the post-test residual matrix according to the post-test residual covariance matrix.

Step S310: Eliminate Doppler observation data that fails the normal distribution test.

Step S311: Adaptively estimate a Doppler observation random error model factor.

Step S312: Output the terminal velocity, the Doppler observation random error model factor, and eliminated Doppler observation data information.

The specific implementation process from step S303 to step S312 is an update process of the estimated parameter yu based on the robust weighted least squares algorithm, and an algorithm process thereof is the same as the process of estimating the terminal position by using pseudo-range observation information in the embodiment corresponding to FIG. 4, and will not be repeated herein. The N pieces of Doppler observation data is processed based on the robust weighted least squares algorithm. The terminal velocity, the Doppler observation random error model factor $\sigma_{\dot{\rho}}$ (which can also be referred to as the Doppler observation error factor, where the Doppler observation error factor and the pseudo-range observation error factor are collectively referred to as the satellite observation error factor), and the remaining Doppler observation data obtained after eliminating some Doppler observation data gross errors may be output. The remaining Doppler observation data may be referred to as Doppler screening data. The Doppler screening data and the pseudo-range screening data may be referred to as first screened observation information. The terminal position and the terminal clock error estimated based on the pseudo-range observation data, and the terminal velocity and the terminal clock drift estimated based on the Doppler observation data may be collectively referred to as terminal state information corresponding to the terminal.

In this embodiment of the present disclosure, the terminal position and the terminal velocity of the terminal are estimated based on the robust weighted least squares algorithm, which can provide more accurate initial state parameters for establishing a filter, and can improve the positioning accuracy of the terminal.

Figure 6:
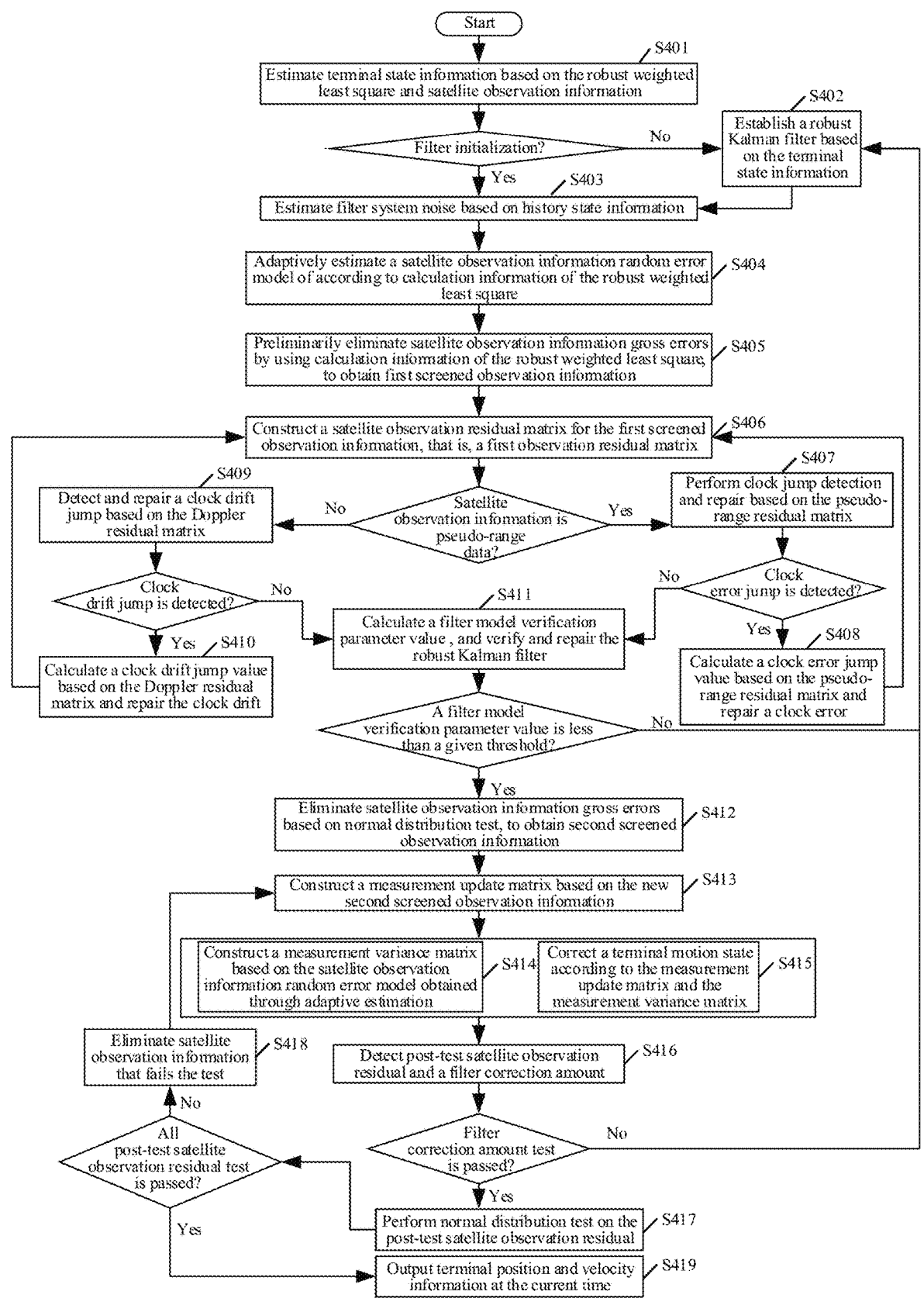
FIG. 6 is a schematic flowchart of a terminal positioning method according to an embodiment of the present disclosure.

FIG. 6 is a schematic flowchart of a terminal positioning method according to an embodiment of the present disclosure. The terminal positioning method can be executed by a computer device, and the computer device can be an electronic device integrated with a satellite positioning device, such as any user terminal in the user terminal cluster shown in FIG. 1A, or any terminal that needs to be positioned. In this embodiment of the present disclosure, an example in which satellite observation information includes pseudo-range observation data and Doppler observation data and the state prediction model and the state adjustment model are implemented by a robust Kalman filter is used for specific description, for example, as shown in FIG. 4. The terminal positioning method may include the following steps.

Step S401: Estimate terminal state information based on the robust weighted least squares and satellite observation information.

The specific implementation process of step S401 can be shown in the corresponding embodiments in FIG. 4 and FIG. 5, and will not be further elaborated herein.

Step S402: Establish a robust Kalman filter based on the terminal state information.

In some embodiments, when the robust Kalman filter has completed initialization processing, step S402 does not need to be performed, and subsequent step S403 is directly performed. When the robust Kalman filter is not initialized, the terminal position, the terminal velocity, the terminal clock error, and the terminal clock drift in the terminal state information can be set as the initial state parameter of the robust Kalman filter, that is, $z(0) = [r_u \ v_u \ dtr \ dtr]T$. The pseudo-range observation variance matrix is constructed according to the signal-to-noise ratio corresponding to the pseudo-range screening data and the altitude angle of the satellite corresponding to the pseudo-range screening data, and is denoted as $W_{\rho r}$. The Doppler observation variance matrix is constructed according to the signal-to-noise ratio corresponding to the Doppler screening data and the altitude angle of the satellite corresponding to the Doppler screening data, and is denoted as $W_{\dot{\rho} r}$. The position covariance matrix is constructed according to the pseudo-range observation variance matrix, the satellite observation error factor determined based on the terminal position and the terminal clock error (that is, the pseudo-range observation random error model factor $\zeta_\rho$, which can also be referred to as a pseudo-range observation error factor), and the Jacobian matrix $G_{\rho r}$ determined based on the pseudo-range screening data, the terminal position, and the terminal clock error. The velocity covariance matrix is constructed according to the Doppler observation variance matrix, the satellite observation error factor determined based on the terminal velocity and the terminal clock drift (that is, the Doppler observation random error model factor $\zeta_{\dot{\rho}}$, which can also be referred to as a Doppler observation error factor), and the Jacobian matrix $G_{\dot{\rho}t}$ determined based on the Doppler screening data, the terminal velocity, and the terminal clock drift. The diagonal matrix formed by the position covariance matrix and the velocity covariance matrix is determined as the initial state covariance matrix corresponding to the filter. The initial state covariance matrix is calculated based on the robust weighted least squares algorithm, and is shown in the following formula (14):

$$P(0) = diag\left(Q_{r_u}, Q_{v_u}, 100^2, 100^2\right) \tag{114}$$

p(0) represents the initial state covariance matrix, diag represents the diagonal matrix, $Q_{r_u}$ represents the position covariance matrix, $Q_{v_u}$ represents the velocity covariance matrix, the position covariance matrix $Q_{r_u}$ is shown in the following formula (15), and the velocity covariance matrix $Q_{v_u}$ can be shown in the following equation (16):

$$Q_{r_u} = \varsigma_\rho \cdot [\, I_3 \quad 0\,] \cdot \left(G_{\rho t}^T W_{\rho t} G_{\rho t}\right)^{-1} \cdot \begin{bmatrix} I_3 \\ 0 \end{bmatrix} \tag{15}$$

$$Q_{v_u} = \varsigma_{\dot{\rho}} \cdot [\, I_3 \quad 0\,] \cdot \left(G_{\dot{\rho} t}^T W_{\dot{\rho} t} G_{\dot{\rho} t}\right)^{-1} \cdot \begin{bmatrix} I_3 \\ 0 \end{bmatrix} \tag{16}$$

$G_{\rho t}$ is the Jacobian matrix obtained after the pseudo-range observation data received by the terminal is subject to robust weighted least squares estimation, that is, the Jacobian matrix determined based on pseudo-range screening data in the first screened observation information. $G_{\dot{\rho} t}$ is the Jacobian matrix obtained after the Doppler observation data received by the terminal is subject to robust weighted least squares estimation, that is, the Jacobian matrix determined based on Doppler screening data in the first screened observation information. $W_{\rho t}$ is the pseudo-range measurement variance matrix corresponding to the pseudo-range screening data in the first screened observation information, and $W_{\dot{\rho} t}$ is the Doppler observation variance matrix corresponding to Doppler screening data in the first screened observation information. $\zeta_\rho$ is the pseudo-range observation random error model factor, and is also referred to as a pseudo-range observation error factor, $\zeta_{\dot{\rho}}$ is the Doppler observation random error model factor, and is also referred to as the Doppler observation error factor, and $I_3$ is an identity matrix.

Step S403: Estimate filter system noise according to the history state information, that is, predicted error information of the state prediction model for at least one motion state parameter.

Figure 7:
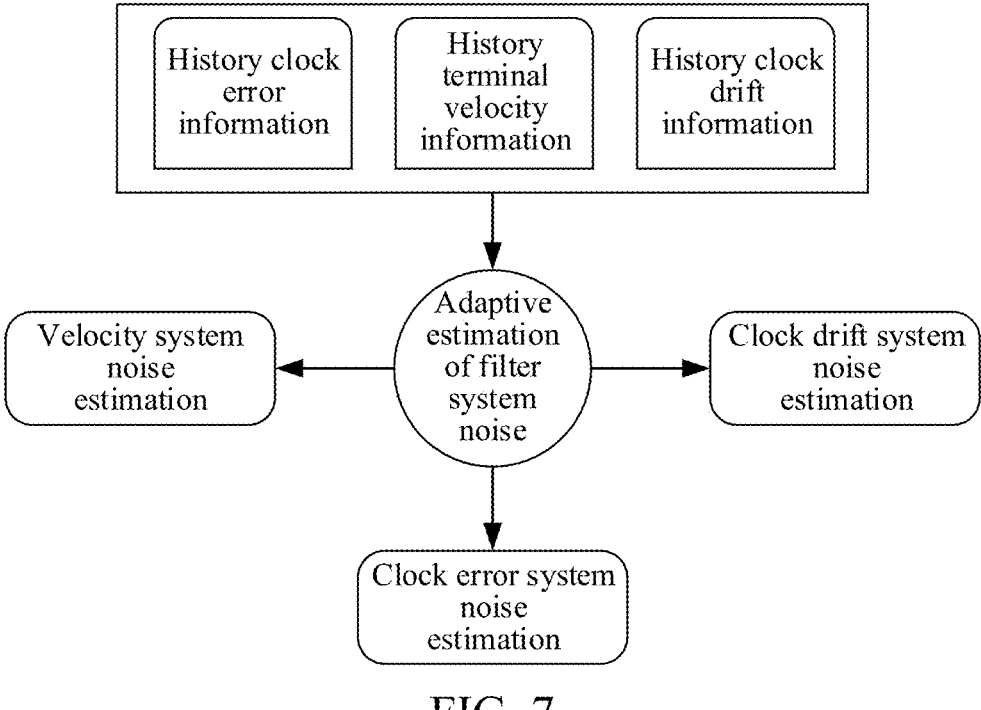
FIG. 7 is a schematic diagram of noise adaptive estimation of a filter system according to an embodiment of the present disclosure.

In some embodiments, FIG. 7 is a schematic diagram of noise adaptive estimation of a filter system according to an embodiment of the present disclosure. For example, as shown in FIG. 7, adaptive estimation of the filter system noise can include velocity system noise estimation, clock drift system noise estimation, and clock error system noise estimation. The velocity system noise estimation is implemented based on history terminal velocity information. The history terminal velocity information may be a history terminal velocity sequence, the history clock error information may be a history terminal clock error sequence, and the history clock drift information may be a history terminal clock drift sequence.

In some embodiments, the history terminal velocity sequence, the history terminal clock drift sequence, and the history terminal clock error sequence in the history state information corresponding to the terminal can be obtained. The history terminal velocity sequence, the history terminal clock drift sequence, and the history terminal clock error sequence are all determined based on a time sliding window of a size p, where p is a positive integer. The history state information may refer to state information generated during the update iteration process of the robust weighted least square. The history terminal velocity sequence can be shown in formula (17):

$$T_v(p) = \{v_u(t_1), v_u(t_2), v_u(t_3), \dots, v_u(t_p)\} \tag{17}$$

$T_v(p)$ represents the history terminal velocity sequence, and represents history terminal velocities saved at p consecutive moments, and $v_u(t_1)$ represents a terminal velocity at moment $t_1$. The history terminal clock drift sequence can be shown in formula (18):

$$dtr(p) = \{dtr(t_1), dtr(t_2), dtr(t_3), \dots, dtr(t_p)\} \tag{18}$$

$\dot{dtr}(p)$ represents the history terminal clock drift sequence, and represents history terminal clock drifts saved at p consecutive moments. The history terminal clock error sequence can be shown in formula (19):

$$dtr(p) = \{dtr(t_1), dtr(t_2), dtr(t_3), \dots, dtr(t_p)\} \tag{19}$$

dtr(p) represents the history terminal clock error sequence, and represents history terminal clock errors saved at p consecutive moments.

For example, the velocity system noise estimation shown in FIG. 7 can include: A first variance value corresponding to the history terminal velocity sequence is obtained, and is denoted as $\sigma_v(p)$, and the product of the first variance value and a time difference between adjacent epochs is determined as the velocity system noise corresponding to the filter. The first variance value can be shown in the following formula (20):

$$\sigma_v(p) = \frac{1}{p-1} \Sigma_{k=1}^p \left(v_u(t_k) - \frac{1}{p} \Sigma_{l=1}^p v_u(t_l)\right) \tag{20}$$

The velocity system noise of the filter can be represented by the spectral density $PSD_v$, and the spectral density $PSD_v$ is shown in the following formula (21):

$$PSD_v = (\sigma_v(p))^2 \cdot dt \tag{21}$$

dt represents the time difference between adjacent epochs.

For example, the clock drift system noise estimation shown in FIG. 7 can include: A second variance value corresponding to the history terminal clock drift sequence is obtained, and is denoted as $\sigma_{dir}(p)$, and the product of the second variance value and a time difference dt between adjacent epochs is determined as the clock drift system noise corresponding to the filter. The second variance value can be shown in the following formula (22):

$$\sigma_{dir}(p) = \frac{1}{p-1}\sum\nolimits_{k=1}^{p}\left(dir(t_k) - \frac{1}{p}\sum\nolimits_{l=1}^{p} dir(t_l)\right) \qquad (22)$$

The clock drift system noise of the filter can be represented by the spectral density $PSD_{dir}$, and the spectral density $PSD_{dir}$ is shown in the following formula (23):

$$PSD_{dir} = (\sigma_{dir}(p))^2 \cdot dt \qquad (23)$$

For example, the clock error system noise estimation shown in FIG. 7 includes: A third variance value corresponding to the history terminal clock error sequence is obtained, and is denoted as $\sigma_{dtr}(p)$, and the product of the third variance value and a time difference between adjacent epochs is determined as the clock error system noise corresponding to the filter. The third variance value can be shown in the following formula (24):

$$\sigma_{dtr}(p) = \frac{1}{p-1}\sum\nolimits_{k=1}^{p}\left(dtr(t_k) - \frac{1}{p}\sum\nolimits_{l=t}^{p} dtr(t_l)\right) \qquad (24)$$

The clock error system noise of the filter can be represented by the spectral density $PSD_{dtr}$, for example, shown in the following formula (25):

$$PSD_{dtr} = (\sigma_{dtr}(p))^2 \cdot dt \qquad (25)$$

Furthermore, the velocity system noise, the clock drift system noise, and the clock error system noise can be determined as the filter system noise corresponding to the filter, that is, the filter system noise includes the spectral density PSDv, the spectral density $PSD_{dir}$, and the spectral density $PSD_{dtr}$.

In some embodiments, after the filter system noise estimation is completed, time update may be performed on the robust Kalman filter, for example, the state transition matrix of the filter (the robust Kalman filter) can be constructed by using the time difference of adjacent epochs, and the predicted state parameter is predicted by using the state transition matrix and the initial state parameter of the filter. For example, a method of updating the state parameter during the time update process of the filter is: a next state parameter is the product of a previous state parameter and the state transition matrix. The predicted state covariance matrix is predicted by using the state transition matrix, the filter system noise, and the initial state covariance matrix of the filter.

A method of updating the state covariance matrix during the time update process of the filter may include: When the predicted state covariance matrix is a state covariance matrix of the initial state covariance matrix in the filter at time t, the predicted state parameter is also a state parameter of the initial state parameter at time t, where t is a positive integer. The noise covariance matrix can be constructed by using the filter system noise and index information corresponding to the time difference of adjacent epochs. Then, the state covariance matrix of the filter at time t−1 is obtained. When t is 1, the state covariance matrix of the filter at time t−1 is the initial state covariance matrix. The product of the state transition matrix, the state covariance matrix at time t−1, and the transposed matrix corresponding to the state transition matrix is summed with the noise covariance matrix to obtain the predicted covariance matrix. Assuming that the state variance matrix of the filter at time t−1 is P(t−1), the state covariance matrix P(t) of the filter at time t can be shown in the following formula (26):

$$P(t) = F(t-1) \cdot P(t-1) \cdot F^T(t-1) + Q(t-1) \qquad (26)$$

F(t−1) is the state transition matrix, Q(t−1) is the noise covariance matrix, and the state transition matrix F(t−1) can be shown as formula (27):

$$F(t-1) = \begin{bmatrix} I_3 & I_3 \cdot dt & 0 & 0 \\ 0 & I_3 & 0 & 0 \\ 0 & 0 & \tau_d - \tau_d \cdot e^{-\frac{dt}{\tau_d}} & 0 \\ 0 & 1 & 0 & e^{-\frac{dt}{\tau_d}} \end{bmatrix} \qquad (27)$$

$\tau_d$ is a relevant time of the Markov process and is usually an empirical value, such as 5 seconds, 20 seconds, or 50 seconds. The noise covariance matrix Q(t−1) can be shown as formula (28):

$$(28)$$

$$Q(t-1) = \begin{bmatrix} \dfrac{PSD_v \cdot dt^3}{3} & \dfrac{PSD_v \cdot dt^2}{2} & 0 & 0 \\ \dfrac{PSD_v \cdot dt^2}{2} & PSD_v \cdot dt & 0 & 0 \\ 0 & 0 & PSD_{dtr} \cdot dt + \dfrac{PSD_{tdr} \cdot dt^3}{3} & \dfrac{PSD_{tdr} \cdot dt^2}{2} \\ 0 & 0 & \dfrac{PSD_{tdr} \cdot dt^2}{2} & PSD_{tdr} \cdot dt \end{bmatrix}$$

At time t, the state parameter of the filter x(t)=F(t−1)·x(t−1). This formula can implement the time update process of the state parameter of the filter, and formula (26) to formula (28) can implement the time update process of the state covariance matrix of the filter. After the time update is completed, the state parameter of the filter is referred to as a predicted state parameter, and the state covariance matrix of the filter is referred to as a predicted state covariance matrix.

Step S404: Adaptively estimate a satellite observation information (which may also be referred to as satellite observation error) random error model according to calculation information of the robust weighted least square.

In some embodiments, the satellite observation information random error model may include a pseudo-range observation random error model and a Doppler observation random error model, and the satellite observation information random error model may be shown in the following formula (29):

$$\begin{cases} \sigma_\rho = \delta_\rho \cdot \dfrac{10^{\frac{53-CNo}{10}}}{\sin^2 el} \\[2ex] \sigma_{\dot\rho} = \delta_{\dot\rho} \cdot \dfrac{10^{\frac{53-CNo}{10}}}{\sin^2 el} \end{cases} \tag{29}$$

$\sigma_\rho$ represents the pseudo-range observation random error model, $\delta_\rho$ represents an observation error parameter corresponding to pseudo-range observation data, $\sigma_{\dot\rho}$ represents the Doppler observation random error model, $\delta_{\dot\rho}$ represents an observation error parameter corresponding to Doppler observation data, and $\delta_\rho$ and $\delta_{\dot\rho}$ can be adjusted according to experience or actual needs, such as $\delta_\rho = 3^2$ and $\delta_{\dot\rho} = 0.03^2$. $CN0$ represents the signal-to-noise ratio of satellite observation information, and el represents the altitude angle of the satellite. The pseudo-range observation random error model $\sigma_\rho$ can be adaptively adjusted through the pseudo-range observation random error model factor $\varsigma_\rho$ (the pseudo-range observation error factor), and the Doppler observation random error model $\sigma_{\dot\rho}$ can be adaptively adjusted through the Doppler observation random error model factor $\delta_{\dot\rho}$, for example, shown in the following formula (27):

$$\begin{cases} \sigma_\rho = \varsigma_\rho \cdot \sigma_\rho \\ \sigma_{\dot\rho} = \varsigma_{\dot\rho} \cdot \sigma_{\dot\rho} \end{cases} \tag{30}$$

Step S405: Preliminarily eliminate satellite observation information gross errors by using calculation information of the robust weighted least square, to obtain first screened observation information.

In some embodiments, satellite observation information gross errors are eliminated by using calculation information of the robust weighted least square, and the obtained remaining satellite observation information may be referred to as the first screened observation information (that is, the current updated positioning information set). The process of determining the first screened observation information can be described in step S203 and step S211 of the corresponding embodiments in FIG. 4, and will not be further elaborated herein. If gross errors have been eliminated in step S401, this step S405 can be skipped.

Step S406: Construct a satellite observation residual matrix for the first screened observation information, that is, a first observation residual matrix.

In some embodiments, after the first screened observation information is obtained through the calculation information of the robust weighted least square, the first screened observation information is satellite observation information obtained after gross errors are eliminated. It can be understood that although the first screened observation information herein is satellite observation information obtained after gross errors are eliminated, it does not mean that the first screened observation information does not include observation information gross errors, and it can only be understood as up to the current step, all detected observation information gross errors have been eliminated, and whether the first screened observation information includes observation information gross errors can be detected through subsequent steps.

The satellite observation residual matrix can be constructed through the first screened observation information and the predicted state parameter (that is, the predicted motion state), that is, deviation data of the current (after eliminating gross errors) satellite observation information relative to the predicted motion state is obtained, and the satellite observation residual matrix herein can be referred to as the first observation residual matrix. Since the first screened observation information includes pseudo-range observation data and Doppler observation data, two satellite observation residual matrixes can be constructed through the first screened observation information, that is, the first observation residual matrix can include the Doppler residual matrix and the pseudo-range residual matrix. Assuming that the first screened observation information includes sn pieces of pseudo-range observation data, and sn is a positive integer less than or equal to N, the satellite observation equation constructed by using the sn pieces of pseudo-range observation data can be shown in the following formula (31):

$$\begin{bmatrix} \tilde{P}_{s1} \\ \tilde{P}_{s2} \\ \vdots \\ \tilde{P}_{sn} \end{bmatrix} = \begin{bmatrix} \|r_u - r^{s1}\| + c \cdot dt_r - c \cdot dt^{s1} + \zeta^{s1} \\ \|r_u - r^{s2}\| + c \cdot dt_r - c \cdot dt^{s2} + \zeta^{s2} \\ \vdots \\ \|r_u - r^{sn}\| + c \cdot dt_r - c \cdot dt^{sn} + \zeta^{sn} \end{bmatrix} \tag{31}$$

The pseudo-range residual matrix $\tilde{B}$ in the first observation residual matrix can be constructed based on the satellite observation equation shown in the above formula (31), and the pseudo-range residual matrix $\tilde{B}$ can be expressed in the following equation (32):

$$\tilde{B} = \begin{bmatrix} \tilde{P}_{s1} \\ \tilde{P}_{s2} \\ \vdots \\ \tilde{P}_{sn} \end{bmatrix} - \begin{bmatrix} \|r_u - r^{s1}\| + c \cdot dt_r - c \cdot dt^{s1} + \zeta^{s1} \\ \|r_u - r^{s2}\| + c \cdot dt_r - c \cdot dt^{s2} + \zeta^{s2} \\ \vdots \\ \|r_u - r^{sn}\| + c \cdot dt_r - c \cdot dt^{sn} + \zeta^{sn} \end{bmatrix} \tag{32}$$

In some embodiments, assuming that the first screened observation information includes qn pieces of Doppler observation data, and qn is a positive integer less than or equal to N, the satellite observation equation constructed based on the qn pieces of Doppler observation data can be shown in the following formula (33):

$$\begin{bmatrix} \lambda\tilde{D}_u^1 \\ \lambda\tilde{D}_u^2 \\ \vdots \\ \lambda\tilde{D}_u^{qn} \end{bmatrix} = \begin{bmatrix} (v^1 - v_u) \cdot \dfrac{r_u - r^1}{\|r_u - r^1\|} + c \cdot \dot{dt}_r - c\dot{dt}^1 \\ (v^2 - v_u) \cdot \dfrac{r_u - r^2}{\|r_u - r^2\|} + c \cdot \dot{dt}_r - c\dot{dt}^2 \\ \vdots \\ (v^{qn} - v_u) \cdot \dfrac{r_u - r^{qn}}{\|r_u - r^{qn}\|} + c \cdot \dot{dt}_r - c\dot{dt}^{qn} \end{bmatrix} \tag{33}$$

The Doppler residual matrix $\dot{B}$ in the first observation residual matrix can be constructed based on the satellite observation equation shown in the above formula (33), and the Doppler residual matrix $\dot{B}$ can be expressed in the following equation (34):

$$\dot{B} \begin{bmatrix} \lambda\tilde{D}_u^1 \\ \lambda\tilde{D}_u^2 \\ \vdots \\ \lambda\tilde{D}_u^{qn} \end{bmatrix} = \begin{bmatrix} (v^1 - v_u) \cdot \dfrac{r_u - r^1}{\|r_u - r^1\|} + c \cdot \dot{dt}_r - c\dot{dt}^1 \\ (v^2 - v_u) \cdot \dfrac{r_u - r^2}{\|r_u - r^2\|} + c \cdot \dot{dt}_r - c\dot{dt}^2 \\ \vdots \\ (v^{qn} - v_u) \cdot \dfrac{r_u - r^{qn}}{\|r_u - r^{qn}\|} + c \cdot \dot{dt}_r - c\dot{dt}^{qn} \end{bmatrix} \tag{34}$$

In some embodiments, outlier detection can be used to eliminate the detected abnormal observation information from the satellite observation residual matrix, that is, the deviation data of satellite observation information relative to the predicted motion state. For example, when it is detected that the residual data corresponding to the satellite observation information of at least one satellite is an outlier, the data corresponding to the at least one satellite is eliminated from the satellite observation residual matrix and the first screened observation information (that is, the current positioning information set), so as to update the satellite observation residual matrix and the positioning information set. The pseudo-range residual matrix, the Doppler residual matrix, and the first screened observation information used in subsequent steps can be the updated pseudo-range residual matrix, Doppler residual matrix, and first screened observation information obtained after outlier detection and elimination of the residual matrix in this step.

Next, clock jump detection and repair are performed, and may include clock error jump detection and repair and clock drift jump detection and repair.

Step S407: Perform clock jump detection and repair based on the pseudo-range residual matrix.

In some embodiments, when the pseudo-range residual matrix $\tilde{B}$ shown in the above formula (32) meets the relationship formula shown in the following formula (35), clock error jump detection can be performed as shown in formula (36), that is:

$$\frac{mad(\tilde{B})}{med(\tilde{B})} < \theta_m, \; \frac{std(\tilde{B})}{mean(\tilde{B})} < \theta_m \tag{35}$$

$$jump_{clk} = \begin{cases} 0, & \dfrac{\left|med(\tilde{B})\right|}{\sqrt{P(t)_{j_{clk}j_{clk}}}} < \theta_{clk} \\[4mm] 1, & \dfrac{\left|med(\tilde{B})\right|}{\sqrt{P(t)_{j_{clk}j_{clk}}}} \geq \theta_{clk} \end{cases} \tag{36}$$

$mad(\tilde{B})$ represents the absolute median difference of the pseudo-range residual matrix $\tilde{B}$, $med(\tilde{B})$ represents the median of the pseudo-range residual matrix $\tilde{B}$, $std(\tilde{B})$ represents the standard deviation of the pseudo-range residual matrix $\tilde{B}$, $mean(\tilde{B})$ represents the mean of the pseudo-range residual matrix $\tilde{B}$, $\theta_m$ and $\theta_{clk}$ are clock error detection thresholds, for example, $\theta_m$ is referred to as a first clock error detection threshold and $\theta_{clk}$ is referred to as a second clock error detection threshold, $P(t)_{j_{clk}j_{clk}}$ represents an element in a $j_{clk}{}^{th}$ row and a $j_{clk}{}^{th}$ column in the state covariance matrix of the filter at time t, the state covariance matrix at time t can be the predicted state covariance matrix, $jump_{clk}$ is a clock error jump value, and $$\frac{\left|med(\tilde{B})\right|}{\sqrt{P(t)_{j_{clk}j_{clk}}}}$$

is a clock error detection value.

Step S408: Calculate a clock error jump value based on the pseudo-range residual matrix and repair a clock error.

In some embodiments, when $jump_{clk}$ is zero, no processing is performed, which indicates that there is no clock error jump. When $jump_{clk}$ is equal to 1, it means that clock error jump is detected, and the method shown in the following formula (37) can be used to repair the clock error jump and reset the filter, that is, the state parameter and the state covariance matrix of the filter are reset, for example:

$$\begin{cases} x(t)_{j_{clk}} = x(t)_{j_{clk}} + med(\tilde{B}) \\ P(t)_{j_{clk}t} = P(t)_{tj_{clk}} = 0.0, \; t = 1,2, \dots ,11 \\ P(t)_{j_{clk}j_{clk}} = SQR(100.0) \end{cases} \tag{37}$$

SQR(100.0) represents the square root of 100.

Step S409: Detect and repair a clock drift jump based on the Doppler residual matrix.

In some embodiments, similar to the clock error jump detection and processing process, the clock drift jump detection and repair are performed through the Doppler residual matrix $\dot{\tilde{B}}$ shown in the formula (34). The clock drift jump detection method is the same as the clock error jump detection method (that is, the above formula (35) and formula (36)), and will not be repeated herein.

Step S410: Calculate a clock drift jump value based on the Doppler residual matrix and repair the clock drift.

In some embodiments, when a clock drift jump is detected, the method shown in the following formula (38) can be used to repair the clock drift jump and reset the filter, that is, the state parameter and the state covariance matrix of the filter are reset, for example:

$$\begin{cases} x(t)_{j_{dclk}} = x(t)_{j_{dclk}} + med(\dot{\tilde{B}}) \\ P(t)_{j_{dclk}t} = P(t)_{tj_{dclk}} = 0.0, \; t = 1,2, \dots ,11 \\ P(t)_{j_{dclk}j_{dclk}} = SQR(100.0) \end{cases} \tag{38}$$

$j_{dclk}$ is a position of the clock drift in the filter state parameter $z(t)$.

Step S411: Calculate a filter model verification parameter value, and verify and repair the robust Kalman filter.

In some embodiments, after detecting the clock error and clock drift jump, the filter model verification parameter value can be calculated, and whether the robust Kalman filter system is faulty can be determined based on the model verification parameter value. The model verification parameter value may include a pseudo-range model verification parameter value and a Doppler model verification parameter value, and the model verification parameter value is shown in the following formula (39):

$$\begin{cases} \beta_\rho = \tilde{B}^T \cdot (G_{\rho t}^T P(t) G_{\rho t} + W_{\rho t})^{-1} \tilde{B} \\ \beta_{\dot{\rho}} = \dot{\tilde{B}}^T \cdot (G_{\dot{\rho} t}^T P(t) G_{\dot{\rho} t} + W_{\dot{\rho} t})^{-1} \dot{\tilde{B}} \end{cases} \tag{39}$$

$\beta_\rho$ is the pseudo-range model verification parameter value, $\beta_{\dot{\rho}}$ is the Doppler model verification parameter value, $P(t)$ is the state covariance matrix of the filter at time t, $G_{\rho t}$ is the Jacobian matrix of the pseudo-range residual matrix $\tilde{B}$ with respect to the filter state parameter, and $G_{\dot{\rho} t}$ is the Jacobian matrix of the Doppler residual matrix $\dot{\tilde{B}}$ with respect to the filter state parameter. In other words, the model verification parameter value is constructed based on the first observation residual matrix (including the pseudo-range residual matrix $\tilde{B}$ and the Doppler residual matrix $\dot{\tilde{B}}$)

constructed based on the first screened observation information, the Jacobian matrix (including the Jacobian matrix $G_{\rho t}$ and the Jacobian matrix $G_{\dot{\rho}t}$) of the first observation residual matrix with respect to the filter state parameter (for example, the predicted state parameter), the state covariance matrix $P(t)$ of the filter, and the first observation variance matrix (including the pseudo-range observation variance matrix $W_{\rho t}$ and the Doppler observation variance matrix $W_{\dot{\rho}t}$) associated with the first screened observation information.

When the model verification parameter value of the filter is less than the model verification threshold, the following step S412 can be performed. When the model verification parameter value of the filter is greater than or equal to the model verification threshold, it means that the filter is faulty and the filter needs to be reset, and the above step S402 is performed repeatedly, that is, the initial state parameter and the initial state covariance matrix of the filter are reset.

Step S412: Eliminate satellite observation information gross errors based on normal distribution test, to obtain second screened observation information.

In some embodiments, when the model verification parameter value of the filter is less than the model verification threshold, gross error detection can be performed on the first screened observation information based on the first observation residual matrix and the normal distribution test, and satellite observation information gross errors that cause the filter to diverge are eliminated from the first screened observation information, to obtain the updated first screened observation information. For example, the model parameter value can be standardized to obtain a standardized residual matrix, the standardized residual matrix can be referred to as a first standardized residual matrix, the first standardized residual matrix can include a pseudo-range standardized residual matrix and a Doppler standardized residual matrix, and the first standardized residual matrix can be shown as the following formula (40):

$$\begin{cases} b_\rho = \left(G_{\rho t}^T P(t) G_{\rho t} + W_{\rho t}\right)^{-1} \tilde{B} \\ b_{\dot{\rho}} = \left(G_{\dot{\rho}t}^T P(t) G_{\dot{\rho}t} + W_{\dot{\rho}t}\right)^{-1} \dot{\tilde{B}} \end{cases} \tag{40}$$

$b_\rho$ denotes a pseudo-range standardized residual matrix in the first standardized residual matrix, and $b_{\dot{\rho}}$ denotes a Doppler standardized residual matrix in the first standardized residual matrix.

In some embodiments, the normal distribution test can be performed on the first standardized residual matrix to obtain the test result corresponding to each element included in the first standardized residual matrix, and the test result is shown in the following formula (41):

$$\begin{cases} \omega_\rho = \dfrac{|b_{\rho,l}|}{\sqrt{\left(G_{\rho t}^T P(t) G_{\rho t} + W_{\rho t}\right)^{-1}_{ll}}} \\[4mm] \omega_{\dot{\rho}} = \dfrac{|b_{\dot{\rho},l}|}{\sqrt{\left(G_{\dot{\rho}t}^T P(t) G_{\dot{\rho}t} + W_{\dot{\rho}t}\right)^{-1}_{ll}}} \end{cases} \tag{41}$$

$b_{\rho,l}$ in formula (41) represents an $l^{th}$ element in the pseudo-range standardized residual matrix $b_\rho$, $l$ is a positive integer less than or equal to the number of the first screened observation information, and $\omega_\rho$ represents a test result corresponding to the $l^{th}$ element in the pseudo-range standardized residual matrix $b_\rho$. $b_{\dot{\rho},l}$ represents the $l^{th}$ element in the Doppler standardized residual matrix $b_{\dot{\rho}}$, and $\omega_{\dot{\rho}}$ represents a test result corresponding to the $l^{th}$ element in the Doppler standardized residual matrix $b_{\dot{\rho}}$.

When $\omega_\rho$ is greater than or equal to a given threshold (the threshold can be referred to as a first normal distribution test threshold), it indicates that the $l^{th}$ element in the pseudo-range standardized residual matrix $b_\rho$ does not meet the test condition (the test condition is: less than the first normal distribution test threshold), the pseudo-range observation data corresponding to the $l^{th}$ element in the pseudo-range standardized residual matrix $b_\rho$ is a pseudo-range observation data gross error, and the pseudo-range observation data gross error is eliminated. When $\omega_\rho$ is less than the first normal distribution test threshold, it indicates that the $l^{th}$ element in the pseudo-range standardized residual matrix $b_\rho$ meets the test condition, the pseudo-range observation data corresponding to the $l^{th}$ element in the pseudo-range standardized residual matrix $b_\rho$ is retained, and the pseudo-range observation data gross error in pseudo-range screening data included in the first screened observation information can be eliminated through the above formula (41), to obtain pseudo-range observation data without pseudo-range observation data gross errors, and the pseudo-range observation data without pseudo-range observation data gross errors can be referred to as candidate pseudo-range observation data. When $\omega_{\dot{\rho}}$ is greater than or equal to a given threshold (the threshold can be referred to as a second normal distribution test threshold), it indicates that the $l^{th}$ element in the Doppler standardized residual matrix $b_{\dot{\rho}}$ does not meet the test condition (the test condition is: less than the second normal distribution test threshold), the Doppler observation data corresponding to the $l^{th}$ element in the Doppler standardized residual matrix $b_{\dot{\rho}}$ is a Doppler observation data gross error, and the Doppler observation data gross error is eliminated. When $\omega_{\dot{\rho}}$ is less than the second normal distribution test threshold, it indicates that the $l^{th}$ element in the Doppler standardized residual matrix $b_{\dot{\rho}}$ meets the test condition, the Doppler observation data corresponding to the $l^{th}$ element in the Doppler standardized residual matrix $b_{\dot{\rho}}$ is retained, and the Doppler observation data gross error in Doppler screening data included in the first screened observation information can be eliminated through the above formula (41), to obtain Doppler observation data without Doppler observation data gross errors, and the Doppler observation data without Doppler observation data gross errors can be referred to as candidate Doppler observation data. Both the first normal distribution test threshold and the second normal distribution test threshold may be values determined according to actual needs, and will not be described in detail in the present disclosure. For example, the model verification and repair of the filter are completed, and the candidate pseudo-range observation data and the candidate Doppler observation data are determined as the second screened observation information (that is, current satellite observation information).

Step S413: Construct a measurement update matrix based on the second screened observation information.

In some embodiments, the third observation residual matrix can be constructed based on the second screened observation information obtained above, the third observation residual matrix can be shown in the above formula (32) and the above formula (34), and the only difference is that the above formula (32) and the above formula (34) are created based on the first screened observation information, and the third observation residual matrix is constructed based on the second screened observation information. Furthermore, the Jacobian matrix of the third observation residual matrix with respect to the current state parameter (for example, the predicted state parameter) of the filter may be determined as the measurement update matrix of the filter. Since the second screened observation information includes pseudo-range observation information and Doppler observation data, the third observation residual matrix may include a pseudo-range residual matrix and a Doppler residual matrix, and the measurement update matrix may also include a pseudo-range measurement update matrix and a Doppler measurement update matrix.

Step S414: Construct a measurement variance matrix based on the satellite observation information random error model obtained through adaptive estimation.

In some embodiments, the measurement variance matrix can be constructed by using the satellite observation information random error model (which may also be referred to as satellite observation error) obtained through adaptive estimation. The satellite observation information random error model is shown in formula (30), and the measurement variance matrix can be a matrix including empirical values determined based on the satellite observation information random error model shown in formula (30), that is, the measurement variance matrix is a matrix of fixed values for the filter. On the premise of ensuring the correlation between the measurement variance matrix and the satellite observation information random error model, the specific values in the measurement observation matrix can be set based on actual needs, which is not limited in the present disclosure. Since the satellite observation information random error model includes a pseudo-range observation random error model and a Doppler observation random error model, the measurement variance matrix corresponding to the filter may include a pseudo-range measurement variance matrix and a Doppler measurement variance matrix.

Step S415: Correct a terminal motion state according to the measurement update matrix and the measurement variance matrix.

In some embodiments, the terminal motion state may be corrected through the measurement update matrix and the measurement variance matrix, that is, the state parameter of the filter may be updated. For the pseudo-range observation data in the second screened observation information, the state parameter of the filter can be updated according to the following formula (42):

$$
\begin{cases}
x'(a) = x(a) + H(a) \cdot \tilde{B}' & (42) \\
H(a) = P(a) \cdot G_{\rho a}^T \left( G_{\rho a} \cdot P(a) \cdot G_{\rho a}^T + R_\rho(a) \right)^{-1} \\
\quad P'(a) = (I - H(a)G_{\rho a}) \cdot P(a)
\end{cases}
$$

x(a) represents the state parameter of the filter at an $a^{th}$ moment (hereinafter referred to as moment a), for example, the predicted state parameter (that is, the predicted motion state) after the filter model verification and repair. When the filter passes the model verification at the beginning and does not need to be repaired, the state parameter x(a) is the predicted state parameter after time update of the filter. x'(a) represents the state parameter (predicted motion state adjusted in the measurement update step) after the measurement update corresponding to the $a^{th}$ moment. HO indicates the pseudo-range filter gain updated by the filter at moment a, and $\tilde{B}'$ indicates the pseudo-range residual matrix corresponding to the pseudo-range observation data in the second screened observation information, that is, the pseudo-range residual matrix in the third observation residual matrix. P(a) represents the state covariance matrix of the filter at moment a, such as the state covariance matrix corresponding to the state parameter after filter model verification and repair. When the filter passes the model verification at the beginning and does not need to be repaired, P(a) is the predicted state covariance matrix after time update of the filter. P'(a) represents the state covariance matrix after the measurement update corresponding to moment a, $G_{\rho a}$ represents the Jacobian matrix of the pseudo-range residual matrix in the third observation residual matrix with respect to the filter state parameter x(a), $R_\rho(a)$ represents the pseudo-range measurement variance matrix in the measurement variance matrix, and I is an identity matrix.

In some embodiments, for the Doppler observation data in the second screened observation information, the state parameter of the filter can be updated according to the following formula (43):

$$
\begin{cases}
x'(a) = x(a) + \dot{H}(a) \cdot \dot{B}' & (43) \\
\dot{H}(a) = P(a) \cdot G_{\dot\rho a}^T \left( G_{\dot\rho a} \cdot P(a) \cdot G_{\dot\rho a}^T + R_{\dot\rho}(a) \right)^{-1} \\
\quad P'(a) = \left( I - \dot{H}(a)G_{\dot\rho a} \right) \cdot P(a)
\end{cases}
$$

$\dot{H}(a)$ indicates the Doppler filter gain updated by the filter at moment a, and $\dot{H}'$ indicates the Doppler residual matrix corresponding to the Doppler observation data in the second screened observation information, that is, the Doppler residual matrix in the third observation residual matrix. $G_{\dot\rho a}$ represents the Jacobian matrix of the Doppler residual matrix in the third observation residual matrix with respect to the filter state parameter x(a), and $R_{\dot\rho}(a)$ represents the Doppler measurement variance matrix in the measurement variance matrix. The pseudo-range filter gain H(a) and the Doppler filter gain $\dot{H}(a)$ can be referred to as filter gains.

The state parameter of the filter can be updated through the above formula (42) and formula (43). If the filter has completed the measurement update at moment a, the state parameter at moment a can be determined as the target state parameter, and the state covariance matrix at moment a can be determined as the target state covariance matrix. In other words, if the filter passes the model verification at the beginning of the measurement update phase and does not need to be repaired, the third observation residual matrix is constructed based on the second screened observation information, the predicted state parameter, and the satellite state information of the satellite corresponding to the second screened observation information, and then the state parameter of the filter at moment a can be obtained. When a is 1, the state parameter at moment a is the predicted parameter state after the filter completes the time update, and the state covariance matrix at moment a is the predicted state covariance matrix after the filter completes the time update. Based on the state covariance matrix at moment a, the measurement update matrix, and the measurement variance matrix, the filter gain of the filter at moment a (that is, the Doppler filter gain $\dot{H}(a)$ and the pseudo-range filter gain H(a)) is determined. The product of the filter gain at moment a and the third observation residual matrix is summed with the state parameter at moment a to obtain the target state parameter. The state covariance matrix corresponding to the target state parameter can be referred to as the target state covariance matrix.

In some embodiments, the terminal obtains the satellite observation information every preset time interval, and outputs the positioning result of the terminal through the processing of the method of each embodiment. The moment a refers to a time when the terminal activates the positioning function and obtains the satellite observation information and obtains the positioning result of the terminal for the $a^{th}$ moment. For the first moment, since there is no record of the history motion state, after the estimated motion state of the terminal at the first moment is estimated based on the satellite observation information (for example, steps S11 and S401), satellite observation information, satellite signal measurement data, and the estimated motion state can be used to initialize the state prediction model and the state adjustment model (for example, a filter), and the estimated motion state is used as the motion state of the terminal determined at the first moment, and the positioning result of the terminal is obtained accordingly. From the second moment, according to the method of each embodiment, the estimated motion state, the predicted motion state (that is, the state parameter after the time update), and the adjusted predicted motion state (that is, the state parameter after the measurement update) are sequentially obtained, then the motion state of the terminal is determined, and the positioning result of the terminal is obtained accordingly.

Step S416: Detect post-test satellite observation residual and a filter correction amount.

In some embodiments, the product of the filter gain at moment a and the third observation residual matrix can be determined as the filter correction amount of the filter at moment a, the filter correction amount can include a pseudo-range filter correction amount and a Doppler filter correction amount, the pseudo-range filter correction amount can be denoted as dz, and the Doppler filter correction amount can be denoted as $d\tilde{z}$.

The pseudo-range filter correction amount can be denoted as $dz = H(a) \cdot \tilde{B}'$. If $$\frac{|dz_o|}{\sqrt{P(a)_{oo}}}$$

is greater than or equal to a given threshold (herein, the threshold can be referred to as a first correction threshold, o represents the $o^{th}$ state parameter in the filter, and o is a positive integer less than or equal to the number of filter state parameters), it means that the $o^{th}$ state parameter in the filter fails the test and the filter needs to be reset, that is, step S402 is performed again. If $$\frac{|dz_o|}{\sqrt{P(a)_{oo}}}$$

is less than the first correction threshold, it means that the $o^{th}$ state parameter in the filter passes the test, and the current state parameter of the filter is retained. The Doppler filter correction amount is denoted as $d\tilde{z} = H(a) \cdot \tilde{B}'$. If $$\frac{|d\tilde{z}_o|}{\sqrt{P(a)_{oo}}}$$

is greater than or equal to a given threshold (herein, the threshold can be referred to as a second correction threshold), it means that the $o^{th}$ state parameter in the filter fails the test and the filter needs to be reset, that is, step S402 is performed again. If $$\frac{|d\tilde{z}_o|}{\sqrt{P(a)_{oo}}}$$

is less than the second correction threshold, it means that the $o^{th}$ state parameter in the filter passes the test, and the current state parameter of the filter is retained. Both the first correction threshold and the second correction threshold may be values determined according to actual needs, and will not be described in detail in the present disclosure. When each state parameter in the filter passes the test for pseudo-range and Doppler, it means that the filter correction amount corresponding to the filter passes the test.

Step S417: Perform normal distribution test on the post-test satellite observation residual.

In some embodiments, when the filter correction amount corresponding to the filter passes the test, the target state covariance matrix of the filter for the target state parameter, that is, P'(a), can be obtained, and the second residual covariance matrix corresponding to the filter is constructed based on the target covariance matrix, the measurement variance matrix, and the measurement update matrix. Further, normal distribution test may be performed on the third observation residual matrix through the second residual covariance matrix, to obtain a test result corresponding to each element included in the third observation residual matrix.

The second residual covariance matrix includes a pseudo-range residual covariance matrix and a Doppler residual covariance matrix, and normal distribution test is performed on the pseudo-range residual matrix in the third observation residual matrix based on the pseudo-range residual covariance matrix in the second residual covariance matrix, to obtain the test result corresponding to each element in the pseudo-range residual matrix of the third observation residual matrix. The test result is shown in the following formula (44):

$$\mu_{si} = \frac{|\tilde{B}'_{si}|}{\sqrt{\left(R_\rho(a) \cdot \left(G_{\rho a} \cdot P(a) \cdot G_{\rho a}^T + R_\rho(a)\right)^{-1} \cdot R_\rho(a)\right)_{sisi}}} \tag{44}$$

$$\tilde{B}'_{si}$$

represents an $si^{th}$ element in the pseudo-range residual matrix of the third observation residual matrix, si is a positive integer less than or equal to sn, $$\left(R_\rho(a) \cdot \left(G_{\rho a} \cdot P(a) \cdot G_{\rho a}^T + R_\rho(a)\right)^{-1} \cdot R_\rho(a)\right)$$

indicates the pseudo-range residual covariance matrix in the second residual covariance matrix, and $\mu_{si}$ indicates a result obtained after normal distribution test is performed on the $si^{th}$ element.

In some embodiments, normal distribution test is performed on the Doppler residual matrix in the third observation residual matrix based on the Doppler residual covariance matrix in the second residual covariance matrix, to obtain the test result corresponding to each element in the Doppler residual matrix of the third observation residual matrix. The test result is shown in the following formula (45):

$$\alpha_{qi} = \frac{|\dot{B}'_{qi}|}{\sqrt{\left(R_\rho(a)\cdot\left(G_{\dot\rho a}\cdot P(a)\cdot G_{\dot\rho a}^T + R_{\dot\rho}(a)\right)^{-1}\cdot R_{\dot\rho}(a)\right)_{qiqi}}} \quad (45)$$

$$\dot{B}'_{qi}$$

represents a $qi^{th}$ element in the pseudo-range residual matrix of the third observation residual matrix, qi is a positive integer less than or equal to qn, $$\left(R_{\dot\rho}(a)\cdot\left(G_{\dot\rho a}\cdot P(a)\cdot G_{\dot\rho a}^T + R_{\dot\rho}(a)\right)^{-1}\cdot R_{\dot\rho}(a)\right)$$

indicates the Doppler residual covariance matrix in the second residual covariance matrix, and $\alpha qi$ indicates a result obtained after normal distribution test is performed on the $qi^{th}$ element.

Step S418: Eliminate satellite observation information that fails the test.

In some embodiments, when the test result of an element in the third observation residual matrix does not satisfy the test condition, the satellite observation information corresponding to the element is eliminated. When $\mu_{si}$ in the above formula (44) is less than or equal to the given threshold (herein, the threshold can also be referred to as a third normal distribution detection threshold), it means that the $si^{th}$ element in the pseudo-range residual matrix of the third observation residual matrix does not meet the test condition, the pseudo-range observation data corresponding to the $si^{th}$ element (that is, the $si^{th}$ pseudo-range observation data in the second screened observation information) is determined as the pseudo-range observation data gross error, and the pseudo-range observation data gross error is eliminated from the pseudo-range observation data included in the second screening observation data.

When $\alpha_{qi}$ in the above formula (45) is less than or equal to the given threshold (herein, the threshold can also be referred to as a fourth normal distribution detection threshold), it means that the $qi^{th}$ element in the Doppler residual matrix of the third observation residual matrix does not meet the test condition, the Doppler observation data corresponding to the $qi^{th}$ element (that is, the $qi^{th}$ Doppler observation data in the second screened observation information) is determined as the Doppler observation data gross error, and the Doppler observation data gross error is eliminated from the Doppler observation data included in the second screening observation data. Based on the pseudo-range observation data obtained after eliminating the pseudo-range observation data gross error and the Doppler observation data obtained after eliminating the Doppler observation data gross error, the measurement update matrix is reconstructed, that is, the above step S413 is performed again until all remaining satellite observation information passes the normal distribution test. The first normal distribution test threshold and the third normal distribution test threshold in the present disclosure can be the same value or different values, and the second normal distribution test threshold and the fourth normal distribution test threshold can be the same value or different values, which is not limited in the present disclosure.

Step S419: Output terminal position and velocity information at the current time.

In some embodiments, when the test result corresponding to each element in the third observation residual matrix meets the test condition, the terminal position and the terminal velocity in the target state parameter may be determined as the corresponding terminal positioning result of the terminal. In other words, when the test result ($\mu_{si}$) corresponding to each element in the pseudo-range residual matrix of the third observation residual matrix is smaller than the third normal distribution detection threshold, and the test result ($\alpha_{qi}$) corresponding to each element in the Doppler residual matrix of the third observation residual matrix is less than the fourth normal distribution test threshold, the terminal position and the terminal velocity in the target state parameter of the filter are output, and the terminal position and the terminal velocity are the terminal positioning result of the terminal.

In the embodiments of the present disclosure, the terminal state information corresponding to the terminal can be estimated through the robust weighted least squares algorithm and satellite observation information, a robust Kalman filter can be established based on the terminal state information, gross observation information errors are eliminated from the satellite observation information through normal distribution test in two processes of time update and measurement update of the robust Kalman filter, and the terminal positioning result corresponding to the terminal is determined based on the satellite observation information from which the gross observation information errors are eliminated, which can improve the accuracy of the terminal position and implement sub-meter-level or lane-level positioning and assist lane-level positioning and navigation. The terminal positioning method implemented by the robust weighted least squares algorithm and the robust Kalman filter can be applied to various types of satellite positioning devices (for example, consumer devices and surveying devices), and can improve the applicability of terminal positioning.

Figure 8:
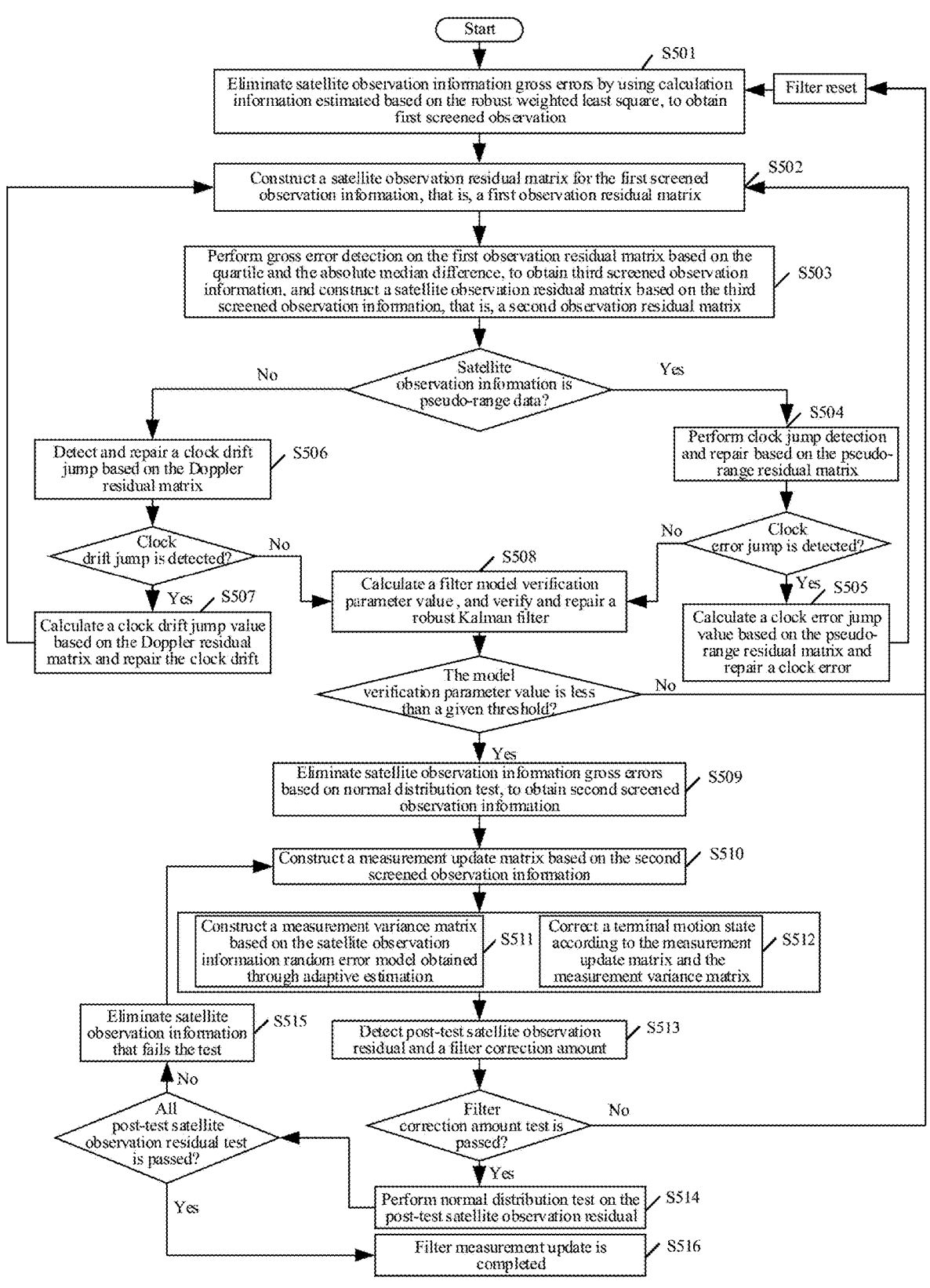
FIG. 8 is a schematic flowchart of measurement update of a target filter according to an embodiment of the present disclosure.

FIG. 8 is a schematic flowchart of measurement update of a filter according to an embodiment of the present disclosure. It can be understood that in this embodiment of the present disclosure, the terminal state information corresponding to the terminal is estimated based on the robust weighted least squares and satellite observation information, and initialization and time update of the filter are performed based on the terminal state information. For the measurement update process of the filter, the state parameter of the filter after the time update is the predicted state parameter, and the state covariance matrix corresponding to the predicted state parameter is the predicted state covariance matrix. As shown in FIG. 8, the measurement update process of the filter may include the following steps:

Step S501: Eliminate satellite observation information gross errors by using calculation information estimated based on the robust weighted least square, to obtain first screened observation information.

Step S502: Construct a satellite observation residual matrix for the first screened observation information, that is, a first observation residual matrix.

For specific implementation process of step S501 and step S502, refer to step S405 to step S406 in the corresponding embodiment in FIG. 6, and details are not described herein.

Step S503: Perform gross error detection on the first observation residual matrix based on a quartile and an absolute median difference, to obtain third screened observation information, and construct a satellite observation residual matrix, that is, a second observation residual matrix, based on the third screened observation information.

In some embodiments, gross error detection can be performed on the first observation residual matrix (for example, the pseudo-range residual matrix shown in formula (32) and the Doppler residual matrix shown in formula (34)), to eliminate the satellite observation information gross errors from the first screened observation information to obtain the third screened observation information. The satellite observation residual matrix constructed based on the third screened observation information can be referred to as the second observation residual matrix. A gross error detection process may include: obtaining a quantile difference between the upper quartile of the first observation residual matrix and the lower quartile of the first observation residual matrix; performing subtraction on the lower quartile of the first observation residual matrix and the product of the first gross error detection threshold and the quantile difference, to obtain the minimum element value corresponding to the first observation residual matrix; summing the upper quartile of the first observation residual matrix with the product of the first gross error detection threshold and the quantile difference, to obtain the maximum element value corresponding to the first observation residual matrix; determining, as a to-be-verified value, a ratio of the absolute value of a result of a subtraction operation of a $j^{th}$ element in the first observation residual matrix and the median of the first observation residual matrix to the absolute median difference of the first observation residual matrix, where j is a positive integer less than or equal to the number of the first screened observation information; and if the to-be-verified value is greater than the second gross error detection threshold and the $j^{th}$ element is within a gross error value range, eliminating the $j^{th}$ element from the first observation residual matrix to obtain the second observation residual matrix. The satellite observation information constituting the second observation residual matrix can be referred to as the third screened observation information. The gross error value range is a value range outside the corresponding range from the minimum element value to the maximum element value.

Since the first observation residual matrix includes the pseudo-range residual matrix $\tilde{B}$ and the Doppler residual matrix $\dot{\tilde{B}}$, during gross error detection on the first observation residual matrix, gross error detection needs to be separately performed on the pseudo-range residual matrix $\tilde{B}$ and the Doppler residual matrix $\dot{\tilde{B}}$. The following uses the pseudo-range residual matrix $\tilde{B}$ in the first observation residual matrix as an example to describe gross error detection processing. In this embodiment of the present disclosure, the lower quartile of the pseudo-range residual matrix $\tilde{B}$ is denoted as $$M_{\frac{1}{4}}^{\tilde{B}},$$

the upper quartile of the pseudo-range residual matrix $\tilde{B}$ is denoted as $$M_{\frac{3}{4}}^{\tilde{B}},$$

the minimum element value of the pseudo-range residual matrix $\tilde{B}$ is denoted as $$M_{min}^{\tilde{B}},$$

and the maximum element value of the pseudo-range residual matrix $\tilde{B}$ is denoted as $$M_{max}^{\tilde{B}}.$$

The minimum element value $$M_{min}^{\tilde{B}}$$

and the maximum element value $$M_{max}^{\tilde{B}}$$

can be shown in the following formula (46):

$$\begin{cases} M_{min}^{\tilde{B}} = M_{\frac{1}{4}}^{\tilde{B}} - \theta_\rho^1 \cdot \left( M_{\frac{3}{4}}^{\tilde{B}} - M_{\frac{1}{4}}^{\tilde{B}} \right) \\ M_{max}^{\tilde{B}} = M_{\frac{3}{4}}^{\tilde{B}} + \theta_\rho^1 \cdot \left( M_{\frac{3}{4}}^{\tilde{B}} - M_{\frac{1}{4}}^{\tilde{B}} \right) \end{cases} \tag{46}$$

$$\theta_\rho^1$$

denotes the first gross error detection threshold for the pseudo-range residual matrix $\tilde{B}$, and $$M_{\frac{3}{4}}^{\tilde{B}} - M_{\frac{1}{4}}^{\tilde{B}}$$

represents a quantile difference between the upper quantile of the pseudo-range residual matrix $\tilde{B}$ and the lower quantile of the pseudo-range residual matrix $\tilde{B}$. Gross error detection may be performed on each element in the pseudo-range residual matrix $\tilde{B}$ according to the following formula (47). Formula (47) is as follows:

$$flag_\rho^j = \begin{cases} 0, & \frac{|\tilde{B}_j - med(\tilde{B})|}{mad(\tilde{B})} > \theta_\rho^2 \text{ and } \left( \tilde{B}_j < M_{min}^B \text{ or } \tilde{B}_j > M_{max}^B \right) \\ 1, & \frac{|\tilde{B}_j - med(\tilde{B})|}{mad(\tilde{B})} \leq \theta_\rho^2 \text{ and } \left( \tilde{B}_j \leq M_{min}^{\tilde{B}} \text{ or } \tilde{B}_j \leq M_{max}^{\tilde{B}} \right) \end{cases} \tag{47}$$

$$flag_\rho^i$$

represents a gross error detection flag value corresponding to the $j^{th}$ element in the pseudo-range residual matrix $\tilde{B}$ (j is a positive integer less than or equal to the number sn of pseudo-range screening data included in the first screened observation information), $\tilde{B}_j$ represents the $j^{th}$ element in the pseudo-range residual matrix, med($\tilde{B}$) represents the median of the pseudo-range residual matrix $\tilde{B}$, mad($\tilde{B}$) represents the absolute median difference of the pseudo-range residual matrix $\tilde{B}$, $$\theta_\rho^2$$

represents the second gross error detection threshold for the pseudo-range residual matrix $\tilde{B}$, and $$\theta_\rho^1 \text{ and } \theta_\rho^2$$

can be set according to actual needs and are not limited in the present disclosure.

$$\frac{|\tilde{B}_j - med(\tilde{B})|}{mad(\tilde{B})}$$

represents the to-be-verified value of the pseudo-range residual matrix $$\tilde{B}, \left[M_{min}^{\tilde{B}}, M_{max}^{\tilde{B}}\right]$$

can be referred to as a valid value range of the pseudo-range residual matrix $\tilde{B}$, and $$\left(-\infty, M_{min}^{\tilde{B}}\right) \text{ or } \left(M_{max}^{\tilde{B}}, +\infty\right)$$

is referred to as the gross error value range of the pseudo-range residual matrix $\tilde{B}$.

When the to-be-verified value $$\frac{|\tilde{B}_j - med(\tilde{B})|}{mad(\tilde{B})}$$

is less than or equal to the second gross error detection threshold $$\theta_\rho^2,$$

and the $j^{th}$ element $\tilde{B}_j$ of the pseudo-range residual matrix $\tilde{B}$ is within the valid value range $$\left[M_{min}^{\tilde{B}}, M_{max}^{\tilde{B}}\right],$$

a gross error detection flag value corresponding to $\tilde{B}_j$ is 1 and indicates that the pseudo-range observation data corresponding to $\tilde{B}_j$ is valid data, and the pseudo-range observation data is retained. When the to-be-verified value $$\frac{|\tilde{B}_j - med(\tilde{B})|}{mad(\tilde{B})}$$

is greater than the second gross error detection threshold $$\theta_\rho^2,$$

and the $j^{th}$ element $\tilde{B}_j$ of the pseudo-range residual matrix $\tilde{B}$ is within the gross error value range $$\left(-\infty, M_{min}^{\tilde{B}}\right) \text{ or } \left(M_{max}^{\tilde{B}}, +\infty\right),$$

the gross error detection flag value corresponding to $\tilde{B}_j$ is 0 and indicates that the pseudo-range observation data corresponding to $\tilde{B}_j$ is the pseudo-range observation data gross error, and the pseudo-range observation data gross error is eliminated. Through the above formula (47), the pseudo-range observation data gross error can be eliminated from the pseudo-range screening observation data included in the first screened observation information, the pseudo-range residual matrix constructed based on the pseudo-range observation data obtained after eliminating the pseudo-range observation data gross error can be denoted as $\overline{B}$, and the pseudo-range residual matrix $\overline{B}$ is a matrix obtained after the element with the gross error detection flag value 0 is eliminated from the pseudo-range residual matrix $\tilde{B}$.

Similarly, the same gross error detection processing as that of the pseudo-range residual matrix $\tilde{B}$ may also be performed on the Doppler residual matrix $\dot{B}$ in the first observation residual matrix, for example, gross error detection can be performed on the Doppler residual matrix $\dot{B}$ through the following formula (48) and formula (49), to eliminate the Doppler observation data gross error in the Doppler residual matrix $\dot{B}$, the Doppler residual matrix constructed based on the Doppler observation data obtained after eliminating the Doppler observation data gross error can be denoted as $\overline{\dot{B}}$, and the Doppler residual matrix $\overline{\dot{B}}$ is a matrix obtained after the element with the gross error detection flag value 0 is eliminated from the Doppler residual matrix $\dot{B}$. Formula (48) and formula (49) can be expressed as follows:

$$\begin{cases} M_{min}^{\dot{B}} = M_{\frac{1}{4}}^{\dot{B}} - \theta_\rho^1 \cdot \left(M_{\frac{3}{4}}^{\dot{B}} - M_{\frac{1}{4}}^{\dot{B}}\right) \\ M_{max}^{\dot{B}} = M_{\frac{3}{4}}^{\dot{B}} + \theta_\rho^1 \cdot \left(M_{\frac{3}{4}}^{\dot{B}} - M_{\frac{1}{4}}^{\dot{B}}\right) \end{cases} \quad (48)$$

$$flag_\rho^j = \begin{cases} 0, \dfrac{|\dot{B}_j - med(\dot{B})|}{mad(\dot{B})} > \theta_\rho^2 \text{ and } \left(\dot{B}_j < M_{min}^{\dot{B}} \text{ or } \dot{B}_j > M_{max}^{\dot{B}}\right) \\ 1, \dfrac{|\dot{B}_j - med(\dot{B})|}{mad(\dot{B})} \leq \theta_\rho^2 \text{ and } \left(\dot{B}_j \leq M_{min}^{\dot{B}} \text{ or } \dot{B}_j \leq M_{max}^{\dot{B}}\right) \end{cases} \quad (49)$$

$$M_{\frac{1}{4}}^{\dot{B}}$$

represents the lower quartile of the Doppler residual matrix $\dot{\tilde{B}}$, $$M_{\frac{3}{4}}^{\dot{\tilde{B}}}$$

indicates the upper quartile of the Doppler residual matrix $\dot{\tilde{B}}$, $$\theta_\rho^1$$

indicates the first gross error detection threshold for the Doppler residual matrix $\dot{\tilde{B}}$, $$\theta_\rho^2$$

indicates the second gross error detection threshold for the Doppler residual matrix $\dot{\tilde{B}}$, and $$\theta_\rho^1 \text{ and } \theta_\rho^2$$

can be set according to actual needs and are not limited in the present disclosure.

$$M_{min}^{\dot{\tilde{B}}}$$

denotes the minimum element value of the Doppler residual matrix $\dot{\tilde{B}}$, and $$M_{max}^{\dot{\tilde{B}}}$$

denotes the maximum element value of the Doppler residual matrix $\dot{\tilde{B}}$. $\dot{\tilde{B}}_j$ represents the $j^{th}$ element of the Doppler residual matrix $\dot{\tilde{B}}$ (j is a positive integer less than or equal to the number qn of Doppler screening data included in the first screened observation information), $$flag_\rho^j$$

represents a gross error detection flag value corresponding to the $j^{th}$ element in the Doppler residual matrix $\dot{\tilde{B}}$, med ($\dot{\tilde{B}}$) represents the median of the Doppler residual matrix $\dot{\tilde{B}}$, mad ($\dot{\tilde{B}}$) denotes the absolute median difference of the Doppler residual matrix $\dot{\tilde{B}}$, $$\frac{\left|\dot{\tilde{B}}_j - med(\dot{\tilde{B}})\right|}{mad(\dot{\tilde{B}})}$$

denotes the to-be-verified value of the Doppler residual matrix $$\dot{\tilde{B}}, \left[M_{min}^{\dot{\tilde{B}}}, M_{max}^{\dot{\tilde{B}}}\right]$$

can be referred to as a valid value range of the Doppler residual matrix $\dot{\tilde{B}}$, and $$\left(-\infty, M_{min}^{\dot{\tilde{B}}}\right) \text{ or } \left(M_{max}^{\dot{\tilde{B}}}, +\infty\right)$$

is referred to as a gross error value range of the Doppler residual matrix $\dot{\tilde{B}}$. When $$flag_\rho^j$$

is equal to 0, it means that Doppler observation data corresponding to $\dot{\tilde{B}}_j$ is the Doppler observation data gross error, and the Doppler observation data gross error is eliminated. When $$flag_\rho^j$$

is equal to 1, it means that the Doppler observation data corresponding to $\dot{\tilde{B}}_j$ is valid data, and the Doppler observation data gross error is retained, so as to eliminate the Doppler observation data gross error from the Doppler observation data. In this embodiment of the present disclosure, the pseudo-range observation data from which pseudo-range observation data gross errors are eliminated and the Doppler observation data from which Doppler observation data gross errors are eliminated can be determined as the third screening observation data, and the pseudo-range residual matrix $\overline{B}$ and the Doppler residual matrix $\overline{\dot{B}}$ are referred to as the second observation residual matrix.

Step S504: Perform clock jump detection and repair based on the pseudo-range residual matrix.

Step S505: Calculate a clock error jump value based on the pseudo-range residual matrix and repair a clock error.

Step S506: Detect and repair a clock drift jump based on the Doppler residual matrix.

Step S507: Calculate a clock drift jump value based on the Doppler residual matrix and repair the clock drift.

Step S508: Calculate a filter model verification parameter value, and verify and repair the robust Kalman filter.

Step S509: Eliminate satellite observation value gross errors based on normal distribution test, to obtain second screened observation information.

Step S510: Construct a measurement update matrix based on the second screened observation information.

Step S511: Construct a measurement variance matrix based on the satellite observation value random error model obtained through adaptive estimation.

Step S512: Correct a terminal motion state according to the measurement update matrix and the measurement variance matrix.

Step S513: Detect post-test satellite observation residual and a filter correction amount.

Step S514: Perform normal distribution test on the post-test satellite observation residual.

Step S515: Eliminate a satellite observation value that fails the test.

Step S516: Complete filter measurement update, and output terminal position and velocity information of the filter at the current time.

For implementation process of step S507 to step S516, refer to step S407 to step S419 in the corresponding embodiment in FIG. 6, and details are not described herein.

The implementation of step S507 to step S516 in the embodiments of the present disclosure is the same as that of step S407 to step S419, and the only difference is that the satellite observation information used in the implementation process of step S407 to step S419 is the first screened observation information, but the satellite observation information used in the implementation process of step S507 to step S516 is the third screened observation information. For example, the clock error jump detection and repair process in the embodiments of the present disclosure may include: when a ratio of the absolute median difference of the pseudo-range residual matrix $\overline{B}$ in the second observation residual matrix to the median of the pseudo-range residual matrix $\overline{B}$ in the second observation residual matrix is less than the first clock error detection threshold ($\theta_m$), and a ratio of the standard deviation of the pseudo-range residual matrix $\overline{B}$ in the second observation residual matrix to the average value of the pseudo-range residual matrix $\overline{B}$ in the second observation residual matrix is less than the first clock error detection threshold, determining a ratio of the median of the pseudo-range residual matrix $\overline{B}$ in the second observation residual matrix to a root extraction operation result corresponding to diagonal elements in the predicted state covariance matrix as a clock error detection value; and if the clock error detection value is greater than or equal to the second clock error detection threshold ($\theta_{clk}$), determining that there is a clock error jump in the filter, and resetting the predicted state parameter and the predicted state covariance matrix in the filter. The first observation variance matrix in the embodiments of the present disclosure is constructed by using the signal-to-noise ratio corresponding to the third screened observation information and the altitude angle of the satellite corresponding to the third screened observation information.

Figure 9:
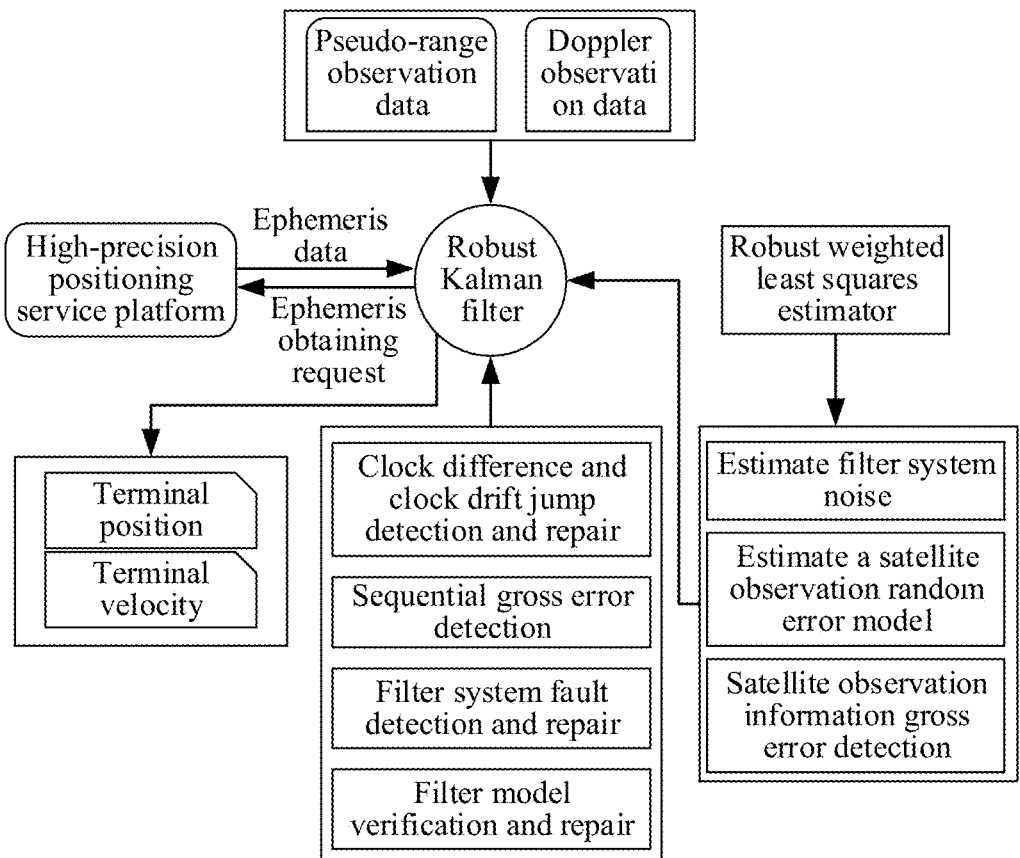
FIG. 9 is a schematic structural diagram of the entirety of a terminal positioning method according to an embodiment of the present disclosure.

FIG. 9 is a schematic structural diagram of the entirety of a terminal positioning method according to an embodiment of the present disclosure. In this embodiment of the present disclosure, for example, the filter is a robust Kalman filter. For example, as shown in FIG. 9, satellite observation information including pseudo-range observation data and Doppler observation data can be obtained, an ephemeris obtaining request may be sent to a high-precision positioning service platform of a CORS system, to obtain ephemeris data from the high-precision positioning service platform. The satellite state information (including the satellite position, the satellite velocity, the satellite clock error, and the satellite clock drift) corresponding to the satellite may be obtained based on the ephemeris data and the satellite observation information, then the terminal state information (the terminal position, the terminal velocity, the satellite clock error, and the satellite clock drift) can be estimated by using the robust weighted least squares and satellite observation information, and the Robust Kalman filter can be established by using the estimated terminal state information, that is, the initialization of the robust Kalman filter is completed (refer to step S402 in the embodiment corresponding to FIG. 6).

Based on calculation information during estimation of the terminal position information based on the robust weighted least squares, the filter system noise of the robust Kalman filter can be estimated (refer to step S403 in the embodiment corresponding to FIG. 6), the satellite observation random error model can be estimated (refer to step S404 in the embodiment corresponding to FIG. 6), and gross error detection may be performed on satellite observation information (refer to step S405 in the embodiment corresponding to FIG. 6).

In some embodiments, for the initialized robust Kalman filter, operations such as gross error detection (refer to step S503 in the embodiment corresponding to FIG. 8), clock error and clock drift jump detection and repair (refer to the step S407 to step S410 in the embodiment corresponding to FIG. 6), filter model verification and repair (refer to step S411 to step S412 in the embodiment corresponding to FIG. 6), and filter system fault detection and repair (refer to step S413 to step S418 in the embodiment corresponding to FIG. 6) may be performed, and the terminal positioning result corresponding to the terminal (including the terminal position and the terminal velocity finally determined) is finally outputted.

Figure 10:
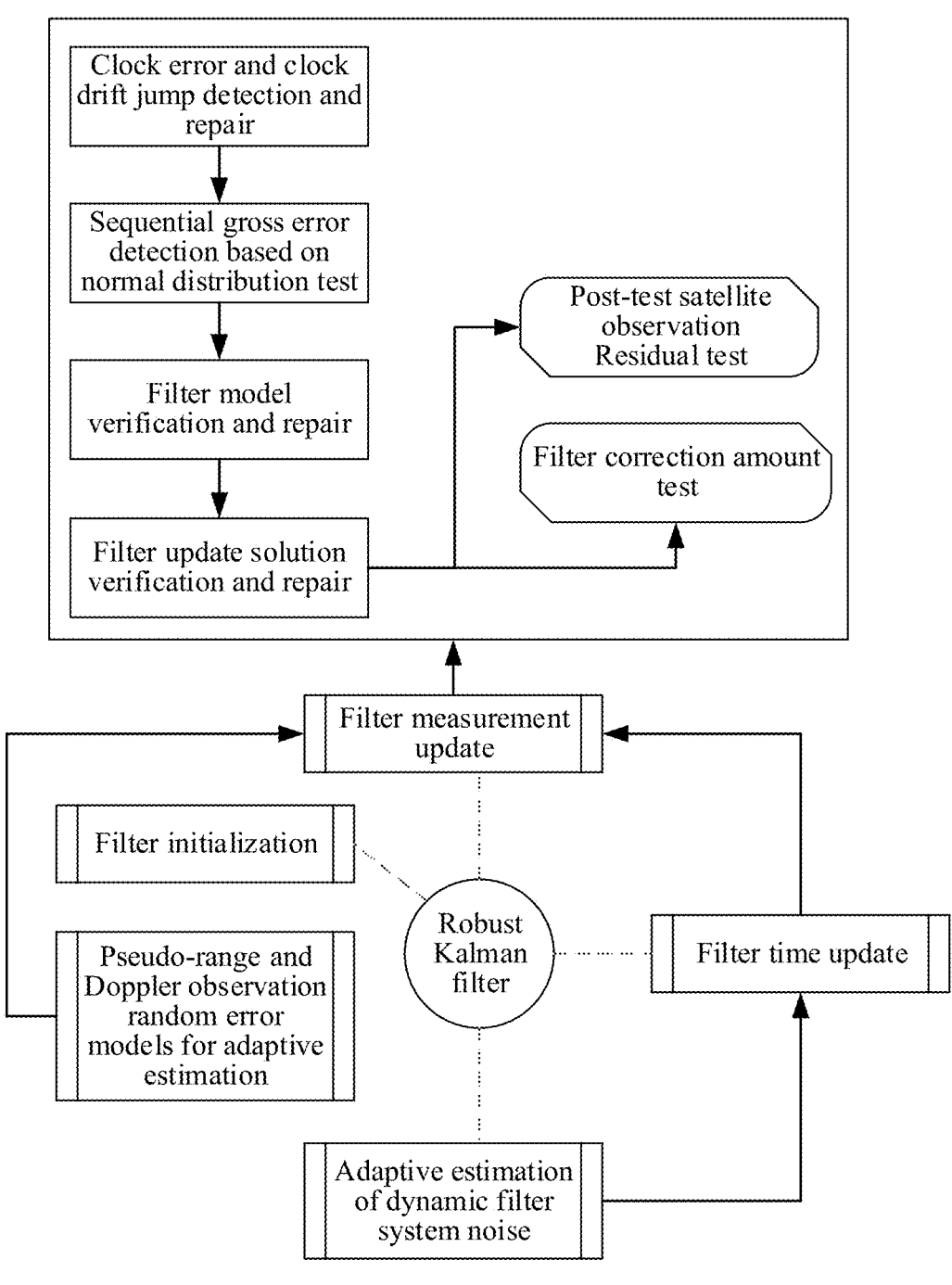
FIG. 10 is a schematic structural diagram of a target filter according to an embodiment of the present disclosure.

FIG. 10 is a schematic structural diagram of a filter according to an embodiment of the present disclosure. In this embodiment of the present disclosure, for example, the filter is a robust Kalman filter. For example, as shown in FIG. 10, the robust Kalman filter includes processes such as filter initialization, adaptive estimation of pseudo-range and Doppler observation random error models, adaptive estimation of dynamic filter system noise, filter time update, and filter measurement update. Filter initialization can be implemented by estimating the terminal position information based on the robust weighted least squares; the pseudo-range and Doppler observation random error models can be estimated based on calculation information during estimation of the terminal state information based on the robust weighted least squares; the dynamic filter system noise can be estimated by using the history state information generated based on the robust weighted least squares in iterative update; the filter time update can be implemented by the dynamic filter system noise; and the filter measurement update can be implemented by filter time update, pseudo-range and Doppler observation random error models, and a filter time update result. Filter measurement update can include operations such as clock error and clock drift jump detection and repair, filter model verification and repair, and filter update settlement verification and repair (which can also be referred to as filter system failure test and repair), and the filter update settlement verification and repair may include post-test satellite observation residual test and model correction amount test. The operations can be shown in the embodiment corresponding to FIG. 8, and are not repeated herein.

It can be understood that in the specific implementation of the present disclosure, the positioning result of the user terminal is involved. When the present disclosure is applied to a specific product or technology, the user permission or consent is required, and the application of the terminal positioning result needs to comply with relevant laws, regulations, and standards of relevant countries and regions.

In the embodiments of the present disclosure, the terminal state information corresponding to the terminal can be estimated through the robust weighted least squares algorithm and satellite observation information, a robust Kalman filter can be established based on the terminal state information, gross observation information errors are eliminated from the satellite observation information through normal distribution test in two processes of time update and measurement update of the robust Kalman filter, and the terminal positioning result corresponding to the terminal is determined based on the satellite observation information from which the gross observation information errors are eliminated, which can improve the accuracy of the terminal position and implement sub-meter-level or lane-level positioning and assist lane-level positioning and navigation. The terminal positioning method implemented by the robust weighted least squares algorithm and the robust Kalman filter can be applied to various types of satellite positioning devices (for example, consumer devices and surveying devices), and can improve the applicability of terminal positioning.

Figure 11A:
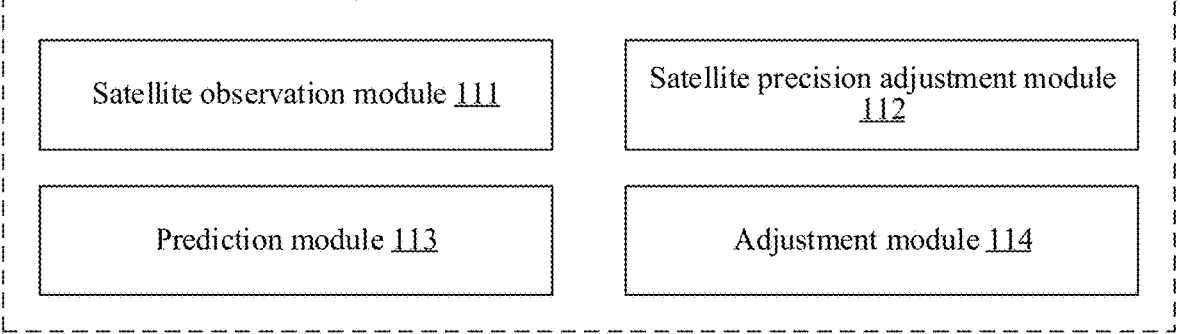
FIG. 11A and FIG. 11B are schematic structural diagrams of a terminal positioning apparatus according to an embodiment of the present disclosure.

FIG. 11A is a schematic structural diagram of a terminal positioning apparatus according to an embodiment of the present disclosure. As shown in FIG. 11A, the terminal positioning apparatus may include:

a satellite observation module 111, configured to obtain a positioning information set for the terminal at a first moment, where the positioning information set includes positioning information corresponding to multiple satellites; and estimate an estimated motion state of the terminal at the first moment based on the positioning information; and obtain measurement data of signal measurement performed by the terminal on each of the multiple satellites, and estimate, based on the measurement data, an error of positioning information corresponding to each of the multiple satellites;

a satellite precision adjustment module 112, configured to obtain converted positioning information converted from the estimated motion state, to calculate deviation information between the positioning information corresponding to each satellite in the positioning information set and the converted positioning information, and determine, based on the deviation information, an error adjustment factor corresponding to each satellite, the error adjustment factor corresponding to each satellite being used to adjust the error of the positioning information corresponding to each satellite;

a prediction module 113, configured to predict a predicted motion state of the terminal at the first moment through a state prediction model by using a history motion state of the terminal, the history motion state including a motion state of the terminal at least one moment before the first moment; and an adjustment module 114, configured to apply the positioning information set, the error, and the error adjustment factor to the state adjustment model to adjust the predicted motion state, to obtain an adjusted motion state of the terminal at the first moment; and determine a positioning result of the terminal at the first moment according to the adjusted motion state.

Figure 11B:
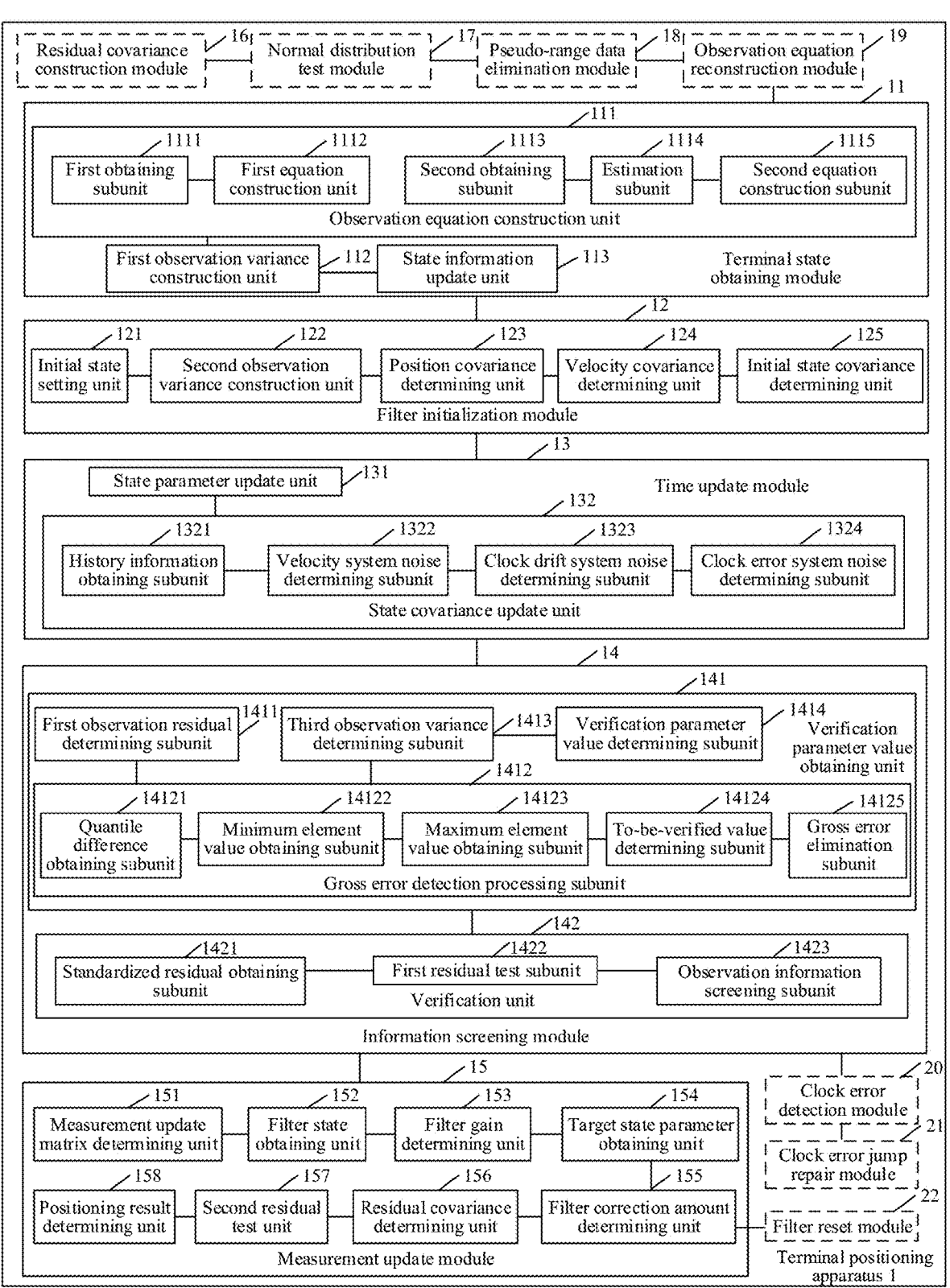

As another manner of dividing functional modules, FIG. 11B is a schematic structural diagram of a terminal positioning apparatus according to an embodiment of the present disclosure. As shown in FIG. 11B, the terminal positioning apparatus 1 can include: a terminal state obtaining module 11, a filter initialization module 12, a time update module 13, an information screening module 14, and a measurement update module 15.

The terminal state obtaining module 11 is configured to determine, based on satellite observation information, terminal state information corresponding to a terminal, and obtain first screened observation information from the satellite observation information according to the terminal state information.

The filter initialization module 12 is configured to set the terminal state information as an initial state parameter of a filter, and obtain an initial state covariance matrix of the filter for the initial state parameter.

The time update module 13 is configured to perform time update on the initial state parameter of the filter to obtain the predicted state parameter, and perform time update on the initial state covariance matrix of the filter to obtain a predicted state covariance matrix.

The verification parameter value obtaining module 14 is configured to select, from the first screened observation information, second screened observation information used to construct a measurement update matrix of the filter, and construct, according to a satellite observation error factor determined based on the terminal state information, a measurement variance matrix corresponding to the filter.

The measurement update module 15 is configured to perform measurement update on the predicted state parameter of the filter based on the measurement update matrix, the second screened observation information, the predicted state covariance matrix, and the measurement variance matrix, to obtain a target state parameter, and determine, according to the target state parameter, a terminal positioning result corresponding to the terminal.

For specific function implementation processes of the terminal state obtaining module 11, the filter initialization module 12, the time update module 13, the information screening module 14, and the measurement update module 15, refer to step S101 to step S105 in the above-mentioned embodiment corresponding to FIG. 3, and no further details will be given herein.

In one or more embodiments, the terminal state obtaining module 11 includes: an observation equation construction unit 111, a first observation variance construction unit 112, and a state information update unit 113.

The observation equation construction unit 111 is configured to obtain satellite observation information received by the terminal, set initial state information for the terminal, and construct a satellite observation equation between the terminal and the satellite based on the satellite observation information, the initial state information, and satellite state information corresponding to the satellite.

The first observation variance construction unit 112 is configured to construct a second observation variance matrix based on the signal-to-noise ratio corresponding to the satellite observation information and the altitude angle corresponding to the satellite.

The state information update unit 113 is configured to determine, according to the second observation variance matrix and the satellite observation equation, a state information correction amount corresponding to the terminal, and update the initial state information based on the state information correction amount to obtain the terminal state information corresponding to the terminal.

In some embodiments, the satellite observation information includes pseudo-range observation data, the initial state information includes an initial terminal position and an initial terminal clock error, and the satellite state information includes a satellite position and a satellite clock error.

The observation equation construction unit 111 includes: a first obtaining subunit 1111 and a first equation construction unit 1112.

The first obtaining subunit 1111 is configured to obtain a distance between the initial terminal position and the satellite position, and obtain a clock error difference between the initial terminal clock error and the satellite clock error.

The first equation construction unit 1112 is configured to determine a first estimated value between the terminal and the satellite according to the distance and the clock error difference, and construct a satellite observation equation between the terminal and the satellite based on the first estimated value and the pseudo-range observation data.

In some embodiments, the satellite observation information includes Doppler observation data, the initial state information includes an initial terminal velocity and an initial terminal clock drift, and the satellite state information includes a satellite velocity and a satellite clock drift.

The observation equation construction unit 111 includes: a second obtaining subunit 1113, an estimation subunit 1114, and a second equation construction subunit 1115.

The second obtaining subunit 1113 is configured to obtain a velocity difference between the initial terminal velocity and the satellite velocity, and obtain a unit observation value between the terminal and the satellite.

The estimation subunit 1114 is configured to obtain a clock drift difference between the initial terminal clock drift and the satellite clock drift, and determine the second estimated value between the terminal and the satellite according to the clock drift difference and the product of the velocity difference and the unit observation value.

The second equation construction subunit 1115 is configured to construct a satellite observation equation between the terminal and the satellite based on the second estimated value and the product of the wavelength of the signal transmitted by the satellite and the Doppler observation data.

In some embodiments, the number of satellites is N, and N is a positive integer. The first observation variance construction unit 112 is further configured to:

determine, according to the observation error parameter, signal-to-noise ratios of the satellite observation information corresponding to the N satellites, and the altitude angles corresponding to the N satellites, satellite observation errors corresponding to the N satellites.

The satellite observation errors corresponding to the N satellites are used as the diagonal elements of the matrix to construct the second observation variance matrix.

In some embodiments, the satellite observation information includes pseudo-range observation data, the initial state information includes an initial terminal position and an initial terminal clock error, the satellite state information includes a satellite position and a satellite clock error, and the terminal state information refers to a result obtained after k times of iteration of initial state information, where k is a positive integer.

The state information update unit 113 is further configured to:

obtain an estimated parameter of the $(k-1)^{th}$ iteration, where when k is 1, and the estimated parameter of the $(k-1)^{th}$ iteration includes the initial terminal position and the initial terminal clock error, and construct the satellite observation equation of each iteration based on the estimated parameter of this iteration;

determine a partial derivative of the satellite observation equation of the $(k-1)^{th}$ iteration for the estimated parameter of the $(k-1)^{th}$ iteration as the Jacobian matrix of the $(k-1)^{th}$ iteration, and construct the pseudo-range residual matrix of the $(k-1)^{th}$ iteration according to the satellite observation equation of the $(k-1)^{th}$ iteration;

obtain the state information correction amount of the $(k-1)^{th}$ iteration according to the Jacobian matrix of the $(k-1)^{th}$ iteration, the pseudo-range residual matrix of the $(k-1)^{th}$ iteration, and the second observation variance matrix;

when the state information correction amount of the $(k-1)^{th}$ iteration converges, determine the sum of the estimated parameter of the $(k-1)^{th}$ iteration and the state information correction amount of the $(k-1)^{th}$ iteration as the estimated parameter of the $k^{th}$ iteration;

construct the pseudo-range residual matrix of the $k^{th}$ iteration according to the satellite observation equation of the $k^{th}$ iteration, and determine the product of the transposed matrix corresponding to the pseudo-range residual matrix of the $k^{th}$ iteration, the inverse matrix corresponding to the pseudo-range observation variance matrix, and the pseudo-range residual matrix of the $k^{th}$ iteration as the test statistical count; and if the test statistical count is less than the test threshold, determine the estimated parameter of the $k^{th}$ iteration as the terminal state information corresponding to the terminal.

For specific function implementation processes of the observation equation construction unit 111, the first observation variance construction unit 112, the state information update unit 113, and the first obtaining subunit 1111, the first equation construction unit 1112, and the second obtaining subunit 1113, the estimation subunit 1114, and the second equation constructing subunit 1115 included in the observation equation construction unit 111, refer to the embodiments corresponding to FIG. 4 and FIG. 5, and details are not repeated herein.

In one or more embodiments, the terminal positioning apparatus 1 further includes: a residual covariance construction module 17, a normal distribution test module 18, a pseudo-range data elimination module 19, and an observation equation reconstruction module 20.

The residual covariance construction module 17 is configured to: if the test statistical count is greater than or equal to the test threshold, construct the first residual covariance matrix according to the Jacobian matrix of the $(k-1)^{th}$ iteration and the second observation variance matrix.

The normal distribution test module 18 is configured to perform normal distribution test on the pseudo-range residual matrix of the $k^{th}$ iteration according to the first residual covariance matrix, to obtain the test result corresponding to each element in the pseudo-range residual matrix of the $k^{th}$ iteration.

The pseudo-range data elimination module 19 is configured to: if the test result corresponding to the $i^{th}$ element in the pseudo-range residual matrix of the $k^{th}$ iteration does not meet the test condition, determine that the $i^{th}$ element has not passed the normal distribution test, and eliminate the pseudo-range observation data associated with the $i^{th}$ element, where i is a positive integer less than or equal to the number of pseudo-range observation data.

The observation equation reconstruction module 20 is configured to use, as satellite observation information, the remaining pseudo-range observation data after eliminating the pseudo-range observation data associated with the $i^{th}$ element, use the estimated parameter of the $k^{th}$ iteration as initial state information, and perform the step of constructing the satellite observation equation between the terminal and the satellite through initial state information, satellite state information, and satellite observation information again.

For specific function implementation processes of the residual covariance construction module 17, the normal distribution test module 18, the pseudo-range data elimination module 19, and the observation equation reconstruction module 20, refer to step S208 to step S210 in the embodiment corresponding to FIG. 4, and details are not repeated herein.

In one or more embodiments, the terminal state information includes the terminal position, the terminal velocity, the terminal clock error, and the terminal clock drift, and the first screened observation information includes pseudo-range screening data and Doppler screening data.

The filter initialization module 12 includes: an initial state setting unit 121, a second observation variance construction unit 122, a position covariance determining unit 123, a velocity covariance determining unit 124, and an initial state covariance determining unit 125.

The initial state setting unit 121 is configured to set the terminal position, the terminal velocity, the terminal clock error, and the terminal clock drift in the terminal state information as the initial state parameter of the filter.

The second observation variance construction unit 122 is configured to construct the pseudo-range observation variance matrix according to the signal-to-noise ratio corresponding to the pseudo-range screening data and the altitude angle of the satellite corresponding to the pseudo-range screening data, and construct the Doppler observation variance matrix according to the signal-to-noise ratio corresponding to the Doppler screening data and the altitude angle of the satellite corresponding to the Doppler screening data.

The position covariance determining unit 123 is configured to construct the position covariance matrix according to the pseudo-range observation variance matrix, the satellite observation error factor determined based on the terminal position and the terminal clock error, and the Jacobian matrix determined based on the pseudo-range screening data, the terminal position, and the terminal clock error.

The velocity covariance determining unit 124 is configured to construct the velocity covariance matrix according to the Doppler observation variance matrix, the satellite observation error factor determined based on the terminal velocity and the terminal clock drift, and the Jacobian matrix determined based on the Doppler screening data, the terminal velocity, and the terminal clock drift.

The initial state covariance determining unit 125 is configured to determine the diagonal matrix formed by the position covariance matrix and the velocity covariance matrix as the initial state covariance matrix corresponding to the filter.

For specific function implementation processes of the initial state setting unit 121, the second observation variance construction unit 122, the position covariance determining unit 123, the velocity covariance determining unit 124, and the initial state covariance determining unit 125, refer to step S402 in the embodiment corresponding to FIG. 6, and details are not repeated herein.

In one or more embodiments, the time update module 13 includes: a state parameter update unit 131 and a state covariance update unit 132.

The state parameter update unit 131 is configured to construct the state transition matrix of the filter based on the time difference of adjacent epochs, and perform time update on the initial state parameter of the filter according to the state transition matrix to obtain the predicted state parameter.

The state covariance update unit 132 is configured to obtain, based on the history state information corresponding to the terminal, the filter system noise corresponding to the filter, and perform time update on the initial state covariance matrix of the filter according to the state transition matrix and the filter system noise, to obtain the predicted state covariance matrix.

In some embodiments, the predicted state covariance matrix is a state covariance matrix of the initial state covariance matrix in the filter at time t, where t is a positive integer.

The state covariance update unit 132 is further configured to:

construct the noise covariance matrix by using the filter system noise and index information corresponding to the time difference of adjacent epochs;

obtain the state covariance matrix of the filter at time t−1, where when t is 1, the state covariance matrix of the filter at time t−1 is the initial state covariance matrix; and sum the product of the state transition matrix, the state covariance matrix at time t−1, and the transposed matrix corresponding to the state transition matrix with the noise covariance matrix to obtain the predicted covariance matrix.

For specific function implementation processes of the state parameter update unit 131 and the state covariance update unit 132, refer to the step S403 in the embodiment corresponding to FIG. 6, and details are not repeated herein.

In one or more embodiments, the state covariance update unit 132 includes: a history information obtaining subunit 1321, a velocity system noise determining subunit 1322, a clock drift system noise determining subunit 1323, and a clock error system noise determining subunit 1324.

The history information obtaining subunit 1321 is configured to: if the initial state information includes the terminal position, the terminal velocity, the terminal clock error, and the terminal clock drift, obtain a history terminal velocity sequence, a history terminal clock drift sequence, and a history terminal clock error sequence in the history state information corresponding to the terminal; where the history terminal velocity sequence, the history terminal clock drift sequence, and the history terminal clock error sequence are all determined based on a time sliding window of a size p, and p is a positive integer.

The velocity system noise determining subunit 1322 is configured to obtain a first variance value corresponding to the history terminal velocity sequence, and determine the product of the first variance value and a time difference between adjacent epochs as the velocity system noise corresponding to the filter.

The clock drift system noise determining subunit 1323 is configured to obtain a second variance value corresponding to the history terminal clock drift sequence, and determine the product of the second variance value and a time difference between adjacent epochs as the clock drift system noise corresponding to the filter.

The clock error system noise determining subunit 1324 is configured to obtain a third variance value corresponding to the history terminal clock error sequence, and determine the product of the third variance value and a time difference between adjacent epochs as the clock error system noise corresponding to the filter; and determine the velocity system noise, the clock drift system noise, and the clock error system noise as the filter system noise corresponding to the filter For specific function implementation processes of the history information obtaining subunit 1321, the velocity system noise determining subunit 1322, the clock drift system noise determining subunit 1323, and the clock error system noise determining subunit 1324, refer to step S403 in the embodiment corresponding to FIG. 6, and details are not repeated herein.

In one or more embodiments, the information screening module 14 includes: a verification parameter value obtaining unit 141 and a verification unit 142.

The verification parameter value obtaining unit 141 is configured to determine, based on the first screened observation information, the predicted state covariance matrix, and the first observation variance matrix associated with the first screened observation information, a model verification parameter value corresponding to the filter.

The verification unit 142 is configured to: when the model verification parameter value is less than a model verification threshold, select, from the first screened observation information through normal distribution test, the second screened observation information for constructing the measurement update matrix of the filter.

For specific function implementation processes of the verification parameter value obtaining unit 141 and the verification unit 142, refer to step S104 in the embodiment corresponding to FIG. 3, and details are not repeated herein.

In one or more embodiments, the verification parameter value obtaining unit 141 includes: a first observation residual determining subunit 1411, a gross error detection processing subunit 1412, a third observation variance determining subunit 1413, and a verification parameter value determining subunit 1414.

The first observation residual determining subunit 1411 is configured to construct the first observation residual matrix based on the first screened observation information, the satellite state information of the satellite corresponding to the first screened observation information, and the predicted state information.

The gross error detection processing subunit 1412 is configured to perform gross error detection on the first observation residual matrix according to the quartile and the absolute median difference of the first observation residual matrix, to obtain a second observation residual matrix.

The third observation variance determining subunit 1413 is configured to determine the satellite observation information included in the second observation residual matrix as the third screened observation information, and construct the first observation variance matrix based on the signal-to-noise ratio corresponding to the third screened observation information and the altitude angle of the satellite corresponding to the third screened observation information.

The verification parameter value determining subunit 1414 is configured to determine, based on the second observation residual matrix, the predicted state covariance matrix, a Jacobian matrix of the second observation residual matrix for the predicted state parameter, and the first observation variance matrix, the model verification parameter value corresponding to the filter.

For specific function implementation processes of the first observation residual determining subunit 1411, the gross error detection processing subunit 1412, the third observation variance determining subunit 1413, and the verification parameter value determining subunit 1414, refer to step S502 to step S508 in the embodiment corresponding to FIG. 8, and details are not repeated herein.

In one or more embodiments, the gross error detection processing subunit 1412 includes: a quantile difference obtaining subunit 14121, a minimum element value obtaining subunit 14122, a maximum element value obtaining subunit 14123, a to-be-verified value determining subunit 14124, and a gross error elimination subunit 14125.

The quantile difference obtaining subunit 14121 is configured to obtain a quantile difference between the upper quartile of the first observation residual matrix and the lower quartile of the first observation residual matrix.

The minimum element value obtaining subunit 14122 is configured to perform subtraction on the lower quartile of the first observation residual matrix and the product of the first gross error detection threshold and the quantile difference, to obtain the minimum element value corresponding to the first observation residual matrix.

The maximum element value obtaining subunit 14123 is configured to sum the upper quartile of the first observation residual matrix with the product of the first gross error detection threshold and the quantile difference, to obtain the maximum element value corresponding to the first observation residual matrix.

The to-be-verified value determining subunit 14124 is configured to determine a ratio of the absolute value of a result of a subtraction operation on the $j^{th}$ element in the first observation residual matrix and the median of the first observation residual matrix to the absolute median difference of the first observation residual matrix as the to-be-verified value; where j is a positive integer less than or equal to the number of first screened observation information.

The gross error elimination subunit 14125 is configured to: if the to-be-verified value is greater than the second gross error detection threshold and the $j^{th}$ element is within a gross error value range, eliminate the $j^{th}$ element from the first observation residual matrix, to obtain the second observation residual matrix; where the gross error value range refers to a value range outside the corresponding range from the minimum element value to the maximum element value.

For specific function implementation processes of the quantile difference obtaining subunit 14121, the minimum element value obtaining subunit 14122, the maximum element value obtaining subunit 14123, the to-be-verified value determining subunit 14124, and the gross error elimination subunit 14125, refer to step S503 in the embodiment corresponding to FIG. 8, and details are not repeated herein.

In one or more embodiments, the second observation residual matrix is constructed based on pseudo-range screening data in satellite observation information.

The terminal positioning apparatus 1 further includes: a clock error detection module 20 and a clock error jump repair module 21.

The clock error detection module 20 is configured to: when a ratio of the absolute median difference of the second observation residual matrix to the median of the second observation residual matrix is less than a first clock error detection threshold, and a ratio of a standard deviation of the second observation residual matrix to the average value of the second observation residual matrix is less than the first clock error detection threshold, determine a ratio of the median of the second observation residual matrix to a corresponding root extraction operation result of the diagonal element in the predicted state covariance matrix as the clock error detection value.

The clock error jump repair module 21 is configured to: if the clock error detection value is greater than or equal to the second clock error detection threshold, determine that there is a clock error jump in the filter, and reset the predicted state parameter and the predicted state covariance matrix of the filter.

For specific function implementation processes of the clock error detection module 20 and the clock error jump repair module 21, refer to step S407 to step S408 in the embodiment corresponding to FIG. 6, and details are not repeated herein.

In one or more embodiments, the verification unit 142 includes: a standardized residual obtaining subunit 1421, a first residual test subunit 1422, and an observation information screening subunit 1423.

The standardized residual obtaining subunit 1421 is configured to: when the model verification parameter value is smaller than the model verification threshold, standardize the model verification parameter, and obtain the standardized residual difference matrix.

The first residual test subunit 1422 is configured to obtain, by performing normal distribution test on the standardized residual matrix, a test result corresponding to each element included in the standardized residual matrix.

The observation information screening subunit 1423 is configured to: if a test result corresponding to the $1^{th}$ element in the standardized residual matrix does not meet the test condition, determine that the $1^{th}$ element has not passed the normal distribution test, and eliminate satellite observation information corresponding to the $1^{th}$ element from the first screened observation information, to obtain the second screened observation information, where i is a positive integer less than or equal to the number of the first screened observation information.

For specific function implementation processes of the standardized residual obtaining subunit 1421, the first residual test subunit 1422, and the observation information screening subunit 1423, refer to step S412 in the embodiment corresponding to FIG. 6, and details are not repeated herein.

In some embodiments, the terminal positioning apparatus 1 further includes: a filter reset module 22.

The filter reset module 22 is configured to: when the model verification parameter value is greater than or equal to the model verification threshold, reset the initial state parameter and the initial state covariance matrix of the filter.

For specific function implementation processes of the filter reset module 22, refer to the embodiment corresponding to FIG. 8, and details are not repeated herein.

In one or more embodiments, the target state parameter is the state parameter of the predicted state parameter in the filter at moment a, where a is a positive integer.

The measurement update module 15 includes: a measurement update matrix determining unit 151, a filter state obtaining unit 152, a filter gain determining unit 153, a target state parameter obtaining unit 154, a filter correction amount determining unit 155, a residual covariance determining unit 156, a second residual test unit 157, and a positioning result determining unit 158.

The measurement update matrix determining unit 151 is configured to: construct a third observation residual matrix by using the second screened observation information, the predicted state parameter, and the satellite state information, and determine a Jacobian matrix of the third observation residual matrix for the predicted state parameter as the measurement update matrix corresponding to the filter.

The filter state obtaining unit 152 is configured to obtain the state parameter of the filter at moment a and the state covariance matrix of the filter at moment a, where when i is 1, the state parameter at moment a is the predicted state parameter, and the state covariance matrix at moment a is the predicted state covariance matrix, and the state covariance matrix at moment a is the covariance matrix of the filter for the state parameter at moment a.

The filter gain determining unit 153 is configured to: based on the state covariance matrix at moment a, the measurement update matrix, and the measurement variance matrix, determine the filter gain of the filter at moment a.

The target state parameter obtaining unit 154 is configured to sum the product of the filter gain at moment a and the third observation residual matrix with the state parameter at moment a to obtain the target state parameter.

The filter correction amount determining unit 155 is configured to determine the product of the filter gain at moment a and the third observation residual matrix as the filter correction amount of the filter at moment a.

The residual covariance determining unit 156 is configured to: when the filter correction amount at moment a passes the test, obtain the target state covariance matrix of the filter for the target state parameter, and construct, based on the target covariance matrix, the measurement variance matrix, and the measurement update matrix, the second residual covariance matrix corresponding to the filter.

The second residual test unit 157 is configured to perform normal distribution test on the third observation residual matrix through the second residual covariance matrix, to obtain a test result corresponding to each element included in the third observation residual matrix.

The positioning result determining unit 158 is configured to: if the test result corresponding to each element in the third observation residual matrix meets the test condition, determine the target state parameter as the terminal positioning result corresponding to the terminal.

For specific function implementation processes of the measurement update matrix determining unit 151, the filter state obtaining unit 152, the filter gain determining unit 153, the target state parameter obtaining unit 154, the filter correction amount determining unit 155, the residual covariance determining unit 156, the second residual test unit 157, and the positioning result determining unit 158, refer to step S413 to step S419 the embodiment corresponding to FIG. 6, and details are not repeated herein.

In the embodiments of the present disclosure, the terminal state information corresponding to the terminal can be estimated through the robust weighted least squares algorithm and satellite observation information, a robust Kalman filter can be established based on the terminal state information, gross observation information errors are eliminated from the satellite observation information through normal distribution test in two processes of time update and measurement update of the robust Kalman filter, and the terminal positioning result corresponding to the terminal is determined based on the satellite observation information from which the gross observation information errors are eliminated, which can improve the accuracy of the terminal position and implement sub-meter-level or lane-level positioning and assist lane-level positioning and navigation. The terminal positioning method implemented by the robust weighted least squares algorithm and the robust Kalman filter can be applied to various types of satellite positioning devices (for example, consumer devices and surveying devices), and can improve the applicability of terminal positioning.

Figure 12:
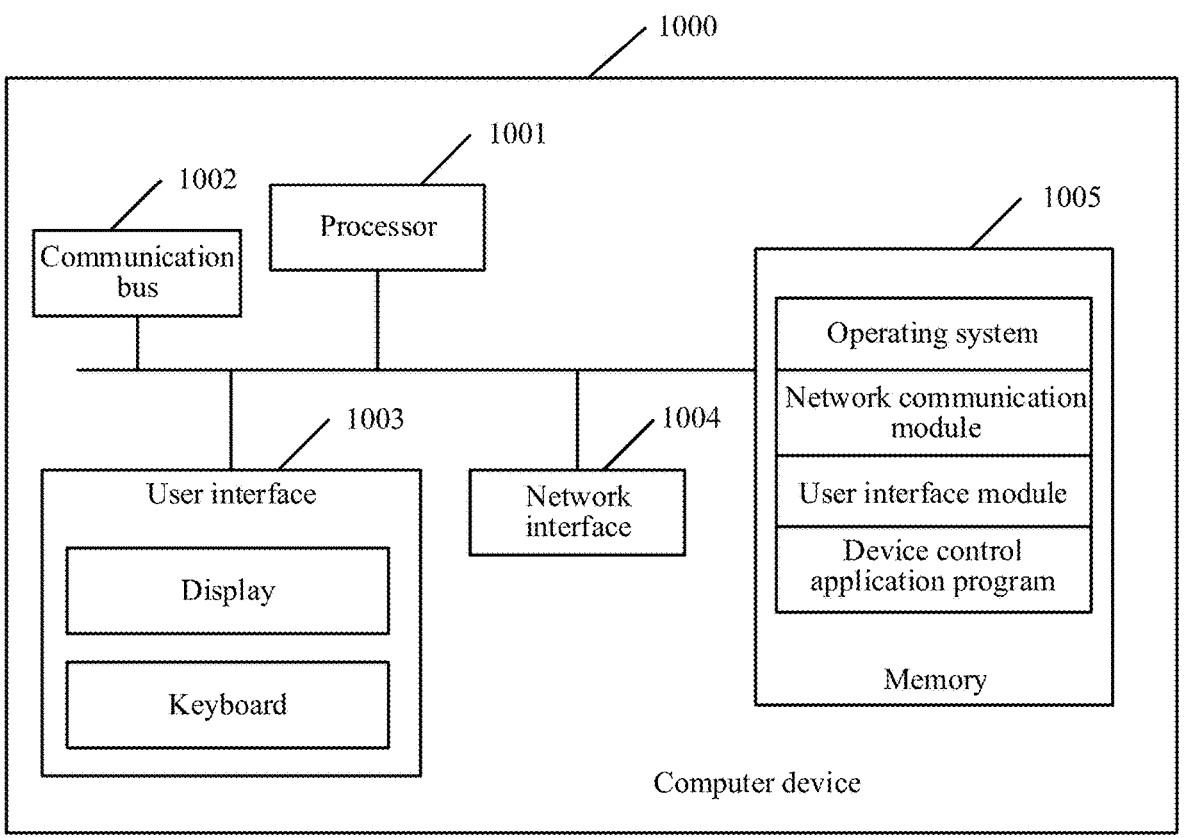
FIG. 12 is a schematic structural diagram of a computer device according to an embodiment of the present disclosure.

FIG. 12 is a schematic structural diagram of a computer device according to an embodiment of the present disclosure. For example, as shown in FIG. 12, the computer device 1000 may be a user terminal integrated with a satellite positioning device, or may be a server integrated with a satellite positioning device, which are not limited herein. For ease of understanding, in the present disclosure, for example, a computer device is a user terminal integrated with a satellite positioning device. The computer device 1000 can include: a processor 1001, a network interface 1004, and a memory 1005. In addition, the computer device 1000 can also include: a user interface 1003 and at least one communication bus 1002. The communication bus 1002 is configured to implement connection and communication between these components. The user interface 1003 may include a display (Display) and a keyboard (Keyboard). For example, the user interface 1003 may further include a standard wired interface and wireless interface. In some embodiments, the network interface 1004 may include a standard wired interface and a standard wireless interface (for example, a WiFi interface). The memory 1005 may be a high-velocity RAM memory, or may be a non-volatile memory (non-volatile memory), for example, at least one magnetic disk memory. In some embodiments, the memory 1005 may further be at least one storage apparatus that is located far away from the processor 1001. For example, as shown in FIG. 12, the memory 1005 used as a computer readable storage medium may include an operating system, a network communication module, a user interface module, and a device control application program.

In the computer device 1000 shown in FIG. 12, the network interface 1004 can provide a network communication function; the user interface 1003 is mainly configured to provide input interfaces for users; and the processor 1001 can be used to call device control applications stored in memory 1005 to perform the following:

determining, based on satellite observation information, terminal state information corresponding to a terminal, and obtaining first screened observation information from the satellite observation information according to the terminal state information;

setting the terminal state information as an initial state parameter of a filter, and obtaining an initial state covariance matrix of the filter for the initial state parameter;

performing time update on the initial state parameter of the filter to obtain the predicted state parameter, and performing time update on the initial state covariance matrix of the filter to obtain a predicted state covariance matrix;

selecting, from the first screened observation information, second screened observation information used to construct a measurement update matrix of the filter, and constructing, according to a satellite observation error factor determined based on the terminal state information, a measurement variance matrix corresponding to the filter; and performing measurement update on the predicted state parameter of the filter based on the measurement update matrix, the second screened observation information, the predicted state covariance matrix, and the measurement variance matrix, to obtain a target state parameter, and determining, according to the target state parameter, a terminal positioning result corresponding to the terminal.

It should be understood that the computer device 1000 described in this embodiment of the present disclosure can perform the terminal positioning methods in the foregoing embodiments corresponding to FIG. 3 to FIG. 6 and FIG. 8, and can also perform steps performed by the terminal positioning apparatus 1 in the foregoing embodiment corresponding to FIG. 11A and FIG. 11B. Details are not repeated herein. In addition, the description of the beneficial effect of adopting the same method will not be repeated here.

Besides, an embodiment of the present disclosure further provides a computer readable storage medium. The computer readable storage medium stores computer programs executed by the foregoing terminal positioning apparatus 1. The computer program includes program instructions. When executing the program instructions, a processor can perform the terminal positioning method described in the foregoing embodiments corresponding to FIG. 3 to FIG. 6 and FIG. 8. Therefore, details are not repeated herein. In addition, the description of the beneficial effect of adopting the same method will not be repeated here. For technical details that are not disclosed in the computer readable storage medium embodiments of the present disclosure, refer to the descriptions of the method embodiments of the present disclosure. As an example, the program instructions may be deployed for execution on one computer device, or deployed for execution on a plurality of computer devices located at one position, or distributed on a plurality of computer devices distributed at a plurality of positions and interconnected through a communication network, where the plurality of computer devices distributed at a plurality of positions and interconnected through a communication network can form a blockchain system.

Besides, an embodiment of the present disclosure further provides a computer program product or a computer program, including computer instructions stored in a computer readable storage medium. A processor of a computer device reads the computer instructions from the computer readable storage medium, and the processor executes the computer instructions, so that the computer device performs the terminal positioning method described in the foregoing embodiments corresponding to FIG. 3 to FIG. 6 and FIG. 8. Therefore, details are not repeated herein. In addition, the description of the beneficial effect of adopting the same method will not be repeated here. For the technical details not disclosed in the computer program product or the embodiment of the computer program involved in the application, refer to the description of the embodiment of the method of the application.

To simplify the description, the foregoing method embodiments are described as a series of action combination. But a person of ordinary skill in the art should know that the present disclosure is not limited to any described sequence of the action, as some steps can adopt other sequences or can be executed simultaneously according to the present disclosure. In addition, a person skilled in the art should also know that all the embodiments described in the specification are preferred embodiments, and the related actions and modules are not necessarily mandatory to the present disclosure.

The steps in the method of the embodiments of the present disclosure can be sequentially adjusted, merged and deleted according to actual needs.

The modules in the apparatus of the embodiments of the present disclosure can be merged, divided and deleted according to actual needs.

The term module (and other similar terms such as submodule, unit, subunit, etc.) in the present disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules.

Moreover, each module can be part of an overall module that includes the functionalities of the module.

A person of ordinary skill in the art should understand that all or a part of the processes of the method in the foregoing embodiment may be implemented by a computer program instructing relevant hardware. The computer program may be stored in a computer readable storage medium. When the program is run, the processes of the method in the foregoing embodiment are performed. The storage medium may be a magnetic disc, an optical disc, a read-only memory (ROM), or a random access memory (RAM).

Technical features of the foregoing embodiments may be combined in different manners to form other embodiments. To make description concise, not all possible combinations of the technical features in the foregoing embodiments are described. However, the combinations of these technical features shall be considered as falling within the scope recorded by this specification provided that no conflict exists.

What is disclosed above is merely exemplary embodiments of the present disclosure, and certainly is not intended to limit the scope of the claims of the present disclosure. Therefore, equivalent variations made in accordance with the claims of the present disclosure shall fall within the scope of the present disclosure.

What is claimed is:

1. A terminal positioning method, executed by a terminal, the method comprising:

obtaining a positioning information set for the terminal at a first moment, and determining an estimated motion state of the terminal at the first moment based on the positioning information set, the positioning information set comprising positioning information corresponding to multiple satellites received from the multiple satellites;

obtaining measurement data by performing signal measurement on satellite signals of the multiple satellites, and estimating, based on the measurement data, an error of positioning information corresponding to a satellite of the multiple satellites;

obtaining converted positioning information converted from the estimated motion state, to calculate deviation information between the positioning information corresponding to the satellite in the positioning information set and the converted positioning information;

determining, based on the deviation information, an error adjustment factor corresponding to the satellite, the error adjustment factor corresponding to the satellite being used to adjust the error of the positioning information corresponding to the satellite;

providing a predicted motion state of the terminal at the first moment through a state prediction model by using a history motion state of the terminal, the history motion state comprising a motion state of the terminal at least one moment before the first moment;

applying the positioning information set, the error, and the error adjustment factor to a state adjustment model to adjust the predicted motion state, to obtain an adjusted motion state of the terminal at the first moment; and determining a positioning result of the terminal at the first moment according to the adjusted motion state.

2. The method according to claim 1, further comprising:

eliminating, by using an abnormality detection method, positioning information of at least one satellite from positioning information of a first number of satellites obtained by the terminal at the first moment, to obtain the positioning information set.

3. The method according to claim 1, wherein determining the estimated motion state of the terminal at the first moment based on the positioning information set comprises:

setting an initial estimated motion state;

obtaining initial converted positioning information converted from the initial estimated motion state;

iteratively adjusting the initial estimated motion state according to deviation information of the positioning information corresponding to the satellite in the positioning information set relative to the initial converted positioning information, until a preset condition is met; and using an estimated motion state when the preset condition is met as the estimated motion state of the terminal at the first moment.

4. The method according to claim 3, further comprising:

testing, by using a hypothesis testing algorithm, the estimated motion state when the preset condition is met;

in response to a failure of the testing, according to the deviation information of the positioning information corresponding to the satellite in the positioning information set relative to the converted positioning information corresponding to the estimated motion state when the preset condition is met, eliminating the positioning information corresponding to at least one satellite from the positioning information set, to update the positioning information set, and performing the step of iteratively adjusting the initial estimated motion state by using the updated positioning information set; and using the estimated motion state when the preset condition is met as the estimated motion state of the terminal at the first moment in response to success of the test.

5. The method according to claim 1, wherein the measurement data comprises at least one of: a satellite altitude angle or a signal-to-noise ratio of a satellite signal; and estimating, based on the measurement data, the error of the positioning information corresponding to the satellite of the multiple satellites comprises:

obtaining, by using the measurement data and a preset algorithm, the error of the positioning information corresponding to the satellite of the multiple satellites.

6. The method according to claim 1, wherein determining, based on the deviation information, the error adjustment factor corresponding to the satellite comprises:

applying the deviation information between the positioning information corresponding to the satellite and the converted positioning information and the error of the positioning information corresponding to the satellite to a preset conversion relationship, to determine the error adjustment factor corresponding to the satellite;

wherein according to the preset conversion relationship, when first deviation information corresponding to a first satellite is greater than second deviation information corresponding to a second satellite, an error adjustment degree of a first error adjustment factor corresponding to the first satellite is larger than an error adjustment degree of a second error adjustment factor of corresponding to the second satellite.

7. The method according to claim 1, further comprising:

performing an initialization of the state prediction model and the state adjustment model, wherein the initialization comprises:

setting the predicted motion state of the state prediction model as the estimated motion state of the terminal at the first moment; and obtaining an initial value of a parameter in the state adjustment model based on measurement data of the satellite of the multiple satellites, the error, and the error adjustment factor.

8. The method according to claim 1, wherein predicting the predicted motion state of the terminal at the first moment by using the state prediction model comprises:

applying an adjusted motion state of the terminal at a second moment in the history motion state to the state prediction model, so that the state prediction model calculates the predicted motion state of the terminal at the first moment based on a time difference between the first moment and the second moment;

wherein the second moment is a moment at which the terminal is positioned last time before the first moment.

9. The method according to claim 1, further comprising:

obtaining second converted positioning information converted from the predicted motion state;

obtaining deviation data of the positioning information relative to the second converted positioning information;

eliminating deviation data corresponding to at least one satellite from the deviation data through outlier detection, and eliminating positioning information corresponding to the at least one satellite from the positioning information set, to update the positioning information set; and performing clock jump detection on the deviation data after the elimination, and when a clock jump is detected, adjusting the predicted motion state and adjusting at least one parameter in the state adjustment model.

10. The method according to claim 9, wherein performing the clock jump detection on the deviation data after the elimination comprises at least one of following:

in response to the positioning information comprising pseudo-range information, and the deviation data being deviation data of the pseudo-range information, performing clock error jump detection on the deviation data; and in response to the positioning information comprising Doppler information, and the deviation data being deviation data of the Doppler information, performing clock drift jump detection on the deviation data.

11. The method according to claim 1, further comprising:

obtaining second converted positioning information converted from the predicted motion state;

obtaining a deviation data set of the positioning information corresponding to the satellite in the positioning information set relative to the second converted positioning information;

eliminating deviation data corresponding to at least one first satellite from the deviation data set through outlier detection, and eliminating positioning information corresponding to the at least one first satellite from the positioning information set, to update the positioning information set;

calculating a model verification parameter value based on the deviation data, the state adjustment model, and the positioning information set;

in response to that the model verification parameter value meets a preset threshold condition, performing statistical distribution detection on the positioning information set, and eliminating positioning information corresponding to at least one satellite that fails statistical distribution detection, to update the positioning information set; and in response to that the model verification parameter value does not meet the preset threshold condition, initializing the state prediction model and the state adjustment model, and performing the step of predicting the predicted motion state of the terminal at the first moment state and adjusting the predicted motion state at the first moment based on the current positioning information set.

12. The method according to claim 1, wherein adjusting the predicted motion state at the first moment comprises:

applying the positioning information set, the predicted motion state, the error corresponding to the satellite in the positioning information set, and the error adjustment factor to the state adjustment model, to obtain a motion state adjustment amount; and adjusting the predicted motion state by using the adjustment amount, to obtain the adjusted motion state of the terminal at the first moment.

13. The method according to claim 12, further comprising:

determining fluctuation information of at least one motion state parameter in the history motion state of the terminal;

obtaining probability information of various values of the at least one motion state parameter by using the fluctuation information;

estimating prediction error information of the state prediction model for the at least one motion state parameter according to the probability information; and adjusting the state adjustment model according to the prediction error information.

14. The method according to claim 12, further comprising:

adjusting the state adjustment model based on the positioning information set, the error corresponding to the satellite in the positioning information set, and the error adjustment factor.

15. The method according to claim 12, further comprising:

obtaining third converted positioning information converted from the adjusted motion state;

obtaining a deviation data set of the positioning information corresponding to the satellite in the positioning information set relative to the third converted positioning information;

performing statistical distribution detection on the deviation data set;

eliminating, from the positioning information set, positioning information corresponding to at least one satellite that fails statistical distribution detection, to update the positioning information set; and adjusting the predicted motion state by using the updated positioning information set.

16. The method according to claim 12, further comprising:

obtaining an adjustment amount of the adjusted motion state relative to the predicted motion state; and in response to that the adjustment amount does not meet a preset threshold condition, initializing the state prediction model and the state adjustment model, and performing the step of predicting the predicted motion state of the terminal at the first moment state and adjusting the predicted motion state based on the current positioning information set.

17. A computer device, comprising one or more processors; and a memory coupled to the one or more processors and storing a computer program that, when being executed, causes the one or more processors to perform:

obtaining a positioning information set for the terminal at a first moment, and determining an estimated motion state of the terminal at the first moment based on the positioning information set, the positioning information set comprising positioning information corresponding to multiple satellites received from the multiple satellites;

obtaining measurement data by performing signal measurement on satellite signals of the multiple satellites, and estimating, based on the measurement data, an error of positioning information corresponding to a satellite of the multiple satellites;

obtaining converted positioning information converted from the estimated motion state, to calculate deviation information between the positioning information corresponding to the satellite in the positioning information set and the converted positioning information;

determining, based on the deviation information, an error adjustment factor corresponding to the satellite, the error adjustment factor corresponding to the satellite being used to adjust the error of the positioning information corresponding to the satellite;

providing a predicted motion state of the terminal at the first moment through a state prediction model by using a history motion state of the terminal, the history motion state comprising a motion state of the terminal at least one moment before the first moment;

applying the positioning information set, the error, and the error adjustment factor to a state adjustment model to adjust the predicted motion state, to obtain an adjusted motion state of the terminal at the first moment; and determining a positioning result of the terminal at the first moment according to the adjusted motion state.

18. The computer device according to claim 17, wherein the one or more processors are further configured to perform:

eliminating, by using an abnormality detection method, positioning information of at least one satellite from positioning information of a first number of satellites obtained by the terminal at the first moment, to obtain the positioning information set.

19. The computer device according to claim 17, wherein the one or more processors are further configured to perform:

setting an initial estimated motion state;

obtaining initial converted positioning information converted from the initial estimated motion state;

iteratively adjusting the initial estimated motion state according to deviation information of the positioning information corresponding to the satellite in the positioning information set relative to the initial converted positioning information, until a preset condition is met; and using an estimated motion state when the preset condition is met as the estimated motion state of the terminal at the first moment.

20. A non-transitory computer-readable storage medium, storing a computer program that, when being executed, causes one or more processors to perform:

obtaining a positioning information set for the terminal at a first moment, and determining an estimated motion state of the terminal at the first moment based on the positioning information set, the positioning information set comprising positioning information corresponding to multiple satellites received from the multiple satellites;

obtaining measurement data by performing signal measurement on satellite signals of the multiple satellites, and estimating, based on the measurement data, an error of positioning information corresponding to a satellite of the multiple satellites;

obtaining converted positioning information converted from the estimated motion state, to calculate deviation information between the positioning information corresponding to the satellite in the positioning information set and the converted positioning information;

determining, based on the deviation information, an error adjustment factor corresponding to the satellite, the error adjustment factor corresponding to the satellite being used to adjust the error of the positioning information corresponding to the satellite;

providing a predicted motion state of the terminal at the first moment through a state prediction model by using a history motion state of the terminal, the history motion state comprising a motion state of the terminal at least one moment before the first moment;

applying the positioning information set, the error, and the error adjustment factor to a state adjustment model to adjust the predicted motion state, to obtain an adjusted motion state of the terminal at the first moment; and determining a positioning result of the terminal at the first moment according to the adjusted motion state.

* * * * *